(12) United States Patent
Ould-Ahmed-Vall

(10) Patent No.: US 12,001,887 B2
(45) Date of Patent: Jun. 4, 2024

(54) APPARATUSES, METHODS, AND SYSTEMS FOR INSTRUCTIONS FOR ALIGNING TILES OF A MATRIX OPERATIONS ACCELERATOR

(71) Applicant: Intel Corporation, Santa Clara, CA (US)

(72) Inventor: Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 17/134,142

(22) Filed: Dec. 24, 2020

(65) Prior Publication Data
US 2022/0206854 A1 Jun. 30, 2022

(51) Int. Cl.
*G06F 9/30* (2018.01)
*G06F 9/50* (2006.01)
(Continued)

(52) U.S. Cl.
CPC ........ *G06F 9/5027* (2013.01); *G06F 9/30036* (2013.01); *G06F 9/30098* (2013.01);
(Continued)

(58) Field of Classification Search
CPC .............. G06F 9/5027; G06F 9/30036; G06F 9/30098; G06F 9/30145; G06F 15/8023; G06F 17/16; G06F 9/30032
See application file for complete search history.

(56) References Cited

U.S. PATENT DOCUMENTS 5,247,632 A 9/1993 Newman
5,475,822 A 12/1995 Sibigtroth et al.
(Continued)

FOREIGN PATENT DOCUMENTS

KR 10-2011-0079495 A 7/2011
WO 2004/053841 A2 6/2004
(Continued)

OTHER PUBLICATIONS

Corrected Notice of Allowability, U.S. Appl. No. 15/201,442, dated Jan. 22, 2019, 5 pages.
(Continued)

*Primary Examiner* — Corey S Faherty
(74) *Attorney, Agent, or Firm* — NICHOLSON DE VOS WEBSTER & ELLIOTT LLP

(57) ABSTRACT

Systems, methods, and apparatuses relating to one or more instructions for element aligning of a tile of a matrix operations accelerator are described. In one embodiment, a system includes a matrix operations accelerator circuit comprising a two-dimensional grid of processing elements, a first plurality of registers that represents a first two-dimensional matrix coupled to the two-dimensional grid of processing elements, and a second plurality of registers that represents a second two-dimensional matrix coupled to the two-dimensional grid of processing elements; and a hardware processor core coupled to the matrix operations accelerator circuit and comprising a decoder circuit to decode a single instruction into a decoded instruction, the single instruction including a first field that identifies the first two-dimensional matrix, a second field that identifies the second two-dimensional matrix, and an opcode that indicates an execution circuit of the hardware processor core is to cause the matrix operations accelerator circuit to generate a third two-dimensional matrix from a proper subset of
(Continued)

elements of a row or a column of the first two-dimensional matrix and a proper subset of elements of a row or a column of the second two-dimensional matrix and store the third two-dimensional matrix at a destination in the matrix operations accelerator circuit, and the execution circuit of the hardware processor core to execute the decoded instruction according to the opcode.

25 Claims, 47 Drawing Sheets

(51) Int. Cl.
*G06F 15/80* (2006.01)
*G06F 17/16* (2006.01)

(52) U.S. Cl.
CPC ...... *G06F 9/30145* (2013.01); *G06F 15/8023* (2013.01); *G06F 17/16* (2013.01)

(56) References Cited

U.S. PATENT DOCUMENTS

| | | | |
|---|---|---|---|
| 5,892,962 | A | 4/1999 | Cloutier |
| 6,161,219 | A | 12/2000 | Ramkumar et al. |
| 6,212,112 | B1 | 4/2001 | Naura et al. |
| 6,332,186 | B1 | 12/2001 | Elwood et al. |
| 6,877,020 | B1 | 4/2005 | Bratt et al. |
| 7,003,542 | B2 | 2/2006 | Devir |
| 7,209,939 | B2 | 4/2007 | Castrapel et al. |
| 7,725,521 | B2 | 5/2010 | Chen et al. |
| 7,792,895 | B1 | 9/2010 | Juffa et al. |
| 7,873,812 | B1 | 1/2011 | Mimar |
| 7,912,889 | B1 | 3/2011 | Juffa et al. |
| 7,932,910 | B2 | 4/2011 | Hansen et al. |
| 8,392,487 | B1 | 3/2013 | Mesh et al. |
| 8,984,043 | B2 | 3/2015 | Ginzburg et al. |
| 9,442,723 | B2 | 9/2016 | Yang et al. |
| 9,906,359 | B2 | 2/2018 | Gueron |
| 9,960,907 | B2 | 5/2018 | Gueron |
| 10,296,456 | B2 * | 5/2019 | Murrin ................ G06F 12/0607 |
| 10,535,114 | B2 | 1/2020 | Bolz |
| 2003/0126176 | A1 | 7/2003 | Devir |
| 2004/0111587 | A1 | 6/2004 | Nair et al. |
| 2005/0193050 | A1 | 9/2005 | Sazegari |
| 2006/0101245 | A1 | 5/2006 | Nair et al. |
| 2006/0190517 | A1 | 8/2006 | Guerrero |
| 2007/0186210 | A1 | 8/2007 | Hussain et al. |
| 2008/0071851 | A1 | 3/2008 | Zohar et al. |
| 2008/0140994 | A1 | 6/2008 | Khailany et al. |
| 2008/0208942 | A1 | 8/2008 | Won et al. |
| 2009/0043836 | A1 | 2/2009 | Dupaquis et al. |
| 2009/0292758 | A1 | 11/2009 | Brokenshire et al. |
| 2009/0300091 | A1 | 12/2009 | Brokenshire et al. |
| 2009/0300249 | A1 | 12/2009 | Moyer et al. |
| 2010/0325187 | A1 | 12/2010 | Juffa et al. |
| 2012/0079252 | A1 | 3/2012 | Sprangle |
| 2012/0113133 | A1 | 5/2012 | Shpigelblat |
| 2012/0137074 | A1 | 5/2012 | Kim et al. |
| 2012/0254588 | A1 | 10/2012 | Adrian et al. |
| 2012/0314774 | A1 | 12/2012 | Yang et al. |
| 2013/0305020 | A1 | 11/2013 | Valentine et al. |
| 2014/0149480 | A1 | 5/2014 | Catanzaro et al. |
| 2015/0067302 | A1 | 3/2015 | Gueron |
| 2015/0199266 | A1 | 7/2015 | Franchetti et al. |
| 2018/0113708 | A1 | 4/2018 | Corbal et al. |
| 2018/0189227 | A1 * | 7/2018 | Korthikanti ......... G06F 9/30036 |
| 2019/0042202 | A1 * | 2/2019 | Sade ......................... G06F 7/78 |
| 2019/0042262 | A1 * | 2/2019 | Espig .................... G06F 9/3891 |
| 2019/0102196 | A1 * | 4/2019 | Sade .................. G06F 9/30149 |
| 2020/0372097 | A1 * | 11/2020 | Mattina .................. G06F 17/16 |
| 2021/0406018 | A1 | 12/2021 | Adelman et al. |

FOREIGN PATENT DOCUMENTS

| | | |
|---|---|---|
| WO | 2016/003740 A1 | 1/2016 |
| WO | 2016/105727 A1 | 6/2016 |
| WO | 2018/125250 A1 | 7/2018 |

OTHER PUBLICATIONS

Corrected Notice of Allowability, U.S. Appl. No. 15/201,442, dated Mar. 11, 2019, 2 pages.
International Preliminary Report on Patentability, PCT App. No. PCT/US2017/036038, dated Jan. 17, 2019, 14 pages.
International Preliminary Report on Patentability, PCT App. No. PCT/US2017/040546, dated Oct. 3, 2019, 10 pages.
International Search Report and Written Opinion, PCT App. No. PCT/US2017/040540, dated Jan. 3, 2018, 14 pages.
International Search Report and Written Opinion, PCT App. No. PCT/US2017/036038, dated Sep. 5, 2017 ,15 pages.
International Search Report and Written Opinion, PCT App. No. PCT/US2017/040534, dated Jan. 3, 2018, 11 pages.
International Search Report and Written Opinion, PCT App. No. PCT/US2017/040536, dated Dec. 20, 2017, 11 pages.
International Search Report and Written Opinion, PCT App. No. PCT/US2017/040537, dated Dec. 20, 2017, 11 pages.
International Search Report and Written Opinion, PCT App. No. PCT/US2017/040546, dated Jan. 24, 2018, 15 pages.
Lahr Dave, "Timing Matrix Multiplication in SciDB and Setting the Number of Worker Instances in SciDB and Running Matrix Multiplication Piecemeal", Nov. 13, 2012, 8 pages.
Non-Final Office Action, U.S. Appl. No. 15/201,442, dated May 4, 2018, 11 pages.
Non-Final Office Action, U.S. Appl. No. 16/398,200, dated Jul. 28, 2020, 16 pages.
Notice of Allowance, U.S. Appl. No. 15/201,442, dated Dec. 14, 2018, 5 pages.

* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|------|-------|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|------|-------|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

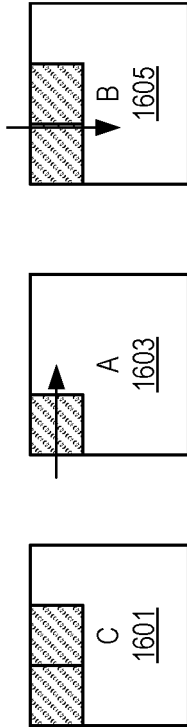

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

| PALETTE ID 1901 | STARTM 1903 |
|---|---|
| STARTP 1905 | PAIR INDICATORS 1907 |
| 0 | 0 |
| 0 | 0 |

. . .

| 0 | 0 |
|---|---|
| TMM0 ROWS 1913 | TMM0 COLUMNS 1915 |
| TMM1 ROWS | TMM1 COLUMNS |
| ▪ ▪ ▪ | |
| TMM15 ROWS | TMM15 COLUMNS |
| 0 | |

FETCH A SINGLE INSTRUCTION INCLUDING A FIRST FIELD THAT IDENTIFIES THE FIRST TWO-DIMENSIONAL MATRIX, A SECOND FIELD THAT IDENTIFIES THE SECOND TWO-DIMENSIONAL MATRIX, AND AN OPCODE THAT INDICATES AN EXECUTION CIRCUIT OF THE HARDWARE PROCESSOR CORE IS TO CAUSE A THIRD TWO-DIMENSIONAL MATRIX TO BE LOGICALLY FORMED FOR INPUT INTO THE TWO-DIMENSIONAL GRID OF PROCESSING ELEMENTS FROM THE FIRST TWO-DIMENSIONAL MATRIX AND THE SECOND TWO-DIMENSIONAL MATRIX WITHOUT MOVING DATA ELEMENTS WITHIN THE FIRST PLURALITY OF REGISTERS AND THE SECOND PLURALITY OF REGISTERS 2902

DECODE THE SINGLE INSTRUCTION INTO A DECODED INSTRUCTION 2904

RETRIEVE DATA ASSOCIATED WITH THE INSTRUCTION 2906

SCHEDULE THE DECODED INSTRUCTION FOR EXECUTION 2908

EXECUTE THE DECODED INSTRUCTION ACCORDING TO THE OPCODE 2910

COMMIT A RESULT OF THE EXECUTED INSTRUCTION 2912

```
┌─────────────────────────────────────────────────────────────────────────┐
│ FETCH A SINGLE INSTRUCTION INCLUDING A FIRST FIELD THAT IDENTIFIES THE  │
│ FIRST TWO-DIMENSIONAL MATRIX, A SECOND FIELD THAT IDENTIFIES THE SECOND │
│ TWO-DIMENSIONAL MATRIX, AND AN OPCODE THAT INDICATES AN EXECUTION       │
│ CIRCUIT OF THE HARDWARE PROCESSOR CORE IS TO CAUSE THE MATRIX           │
│ OPERATIONS ACCELERATOR CIRCUIT TO GENERATE A THIRD TWO-DIMENSIONAL      │
│ MATRIX FROM A PROPER SUBSET OF ELEMENTS OF A ROW OR A COLUMN OF THE     │
│ FIRST TWO-DIMENSIONAL MATRIX AND A PROPER SUBSET OF ELEMENTS OF A ROW   │
│ OR A COLUMN OF THE SECOND TWO-DIMENSIONAL MATRIX AND STORE THE THIRD    │
│ TWO-DIMENSIONAL MATRIX AT A DESTINATION IN THE MATRIX OPERATIONS        │
│ ACCELERATOR CIRCUIT 3402                                                │
└─────────────────────────────────────────────────────────────────────────┘
                                     │
                                     ▼
┌─────────────────────────────────────────────────────────────────────────┐
│         DECODE THE SINGLE INSTRUCTION INTO A DECODED INSTRUCTION 3404   │
└─────────────────────────────────────────────────────────────────────────┘
                                     │
                                     ▼
┌─────────────────────────────────────────────────────────────────────────┐
│              RETRIEVE DATA ASSOCIATED WITH THE INSTRUCTION 3406         │
└─────────────────────────────────────────────────────────────────────────┘
                                     │
                                     ▼
┌─────────────────────────────────────────────────────────────────────────┐
│              SCHEDULE THE DECODED INSTRUCTION FOR EXECUTION 3408        │
└─────────────────────────────────────────────────────────────────────────┘
                                     │
                                     ▼
┌─────────────────────────────────────────────────────────────────────────┐
│         EXECUTE THE DECODED INSTRUCTION ACCORDING TO THE OPCODE 3410    │
└─────────────────────────────────────────────────────────────────────────┘
                                     │
                                     ▼
┌─────────────────────────────────────────────────────────────────────────┐
│              COMMIT A RESULT OF THE EXECUTED INSTRUCTION 3412           │
└─────────────────────────────────────────────────────────────────────────┘
```

FIG. 34

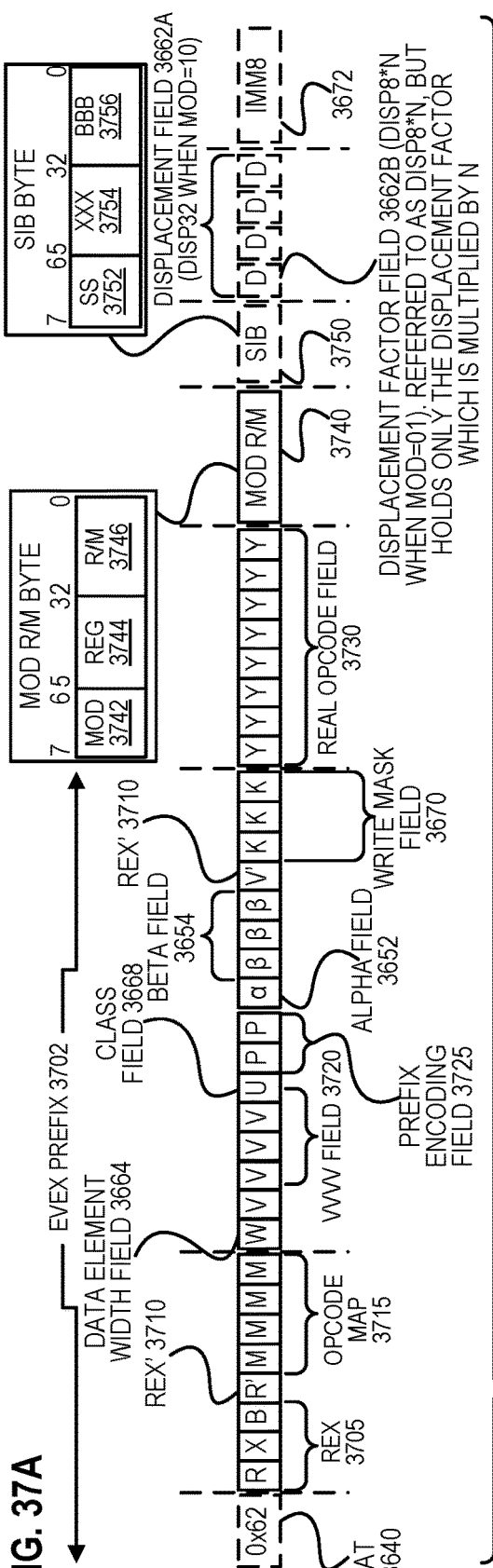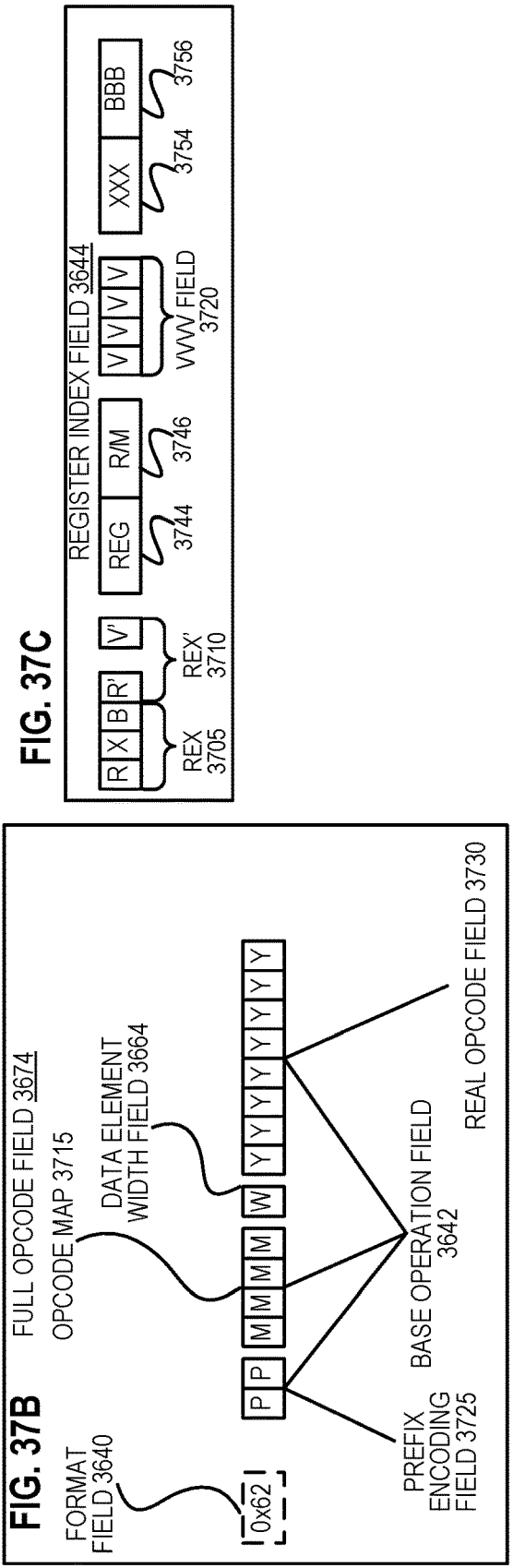

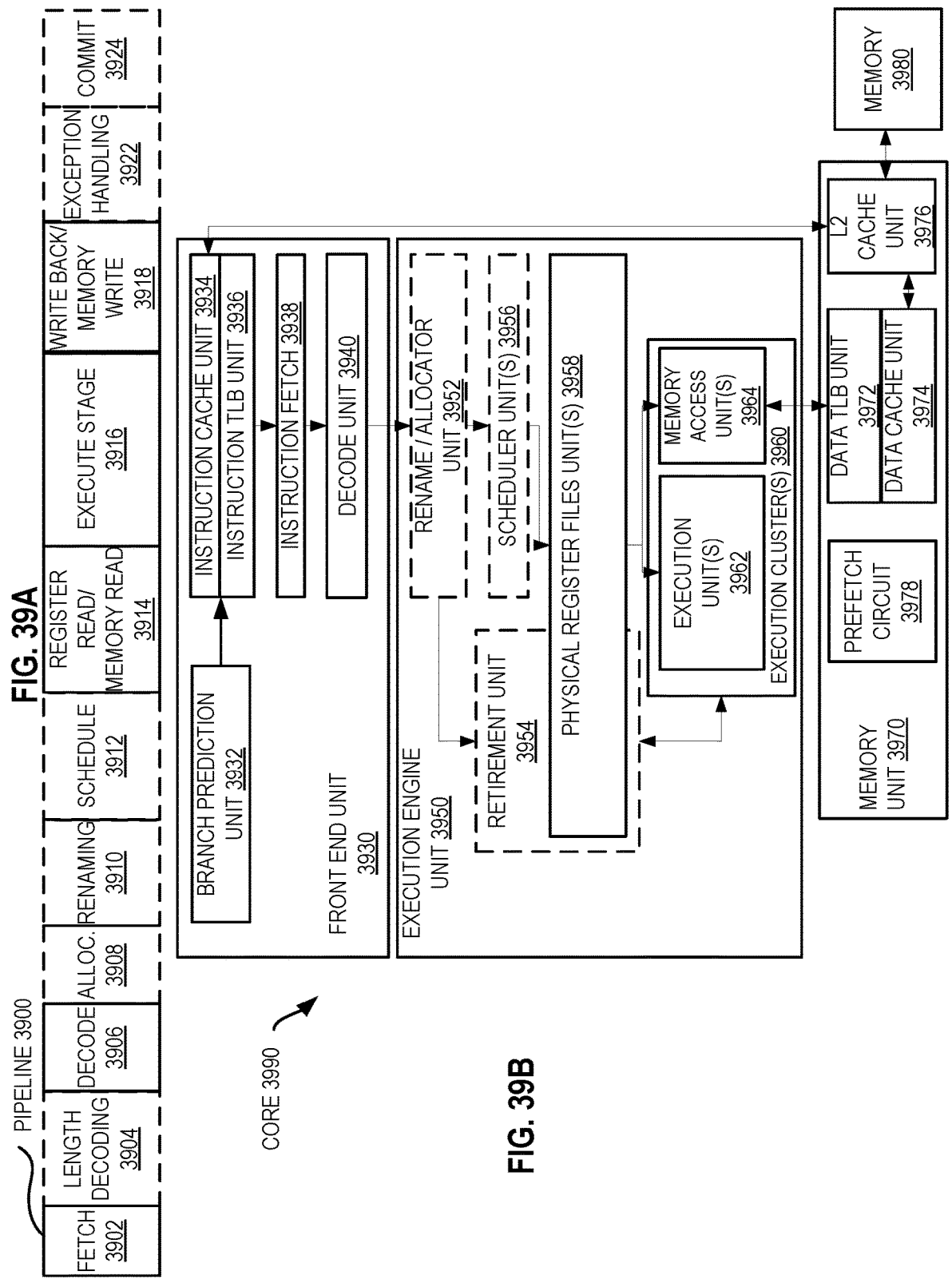

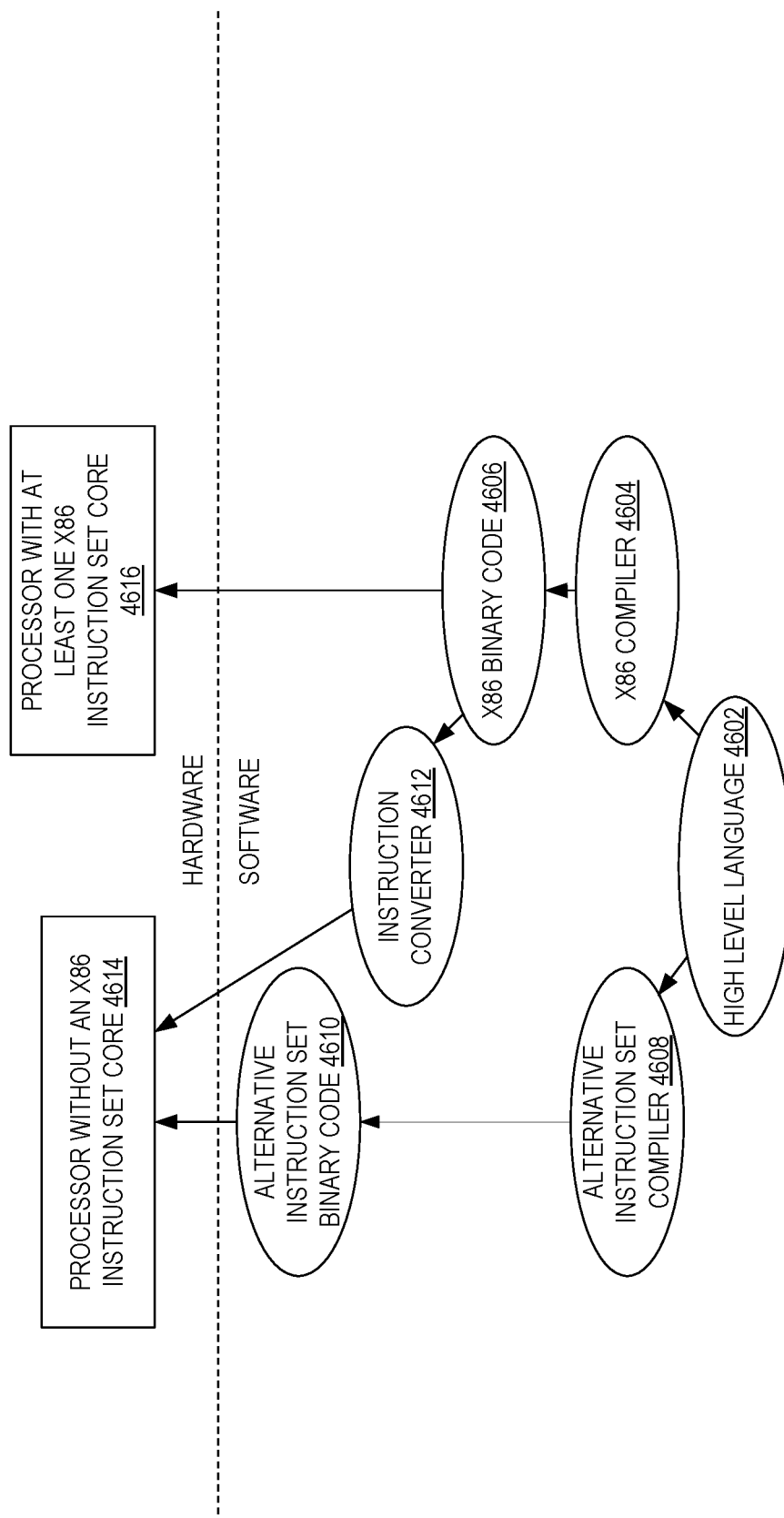

APPARATUSES, METHODS, AND SYSTEMS FOR INSTRUCTIONS FOR ALIGNING TILES OF A MATRIX OPERATIONS ACCELERATOR

TECHNICAL FIELD

The disclosure relates generally to computer processor architecture, and, more specifically, to circuitry to implement an instruction for element aligning of a tile of a matrix operations accelerator.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment.

FIG. 15 illustrates an example of a matrix expressed in row major format and column major format.

FIG. 16 illustrates an example of usage of matrices (tiles).

FIG. 19 illustrates an embodiment of a description of the matrices (tiles) to be supported.

FIG. 29 illustrates a method of processing a "tile align" instruction according to embodiments of the disclosure.

FIG. 34 illustrates a method of processing a "tile element align" instruction according to embodiments of the disclosure.

FIG. 37A is a block diagram illustrating fields for the generic vector friendly instruction formats in FIGS. 36A and 36B according to embodiments of the disclosure.

FIG. 37B is a block diagram illustrating the fields of the specific vector friendly instruction format in FIG. 37A that make up a full opcode field according to one embodiment of the disclosure.

FIG. 37C is a block diagram illustrating the fields of the specific vector friendly instruction format in FIG. 37A that make up a register index field according to one embodiment of the disclosure.

FIG. 39A is a block diagram illustrating both an exemplary in-order pipeline and an exemplary register renaming, out-of-order issue/execution pipeline according to embodiments of the disclosure.

FIG. 39B is a block diagram illustrating both an exemplary embodiment of an in-order architecture core and an exemplary register renaming, out-of-order issue/execution architecture core to be included in a processor according to embodiments of the disclosure.

FIG. 46 is a block diagram contrasting the use of a software instruction converter to convert binary instructions in a source instruction set to binary instructions in a target instruction set according to embodiments of the disclosure.

DETAILED DESCRIPTION

Figure 1A:
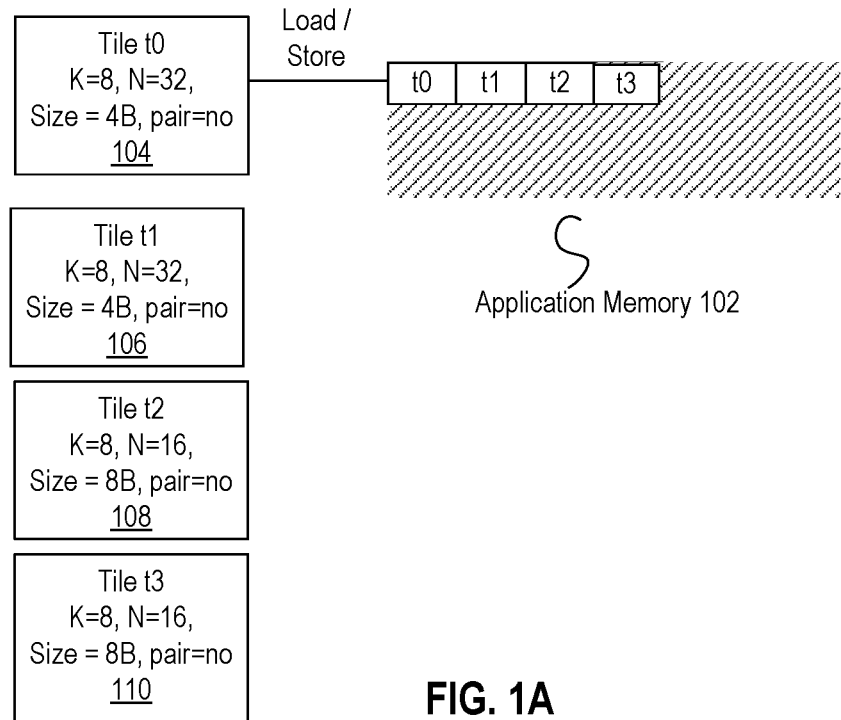
FIG. 1A illustrates an embodiment of configured tiles according to embodiments of the disclosure.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Matrices may be increasingly important in many computing tasks such as machine learning and other bulk data processing. Deep Learning is a class of machine learning algorithms. Deep learning architectures, such as deep neural networks, may be applied to fields including computer vision, speech recognition, natural language processing, audio recognition, social network filtering, machine translation, bioinformatics and drug design.

Inference and training, two tools used for deep learning, may utilize low precision arithmetic. Maximizing throughput of deep learning algorithms and computations may assist in meeting the needs of deep learning processors, for example, those performing deep learning in a data center.

Matrix-matrix multiplication (a.k.a., GEMM or General Matrix Multiplication) is a compute-heavy operation on certain processors. Special hardware for matrix multiplication (e.g., GEMM) is a good option for improving the peak compute (and energy efficiency) of certain applications, such as deep learning. Some of these applications, including deep learning, can operate on input data elements with relatively few bits without losing accuracy, as long as the output elements have enough bits (e.g., more than the inputs).

In certain processors, handling matrices is a difficult and/or instruction intensive task. For example, rows of a matrix could be put into a plurality of packed data (e.g., SIMD or vector) registers and then operated on individually. For example, an add two 8×2 (e.g., row by column) matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

DISCUSSION

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile) or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transform, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc. Also described herein are instructions for performing matrix operation (e.g., TILEPARTIALDOT-PRODUCT) instructions.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating point, double precision floating point, integer, etc.) may be supported.

Exemplary Usage of Configured Tiles

In some embodiments, tile parameters can be configured. For example, a given tile may be configured to provide tile options. Exemplary tile options include but are not limited to: a number of rows of the tile, a number of columns of the tile, whether the tile is VALID, and whether the tile consists of a PAIR of equal-sized tiles.

FIG. 1A illustrates an embodiment of configured tiles. As shown, 4 kB of application memory 102 have stored thereon 4 1 kB titles, tile t0 104, tile t1 106, tile t2 108, and tile t3 110. In this example, the 4 tiles do not consist of pairs, and each have elements arranged in rows and columns. Tile t0 104 and tile t1 106 have K rows and N columns of 4-byte elements (e.g., single precision data), where K equals 8 and N=32. Tile t2 108 and tile t3 110 have K rows and N/2 columns of 8-byte elements (e.g., double precision data). As the double precision operands are twice the width of single precision, this configuration is consistent with a palette, used to provide tile options, supplying at least 4 names with total storage of at least 4 kB. In operation, the tiles can be loaded from and stored to memory using load and store operations. Depending upon the instruction encoding scheme used, the amount of available application memory, as well as the size, number, and configuration of available tiles varies.

Figure 1B:
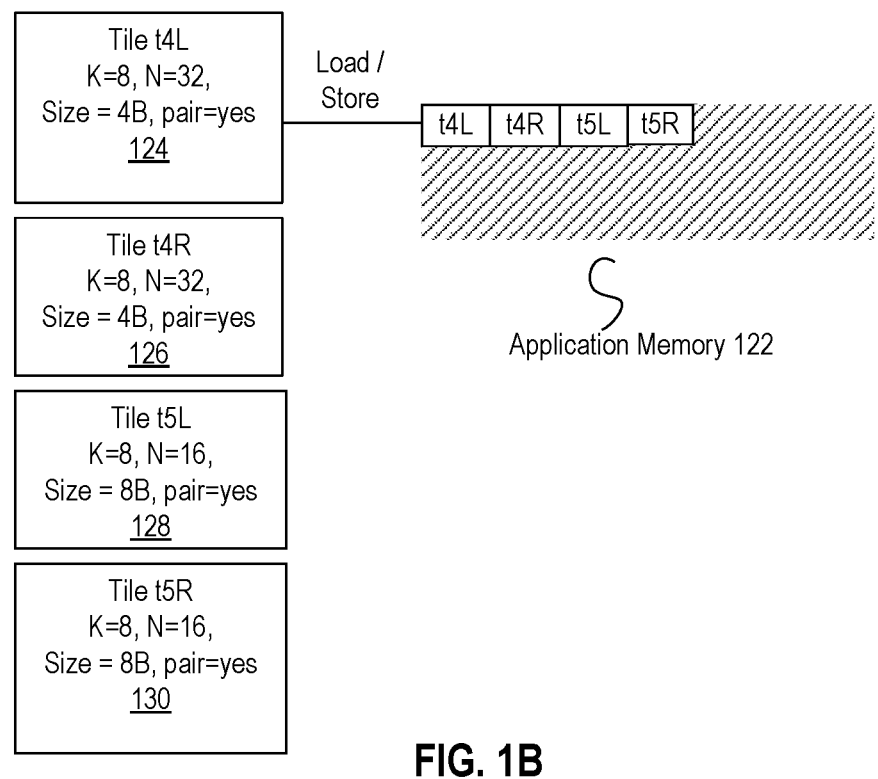
FIG. 1B illustrates an embodiment of configured tiles according to embodiments of the disclosure.

FIG. 1B illustrates an embodiment of configured tiles. As shown, 4 kB of application memory 122 have stored thereon 2 pairs of 1 kB-titles, the first pair being tile t4L 124 and tile t4R 126, and the second pair being tile t5L 128 and tile t5R 130. As shown the pairs of tiles are divided into a left tile and a right tile. In other embodiments, the pair of tiles are divided into an even tile and an odd tile. In this example, the 4 tiles each have elements arranged in rows and columns. Tile t4L 124 and tile t4R 126 have K rows and N columns of 4-byte elements (e.g., single precision floating point data), where K equals 8 and N equals 32. Tile t5L 128 and tile t5R 130 have K rows and N/2 columns of 8-byte elements (e.g., double precision floating point data). As the double precision operands are twice the width of single precision, this configuration is consistent with a palette, used to provide tile options, supplying at least 2 names with total storage of at least 4 kB. The four tiles of FIG. 1A use 4 names, each naming a 1 kB tile, whereas the 2 pairs of tiles in FIG. 1B can use 2 names to specify the paired tiles. In some embodiments, tile instructions accept a name of a paired tile as an operand. In operation, the tiles can be loaded from and stored to memory using load and store operations. Depending upon the instruction encoding scheme used, the amount of available application memory, as well as the size, number, and configuration of available tiles varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row).

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Exemplary Tile Storage Types

Figure 2:
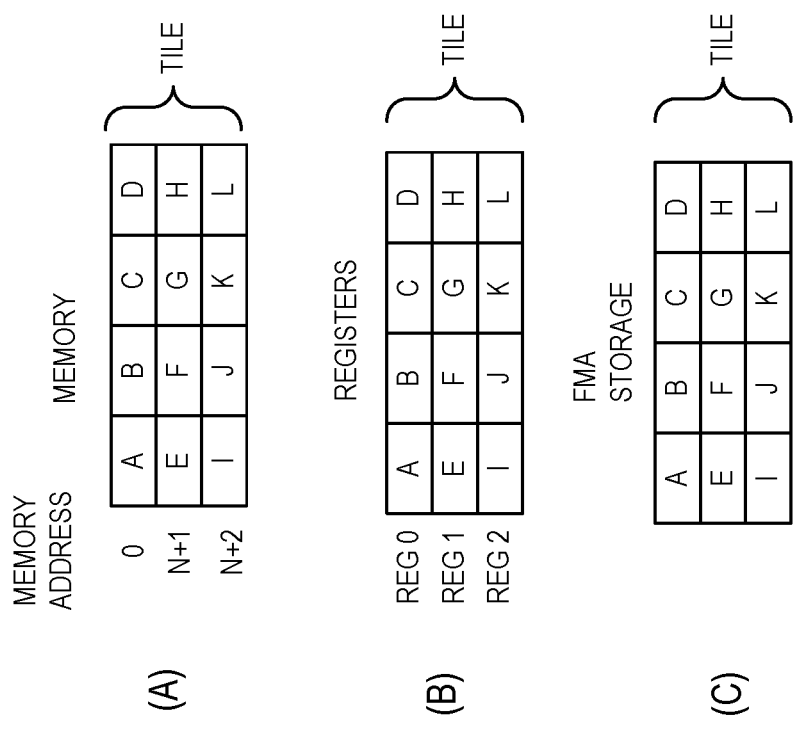
FIG. 2 illustrates several examples of matrix storage according to embodiments of the disclosure.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILE-STORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiply accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIG metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore instruction (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating-point exceptions, with the masking of the exceptions controlled by a control and/or status register.

To support restarting instructions after these events, the instructions store information in the start registers detailed below.

Matrix (Tile) Operation Systems
Exemplary Hardware Support

Figure 3:
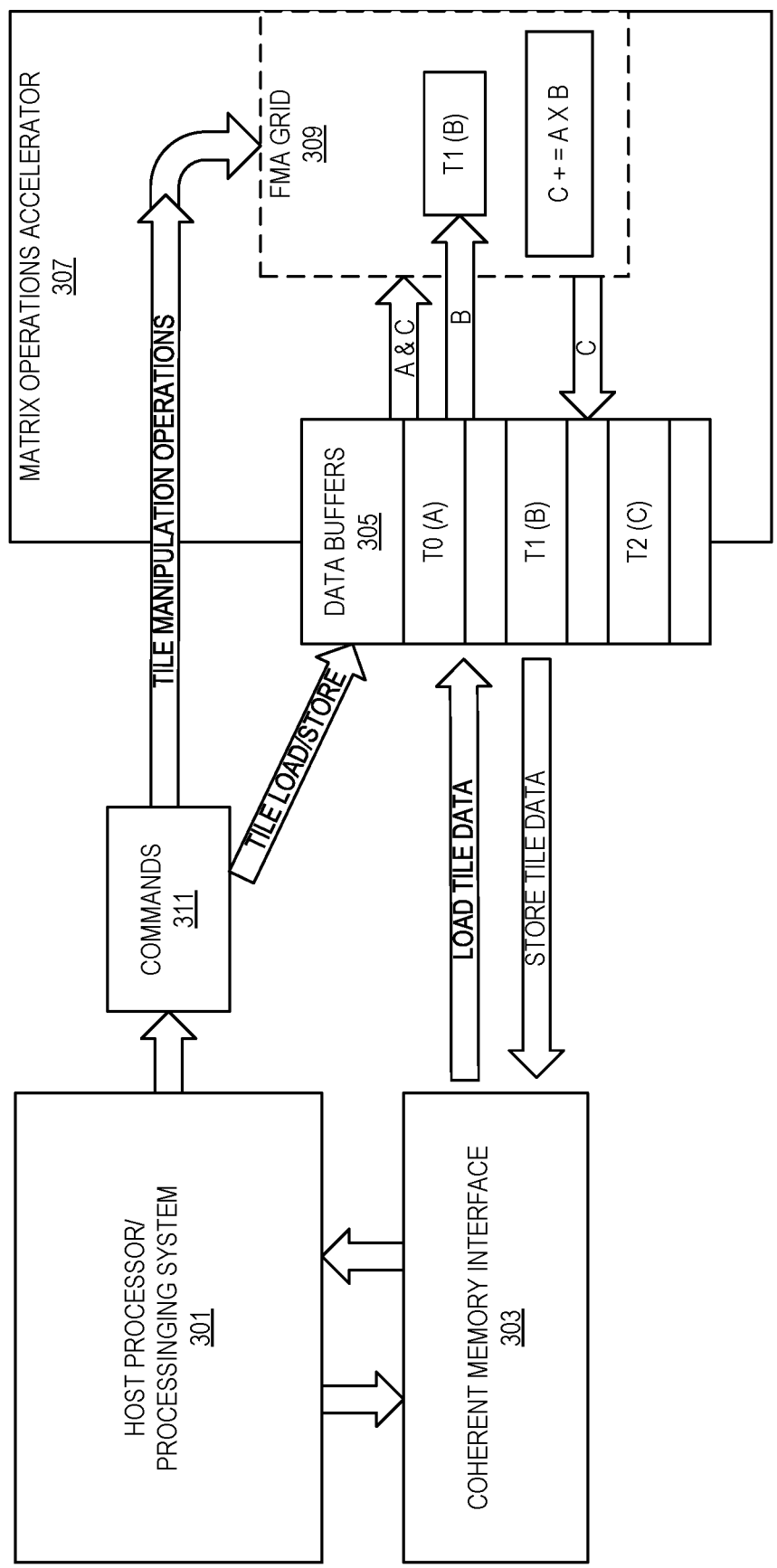
FIG. 3 illustrates an embodiment of a system utilizing a matrix (tile) operations accelerator according to embodiments of the disclosure.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
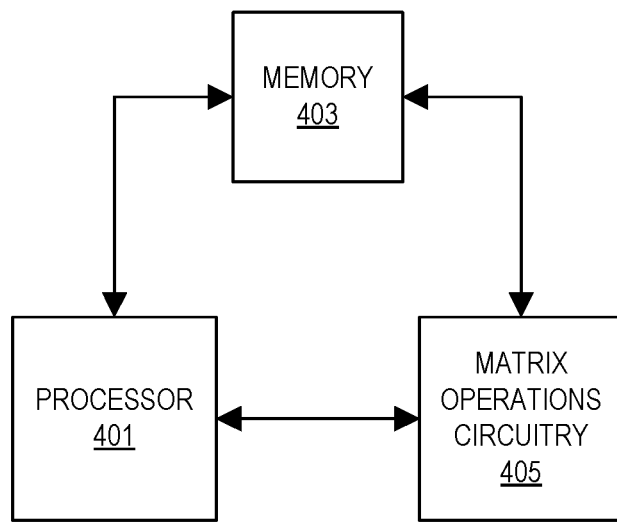
FIGS. 4 and 5 show different embodiments of how memory is shared using a matrix operations accelerator.
Figure 5:
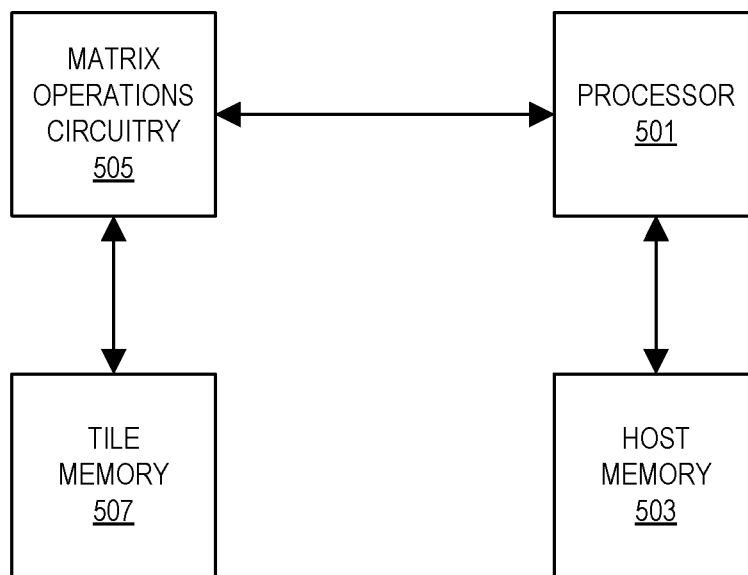

In this example, a coherent memory interface 303 is coupled to the host processor/processing system 301 and matrix operations accelerator 307 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

In some embodiments, tiles are supported using an overlay over physical registers. For example, a tile may utilize 16 1,024-bit registers, 32 512-bit registers, etc. depending on the implementation. In some embodiments, the matrix operations utilize 2-dimensional (2-D) data structures representing one or more packed regions of memory such as registers. Throughout this description, these 2-D data structures are referred to as tiles or tile registers.

In some embodiments, the matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset is stored in the FMA grid 309. As shown, T1 is housed and T0 and T2 are not. Note that A, B, and C refer to the matrices of these tiles which may or may not take up the entire space of the tile.

Figure 6:
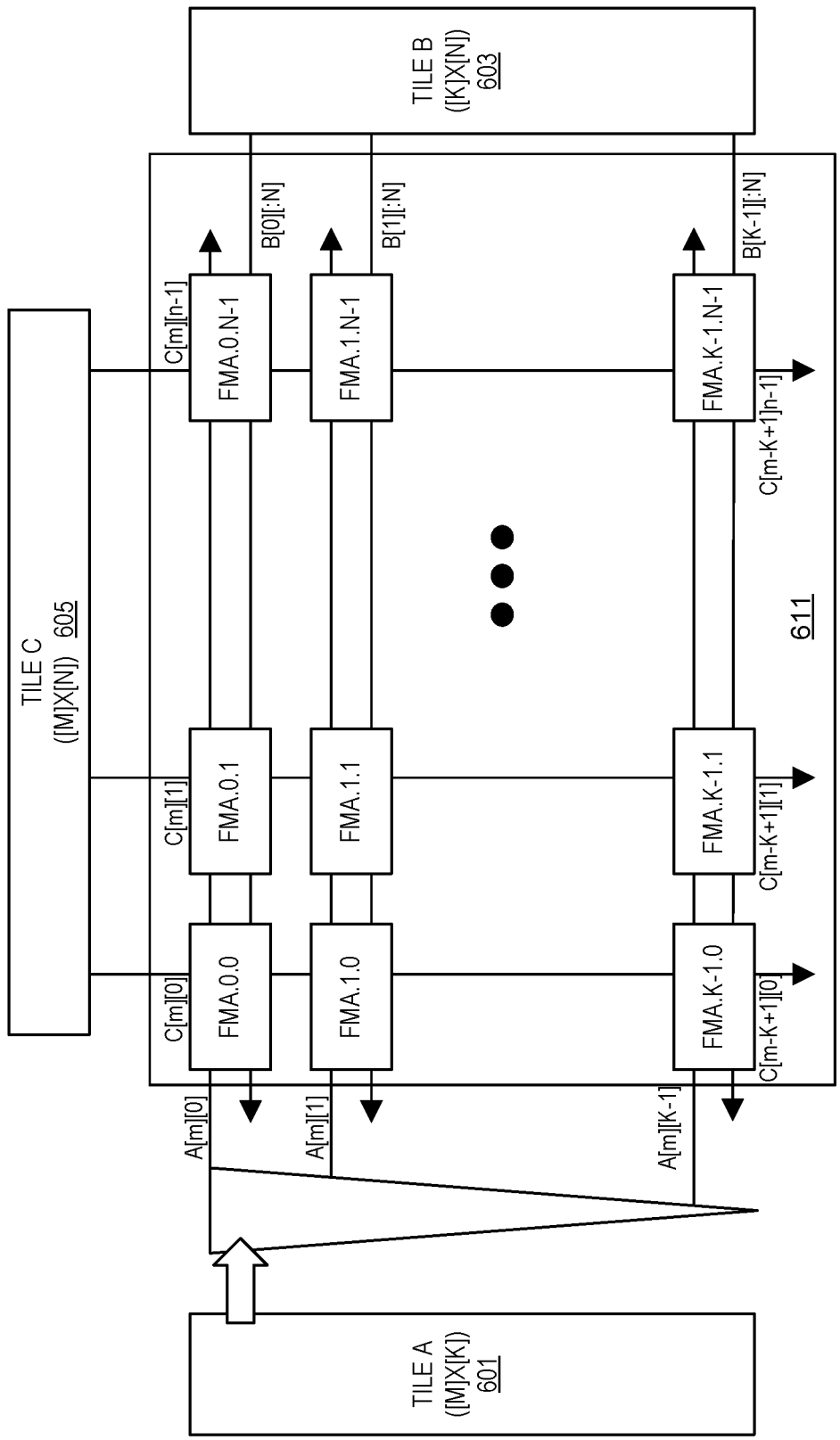
FIG. 6 illustrates an embodiment of matrix multiply accumulate operation using tiles ("TMMA").

FIG. 6 illustrates an embodiment of matrix multiply accumulate operation using tiles ("TMMA").

The number of rows in the matrix (TILE A 601) matches the number of serial (chained) FMAs comprising the computation's latency in certain embodiments. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transformed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMMA, an implementation is free to implement this with "masking" or "early outs."

The latency of an entire TMMA is proportional to N*K. The repeat rate is proportional to N. The number of MACs per TMMA instruction is N*K*M.

Figure 7:
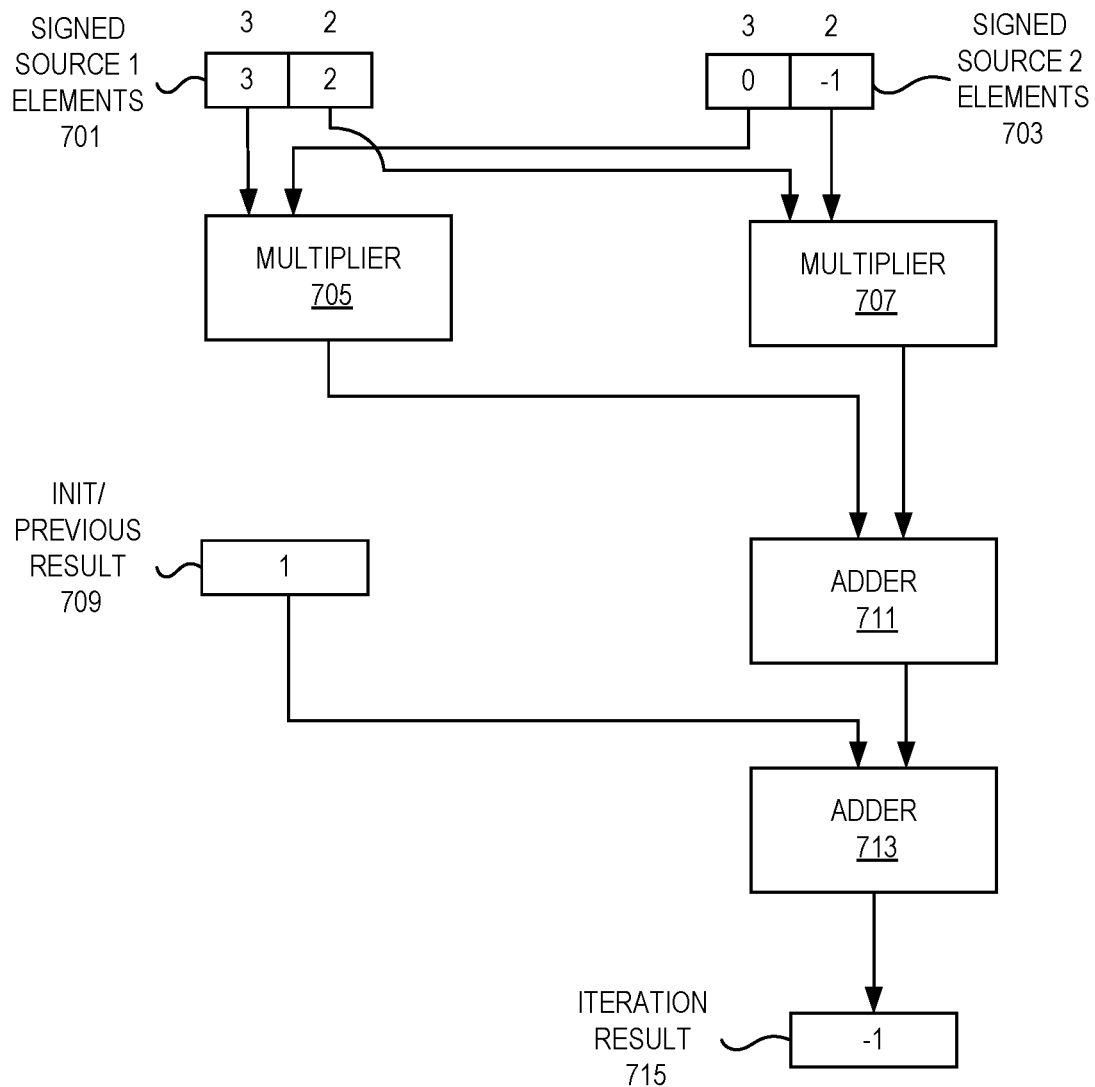
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating-point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating point) while the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709 or passed on to the next iteration if there is one. In some embodiments, a writemask is applied to this storage such that if a corresponding writemask (bit) is set, the storage happens, and, if not set, the storage does not happen.

Figure 8:
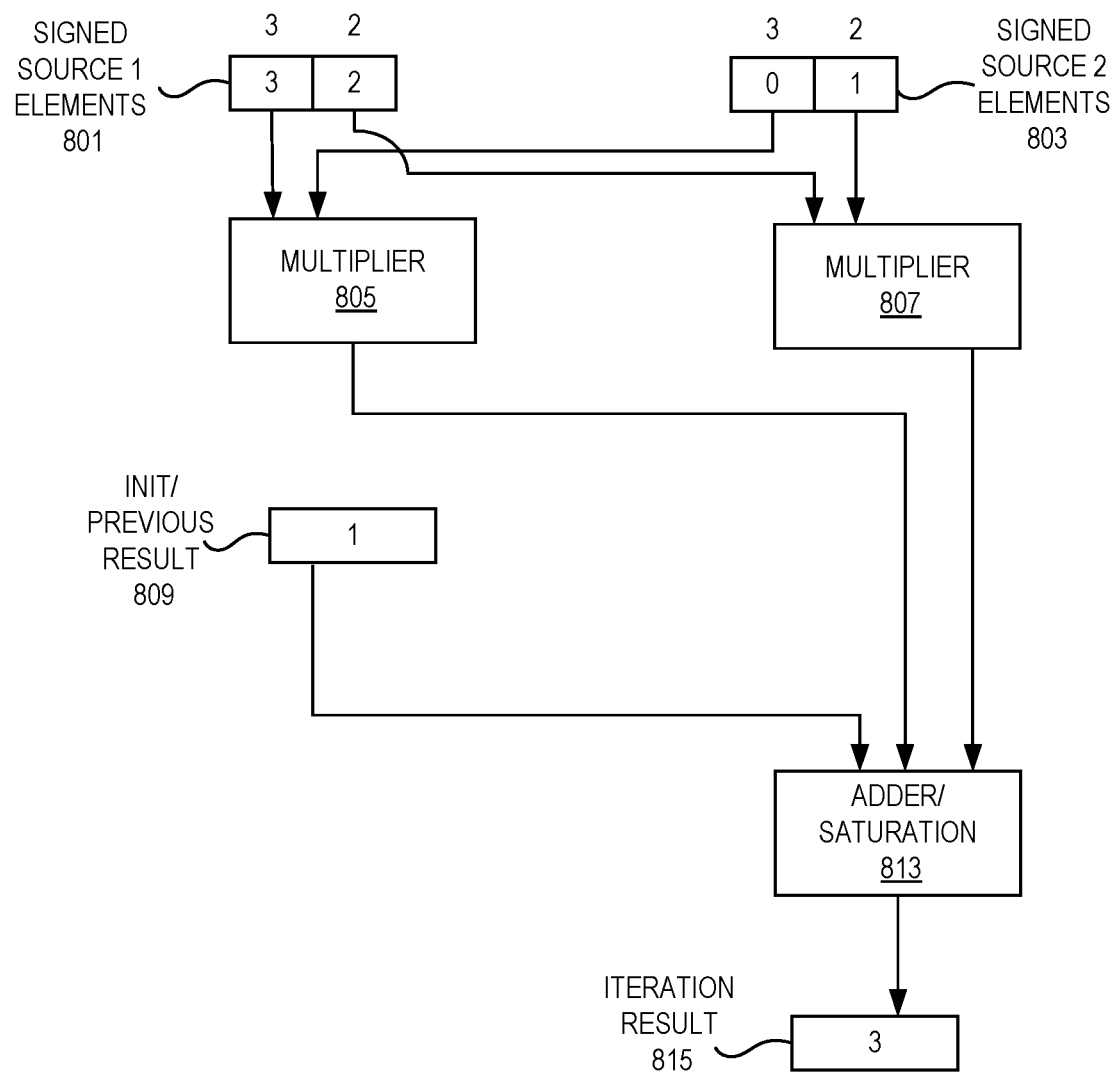
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 813.

Addition/saturation (accumulator) circuitry 813 preserves a sign of an operand when the addition results in a value that is too big. In particular, saturation evaluation occurs on the infinite precision result between the multi-way-add and the write to the destination or next iteration. When the accumulator 813 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from −128 (=−2^7) to 127(=2^7−1)).

The result of the addition and saturation check is stored into the signed result 815 in a packed data element position that corresponds to the packed data element position used from the signed third source 809 or passed on to the next iteration if there is one. In some embodiments, a writemask is applied to this storage such that if a corresponding writemask (bit) is set, the storage happens, and, if not set, the storage does not happen.

Figure 9:
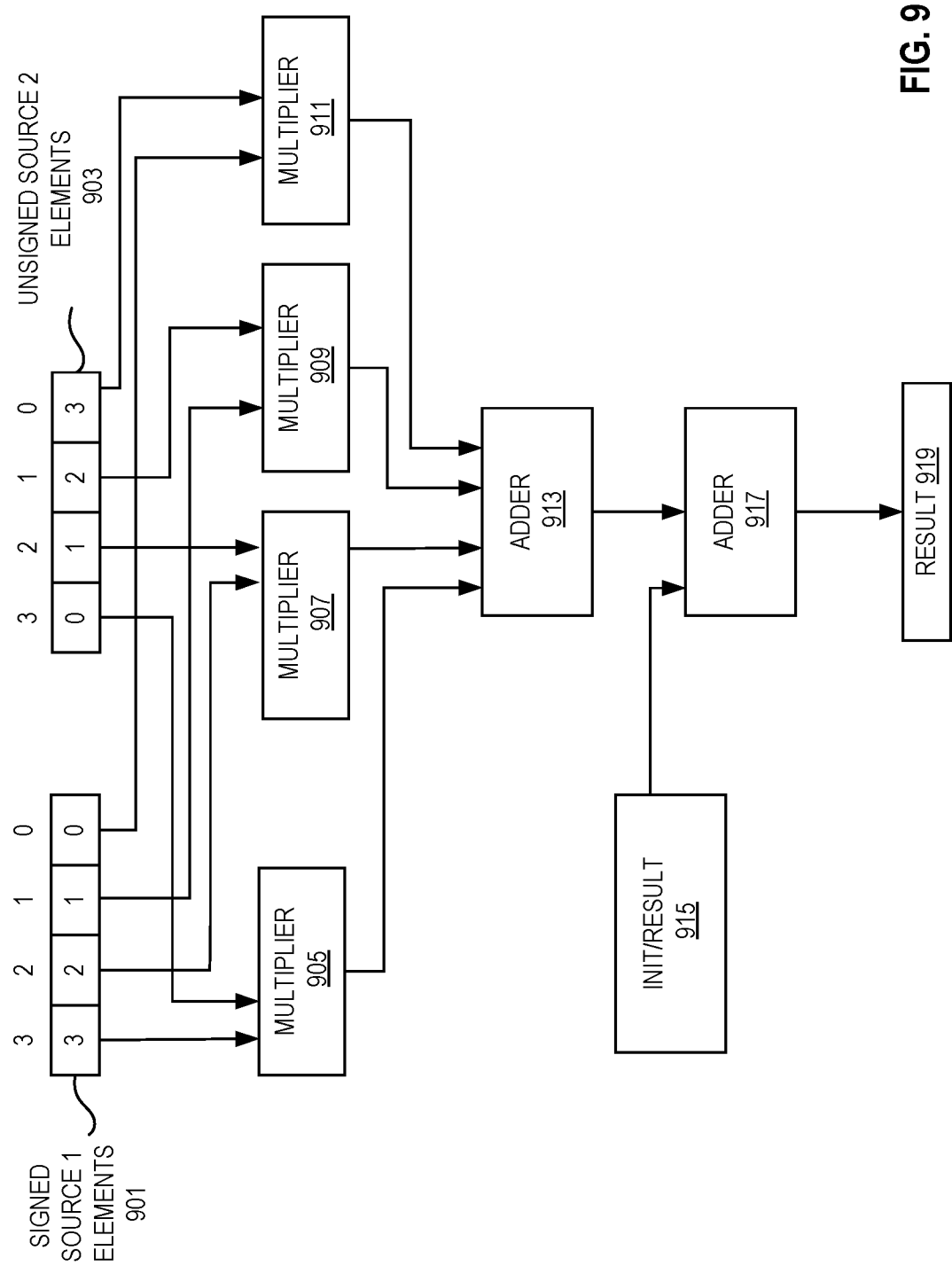
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 905, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 913.

The result of the addition of the results of the multiplications is added to the data from most significant packed data element position of the signed source 3 915 (using a different adder 917 or the same adder 913).

Finally, the result 919 of the second addition is either stored into the signed destination in a packed data element position that corresponds to the packed data element position used from the signed third source 915 or passed to the next iteration. In some embodiments, a writemask is applied to this storage such that if a corresponding writemask (bit) is set, the storage happens, and, if not set, the storage does not happen.

Figure 10:
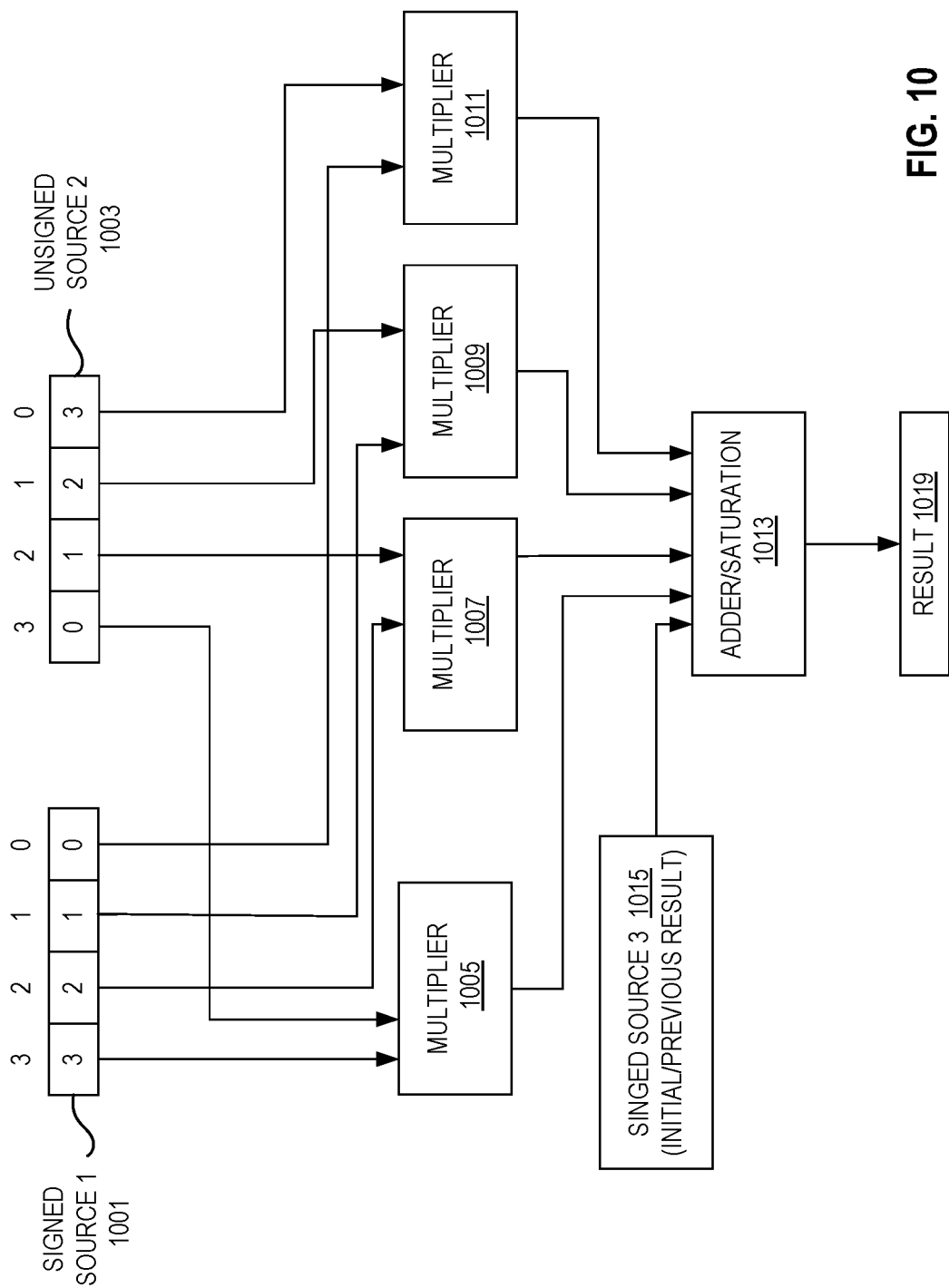
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source 1001 and a second unsigned source 1003 each have four packed data elements. Each of these packed data elements stores data such as floating point or integer data. A third signed source 1015 (initial or previous result) has a packed data element of which stores signed data. The sizes of the first and second sources are a quarter of the third signed source 1015 (initial or previous result). For example, the first and second sources could have 16-bit packed data elements (e.g., word) and the third signed source 1015 (initial or previous result) could have 64-bit packed data elements (e.g., double precision floating point or 64-bit integer).

In this illustration, the four most significant packed data element positions of the first signed source 1001 and the second unsigned source 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first signed source 1001 and the second unsigned source 1003 are multiplied using a multiplier circuit 1005, data from second most significant packed data element positions of the first signed source 1001 and the second unsigned source 1003 are multiplied using a multiplier circuit 1007, data from third most significant packed data element positions of the first signed source 1001 and the second unsigned source 1003 are multiplied using a multiplier circuit 1009, and data from the least significant packed data element positions of the first signed source 1001 and the second unsigned source 1003 are multiplied using a multiplier circuit 1011. In some embodiments, the signed packed data elements of the first signed source 1001 are sign extended and the unsigned packed data elements of the second unsigned source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of third signed source 1015 (initial or previous result). The result of the addition of the results of the multiplications is added to the data from most significant packed data element position of third signed source 1015 (initial or previous result) using adder/saturation 1013 circuitry.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from third signed source 1015 (initial or previous result) or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-intenger or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
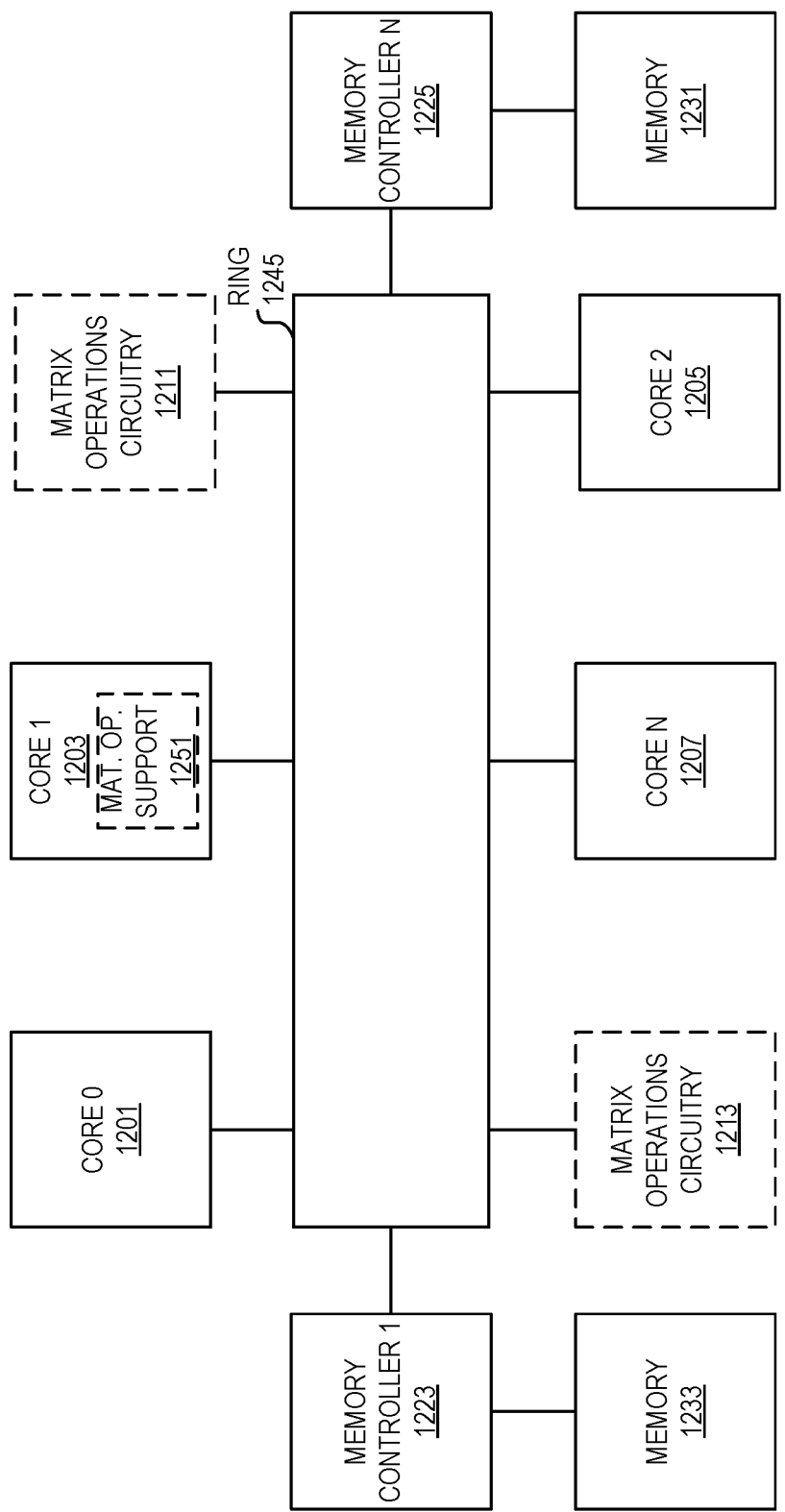
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, multiple entities are coupled with a ring interconnect 1245.

A plurality of cores, core 0 1201, core 1 1203, core 2 1205, and core N 1207 provide non-tile-based instruction support. In some embodiments, matrix operations circuitry 1251 is provided in a core 1203, and in other embodiments matrix operations circuitry 1211 and 1213 are accessible on the ring interconnect 1245.

Additionally, one or more memory controllers 1223-1225 are provided to communicate with memory 1233 and 1231 on behalf of the cores and/or matrix operations circuitry.

Figure 13:
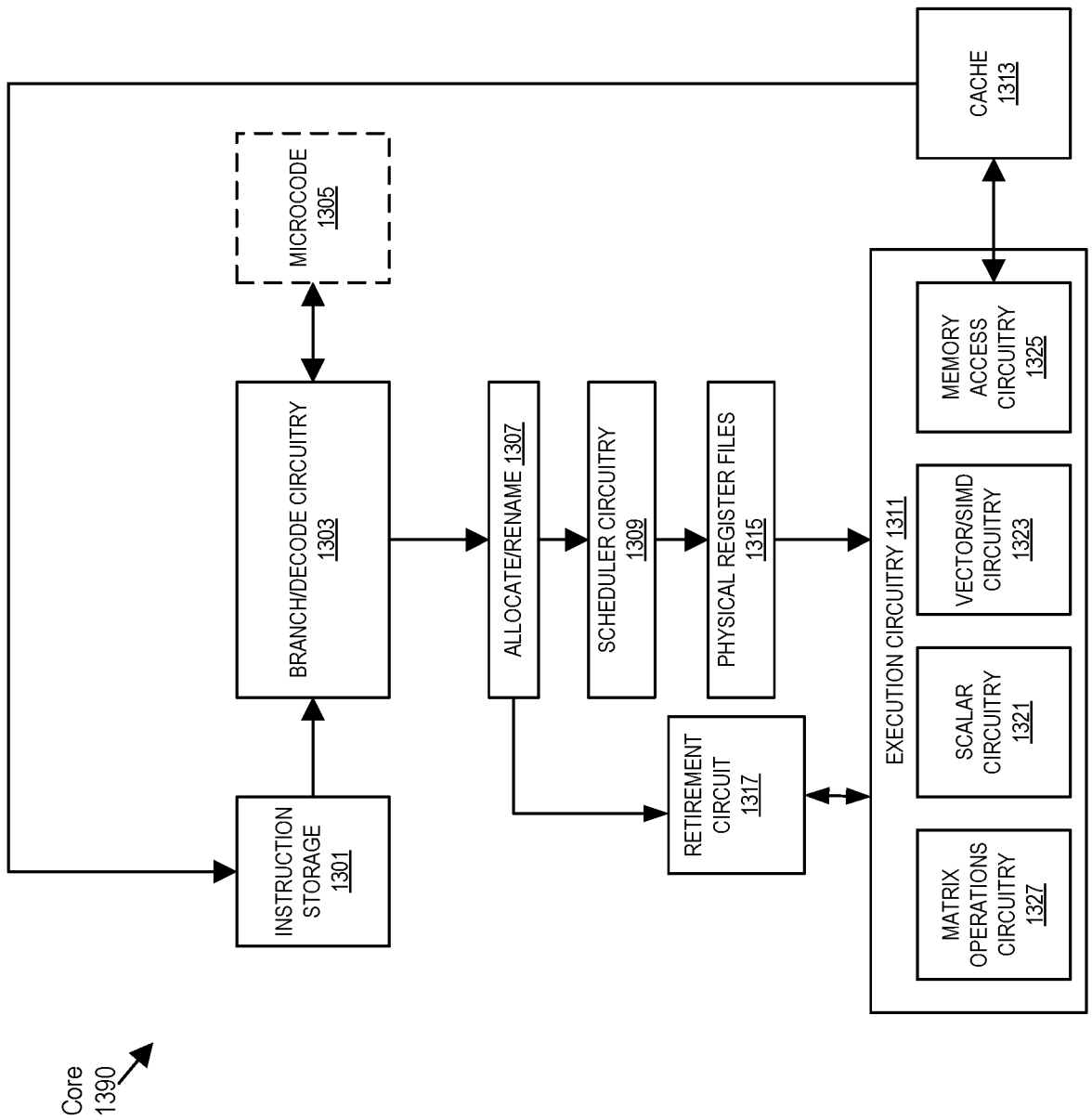
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 is a set of one or more execution circuits, including scalar circuitry 1321, vector/SIMD circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
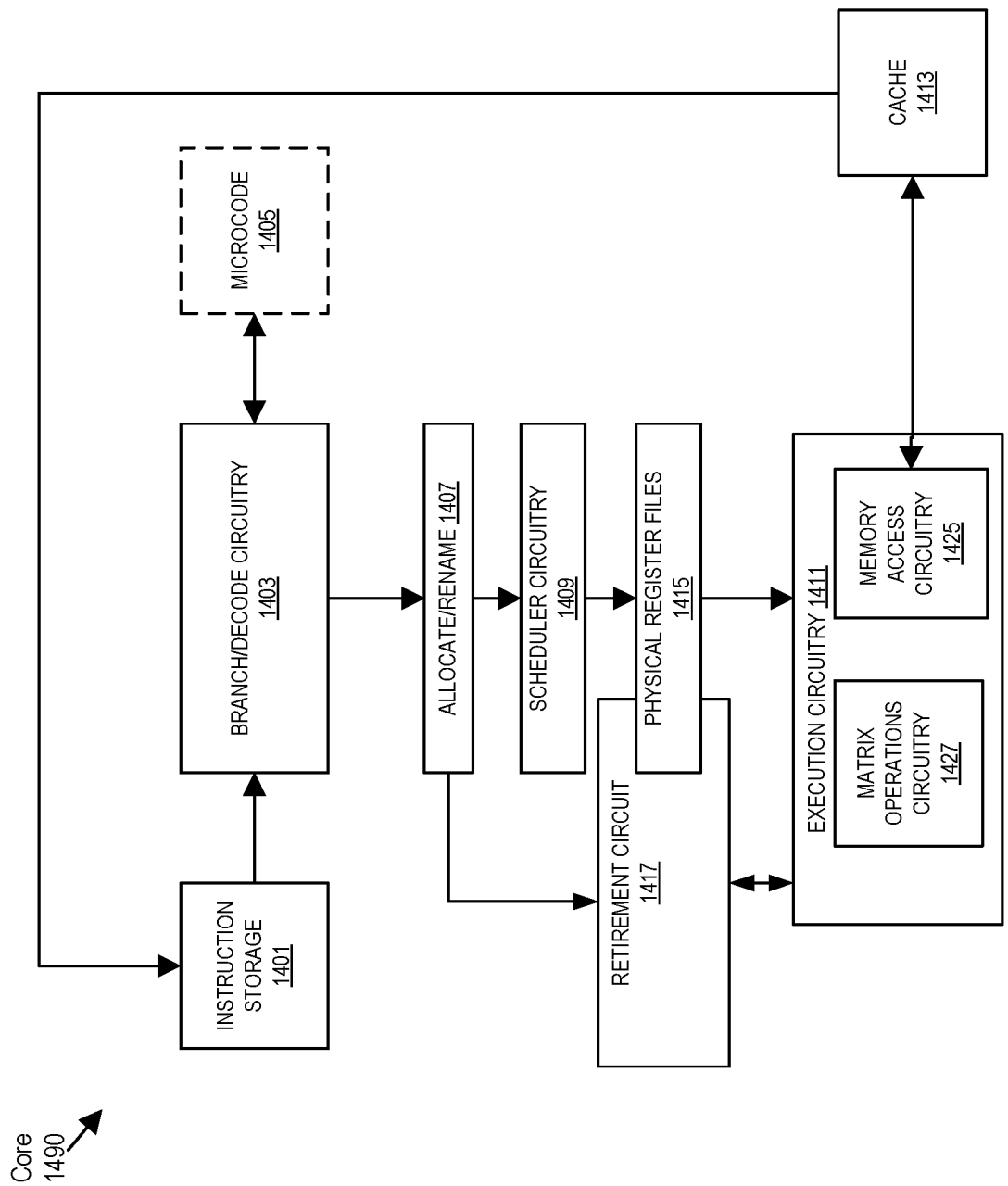
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to allocate/rename 1407 circuitry which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general-purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuitry 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425 to access cache 1413. The execution circuits 1427 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the allocate/rename 1407 circuitry performs an allocation stage and renaming stage; 4) the scheduler circuitry 1409 performs a schedule stage; 5) physical register file(s) (coupled to, or included in, the scheduler circuitry 1409 and allocate/rename 1407 circuitry and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T*B^T=(BA)^T$ where superscript T means transform. Reading column major data as row major data results in the matrix looking like the transform matrix.

In some embodiments, row-major semantics are utilized in hardware, and column major data is to swap the operand order with the result being transforms of matrix, but for subsequent column-major reads from memory it is the correct, non-transformd matrix.

For example, if there are two column-major matrices to multiply:

$$\begin{matrix} ab \\ cd \\ ef \end{matrix} * \begin{matrix} gik \\ hjl \end{matrix} = \begin{matrix} ag+bh & ai+bj & ak+bl \\ cg+dh & ci+dj & ck+dl \\ eg+fh & ei+fj & ek+fl \end{matrix}$$
$$(3\times 2) \quad (2\times 3) \quad\quad (3\times 3)$$

The input matrices would be stored in linear memory (column-major) as:
acebdf
and
ghijkl.

Reading those matrices as row-major with dimensions 2×3 and 3×2, they would appear as:

$$\begin{matrix} ace \\ bdf \end{matrix} \text{ and } \begin{matrix} gh \\ ij \\ kl \end{matrix}$$

Swapping the order and matrix multiplying:

$$\begin{matrix} gh \\ ij \\ kl \end{matrix} * \begin{matrix} ace \\ bdf \end{matrix} = \begin{matrix} ag+bh & cg+dh & eg+fh \\ ai+bj & ci+dj & ei+fj \\ ak+bl & ck+dl & ek+fl \end{matrix}$$

The transform matrix is out and can then be stored in in row-major order:

$$ag+bh \; cg+dh \; eg+fh \; ai+bj \; ci+dj \; ei+fj \; ak+bl \; ck+dl \; ek+fl$$

and used in subsequent column major computations, it is the correct un-transformed matrix:

$$\begin{matrix} ag+bh & ai+bj & ak+bl \\ cg+dh & ci+dj & ck+dl \\ eg+fh & ei+fj & ek+fl \end{matrix}$$

Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the matrix A 1603 (tmm2) is re-used twice as it multiplied by two tiles from matrix B 1605. Pointers to load a new A matrix (tile) and two new B matrices (tiles) from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
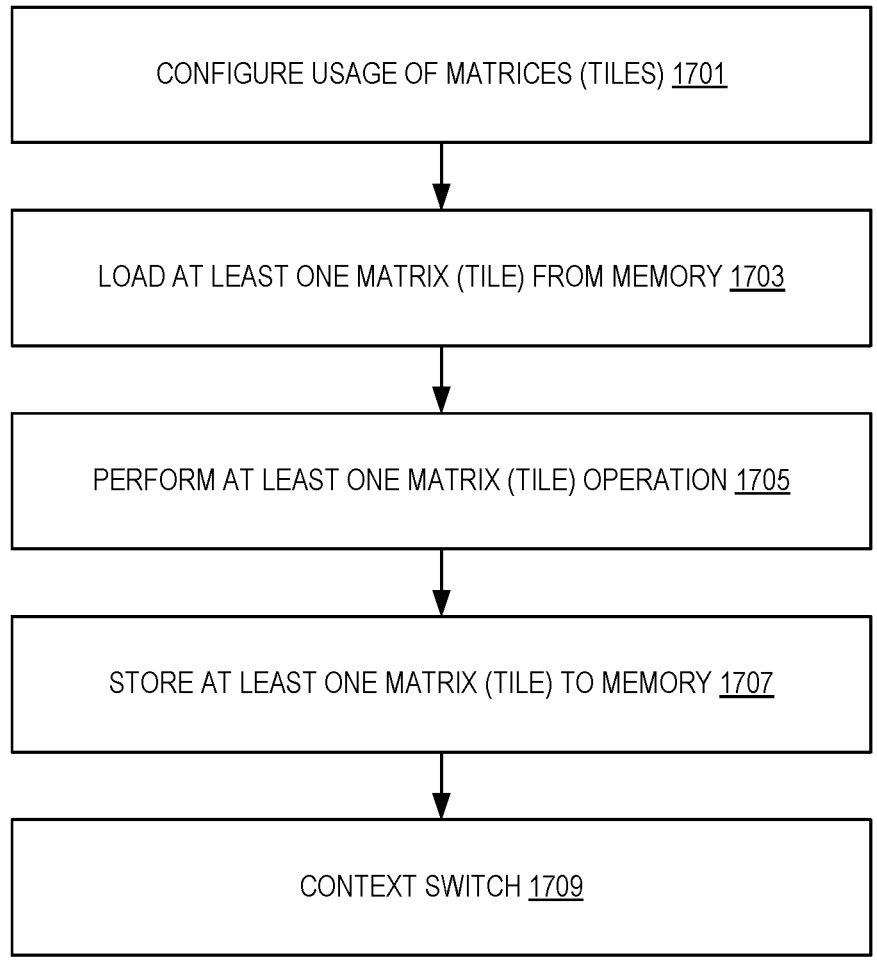
FIG. 17 illustrates an embodiment a method of usage of matrices (tiles).

FIG. 17 illustrates an embodiment of usage of matrices (tiles). At 1701, tile usage is configured. For example, a TILECONFIG instruction is executed to configure tile usage including setting a number of rows and columns per tile. Typically, at least one matrix (tile) is loaded from memory at 1703. At least one matrix (tile) operation is performed at 1705 using the matrices (tiles). At 1707, at least one matrix (tile) is stored out to memory and a context switch can occur at 1709.

Exemplary Configuration

Tile Configuration Hardware Support

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L×N) will typically not work if M and L are not the same.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

Tile Usage Configuration

Figure 18:
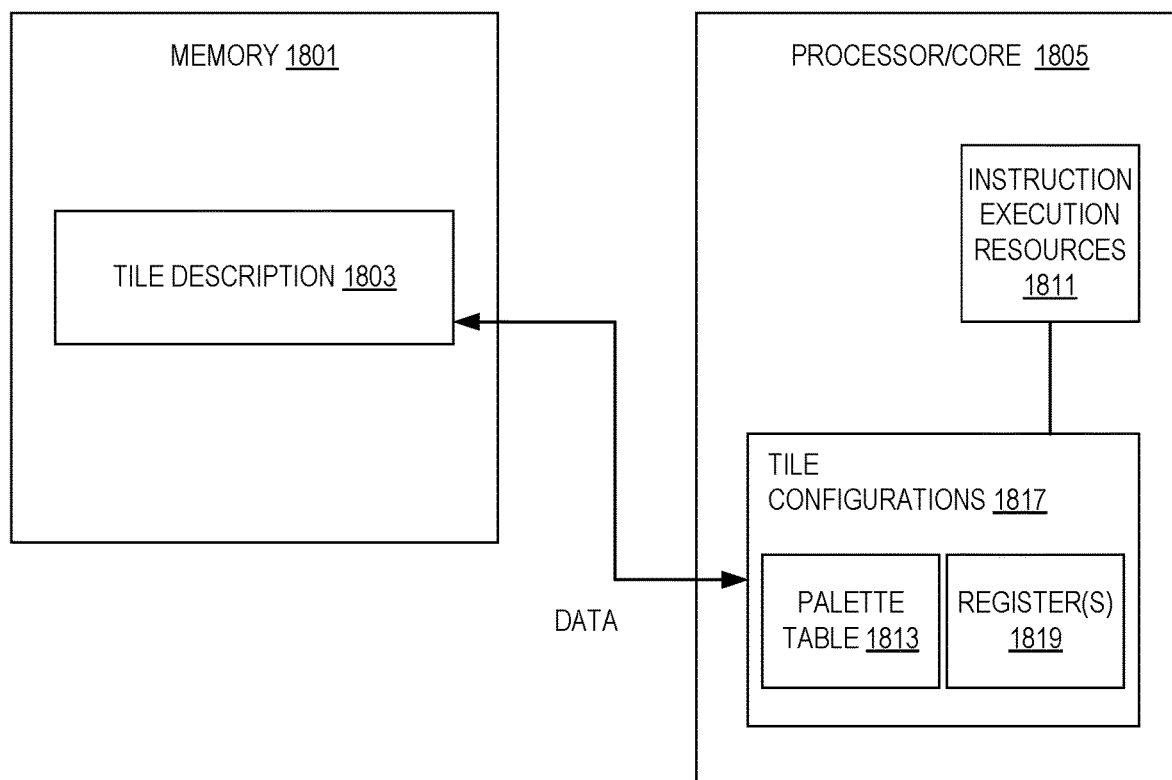
FIG. 18 illustrates support for configuration of the usage of tiles according to an embodiment.

FIG. 18 illustrates support for configuration of the usage of tiles according to an embodiment. A memory 1801 contains the tile description 1803 of the matrices (tiles) to be supported.

Instruction execution resources 1811 of a processor/core 1805 stores aspects of a tile description 1803 into tile configurations 1817. The tile configurations 1817 include palette table 1813 to detail what tiles for a palette are configured (the number of rows and columns in each tile) and a marking that matrix support is in use. In particular, instruction execution resources 1811 are configured to use tiles as specified by the tile configurations 1817. The instruction execution resources 1811 may also include a machine specific register or configuration register to indicate tile usage. Additional values such as in-use and start values are also set. The tile configurations 1817 utilize register(s) 1819 to store tile usage and configuration information.

FIG. 19 illustrates an embodiment of a description of the matrices (tiles) to be supported. This is the description that is to be stored upon an execution of a STTILECFG instruction. In this example, each field is a byte. In byte [0], a palette ID 1901 is stored. The palette ID is used to index a palette table 1813 which stores, per palette ID, a number of bytes in a tile, and bytes per row of the tiles that are associated with this ID as defined by the configuration.

Byte 1 stores a value to be stored in a "startRow" register 1903 and byte 2 stores a value to be stored in a register, startP 1905. To support restarting instructions after these events, the instructions store information these registers. To support restarting instructions after break events such as those detailed above, the instructions store information in these registers. The startRow value indicates the row that should be used for restart. The startP value indicates the position within the row for store operations when pairs are used and, in some embodiments, indicates the lower half of the row (in the lower tile of a pair) or higher half of the row (in the higher tile of a pair). Generally, the position in the row (the column) is not needed.

With the exception of TILECONFIG and STTILECFG, successfully executing matrix (tile) instructions will set both startRow and startP to zero.

Any time an interrupted matrix (tile) instruction is not restarted, it is the responsibility of software to zero the startRow and startP values. For example, unmasked floating point exception handlers might decide to finish the operation in software and change the program counter value to another instruction, usually the next instruction. In this case the software exception handler must zero the startRow and startP values in the exception presented to it by the operating system before resuming the program. The operating system will subsequently reload those values using a restore instruction.

Byte 3 stores an indication of pairs (1b per tile) of tiles 1907.

Bytes 16-17 store the number of rows 1913 and columns 1915 for tile 0, bytes 18-19 store the number of rows and columns for tile 1, etc. In other words, each 2-byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to an initial state with 0 rows, 0 columns.

Finally, the configuration in memory typically ends with an ending delineation such as all zeros for several consecutive bytes.

Exemplary Tile and Tile Configuration Storage

Figure 20A:
FIGS. 20(A)-(D) illustrate examples of register(s).

FIGS. 20(A)-(D) illustrate examples of register(s) 1819. FIG. 20(A) illustrates a plurality of registers 1819. As shown each tile (TMM0 2001 . . . TMMN 2003) has a separate register with each register storing a row and column size for that particular tile. StartP 2011 and StartRow 2013 are stored in separate registers. One or more status registers 2015 are set (e.g., TILES_CONFIGURED=1) to indicate tiles are configured for use.

Figure 20B:
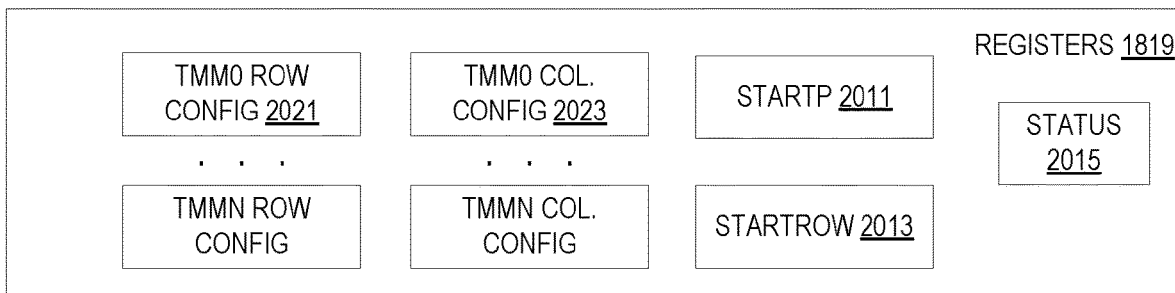

FIG. 20(B) illustrates a plurality of registers 1819. As shown each tile has separate registers for its rows and columns. For example, TMM0 rows configuration 2021, TMM0 columns configuration 2023, StartP 2011 and StartRow 2013 are stored in separate registers. One or more status registers 2015 are set (e.g., TILES_CONFIGURED=1) to indicate tiles are configured for use.

Figure 20C:
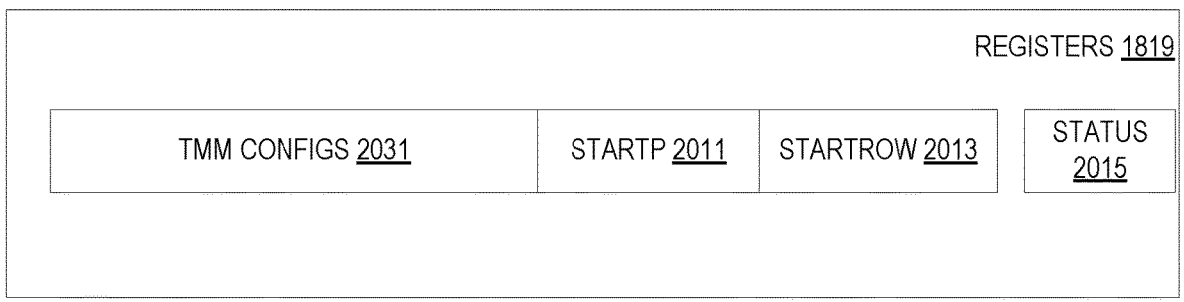

FIG. 20(C) illustrates a single register 1819. As shown, this register stores tile configurations (rows and columns per tile) 2031, StartP 2011, and StartRow 2013 are stored in single register as packed data registers. One or more status registers 2015 are set (e.g., TILES_CONFIGURED=1) to indicate tiles are configured for use.

Figure 20D:

FIG. 20(D) illustrates a plurality of registers 1819. As shown, a single register stores tile configuration (rows and columns per tile) 2031. StartP and StartRow are stored in separate registers 2011 and 2013. One or more status registers 2015 are set (e.g., TILES_CONFIGURED=1) to indicate tiles are configured for use.

Other combinations are contemplated such as combining the start registers into a single register where they are shown separately, etc.

Tile Alignment

Figure 21:
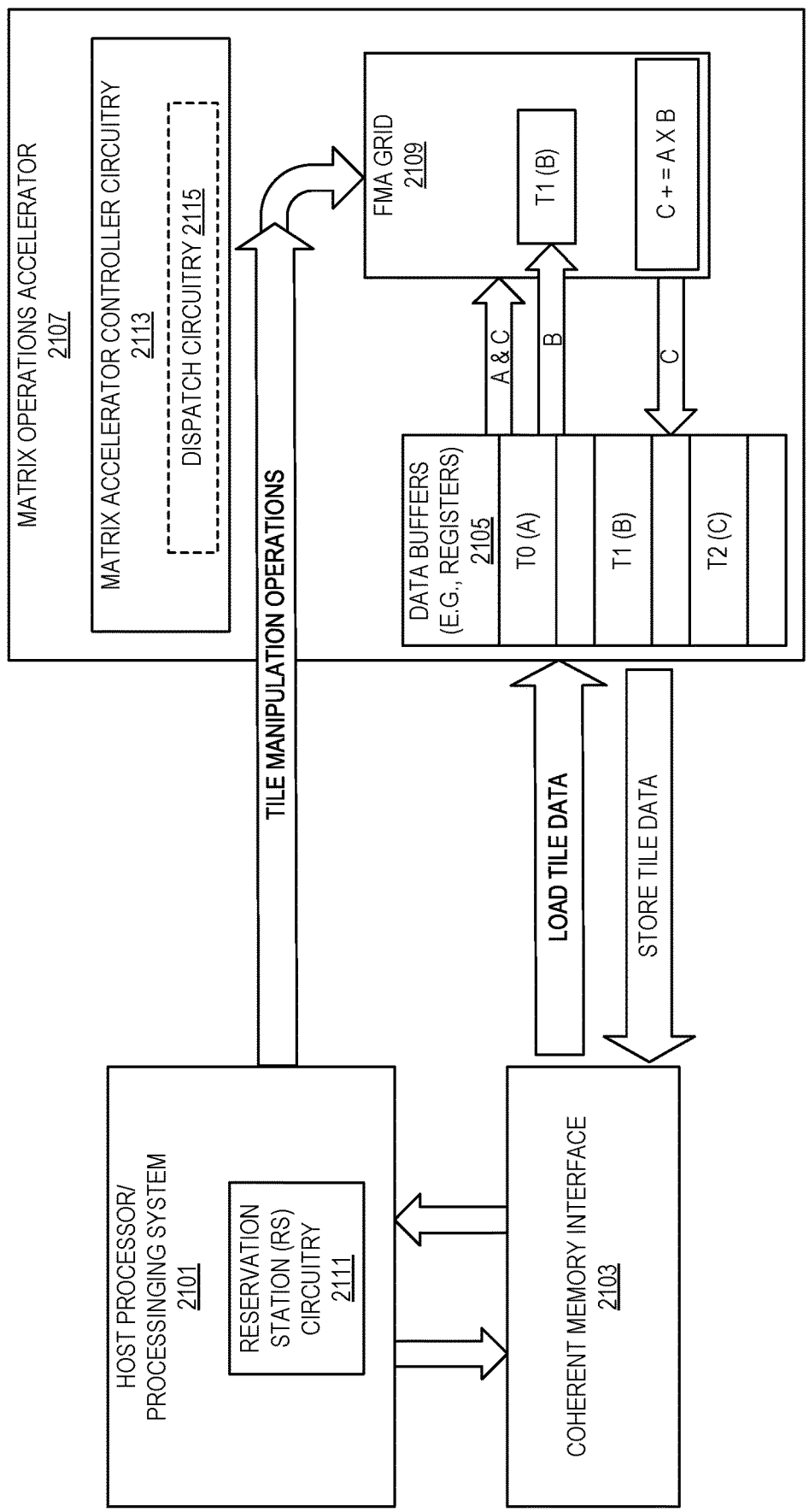
FIG. 21 illustrates an embodiment of a system utilizing a matrix (tile) operations accelerator according to embodiments of the disclosure.

FIG. 21 illustrates an embodiment of a system utilizing a matrix (e.g., tile) operations accelerator 2107 according to embodiments of the disclosure. In certain embodiments, a host processor/processing system 2101 (for example, a hardware processor core, e.g., processor core 3990 in FIG. 39B) communicates commands (e.g., matrix manipulation operations such as arithmetic or matrix manipulation operations, load, and/or store operations) to a matrix operations accelerator 2107. However, this is shown this way for discussion purposes only. As detailed herein, accelerator 2107 may be a part of a processing core. Commands that are tile manipulation operator instructions may refer to tiles as register-register ("reg-reg") or register-memory ("reg-mem") format. Other commands such as TILESTORE, TILELOAD, TILECONFIG, etc., do not perform data operations on a tile (e.g., within a matrix operations accelerator) in certain embodiments. Commands may be decoded instructions (e.g., micro-operations) or macro-instructions for the accelerator 2107 to handle. In one embodiment, a hardware processor core sends micro-ops to matrix (tile) operations accelerator 2107 in response to a matrix operations instruction being executed by the hardware processor core.

In one embodiment, reservation station (RS) circuitry 2111 sends commands (e.g., micro-ops) to matrix operations accelerator 2107. In certain embodiments, matrix operations accelerator 2107 is a tile matrix unit (TMU). In certain embodiments, matrix operations accelerator 2107 includes a matrix accelerator controller circuitry 2113. In one embodiment, matrix accelerator controller (e.g., circuitry 2113) is to control the operations and flow of data in, out, and/or within matrix operations accelerator 2107. Matrix operations accelerator 2107 (e.g., matrix accelerator controller circuitry 2113) may include dispatch circuitry 2115, for example, to control the dispatching of received requests (e.g., commands) from host processor/processing system 2101 to one or more components of the matrix operations accelerator 2107.

Depicted matrix operations accelerator 2107 includes data buffers (e.g., registers) 2105. In certain embodiments, data buffers (e.g., registers) 2105 are configurable to store a respective matrix, for example, into a first plurality of registers (e.g., tile) that represents a first two-dimensional matrix (e.g., tile marked as T0 storing matrix A in storage 2105), a second two-dimensional matrix (e.g., tile marked as T1 storing matrix B in storage 2105), a third two-dimensional matrix (e.g., tile marked as T3 storing matrix C in storage 2105), etc. System (e.g., host processor/processing system 2101) may include an (e.g., coherent) memory interface 2103 (e.g., data cache unit) to send and receive data (e.g., in contrast to commands) between host processor/processing system 2101 (e.g., as an Out of Order (OoO) core) and matrix operations accelerator 2107.

In certain embodiments, matrix operations accelerator 2107 utilize a grid of processing elements 2109 (e.g., fused multiply add (FMA) circuits) to perform operations. In one embodiment, dispatch circuitry 2115 controls the sending of data (e.g., one or more values from a tile) from data buffers 2105 (e.g., registers forming a tile) to the grid of processing elements 2109. In certain embodiments, the grid of processing elements 2109 is a two-dimensional grid of processing elements, e.g., two-dimensional grid of FMAs in FIG. 6.

As shown in FIG. 21, certain embodiments herein utilize a (e.g., coherent) memory interface (e.g., memory interface 2103 in FIG. 21) to transfer data between memory (e.g., cache) and/or host processing system 2101 (e.g., host processor) and matrix operations accelerator (e.g., matrix operations accelerator 2107, for example, the data buffers 2105 (e.g., registers forming a tile) (e.g., tile registers) thereof). However, in certain embodiments, it may be desirable to allow (e.g., via one or more instructions) access (e.g., direct access) to the data buffers 2105 (e.g., registers forming a tile). In certain embodiments, a programmer of code for a processor is limited to the instruction set architecture (ISA) of that processor. Certain embodiments herein provide an ISA that includes one or more (e.g., macro) instructions that allow movement of data (e.g., additionally or alternatively to utilizing an indirect path, such as, but not limited to, the path including memory interface 2103) between one or more registers of a processor and the data buffers (e.g., registers forming a tile) of a matrix operations accelerator, for example, by using one or more direct paths (e.g., load to tile connection path 2229 and/or store from tile connection path 2231 in FIG. 22) between one or more registers of a processor and the data buffers (e.g., registers forming a tile) of a matrix operations accelerator.

Certain embodiments herein are directed to instructions for moving data between tiles and packed data registers (e.g., vector registers having a plurality of elements) of a processor core and/or data buffers (e.g., registers forming a tile) of a matrix operations accelerator.

Certain embodiments herein provide an ISA that includes one or more (e.g., macro) instructions that allow alignment of elements and/or rows/columns of elements in data buffers (e.g., registers forming a tile) of a matrix operations accelerator, e.g., without moving the data elements within the data buffers (e.g., registers forming a tile) of a matrix operations accelerator.

Certain workloads (e.g., artificial intelligence workloads) involve both matrix compute (e.g., multiplication) and elementwise compute. One technical problem is how to utilize a matrix operations accelerator (e.g., matrix multiplication hardware thereof) that has dedicated tile registers (e.g., AMX) with general purpose single-instruction, multiple data (SIMD) hardware that uses vector registers (e.g., AVX, such as, but not limited to AVX512). Embodiments herein provide a solution to this problem by utilizing one or more (e.g., macro) instructions that allow movement of data (e.g., additionally or alternatively to utilizing an indirect path, such as, but not limited to, the path including memory interface 2103) between one or more registers of a processor and the data buffers (e.g., registers forming a tile) of a matrix operations accelerator (e.g., execution circuitry). In certain embodiments, a coupling (e.g., direct path) between (e.g., 2D) tiles and (e.g., vector) registers utilized by these instruction(s) is one or more wires or electrical conducting channels within a substrate (e.g., silicon).

Figure 22:
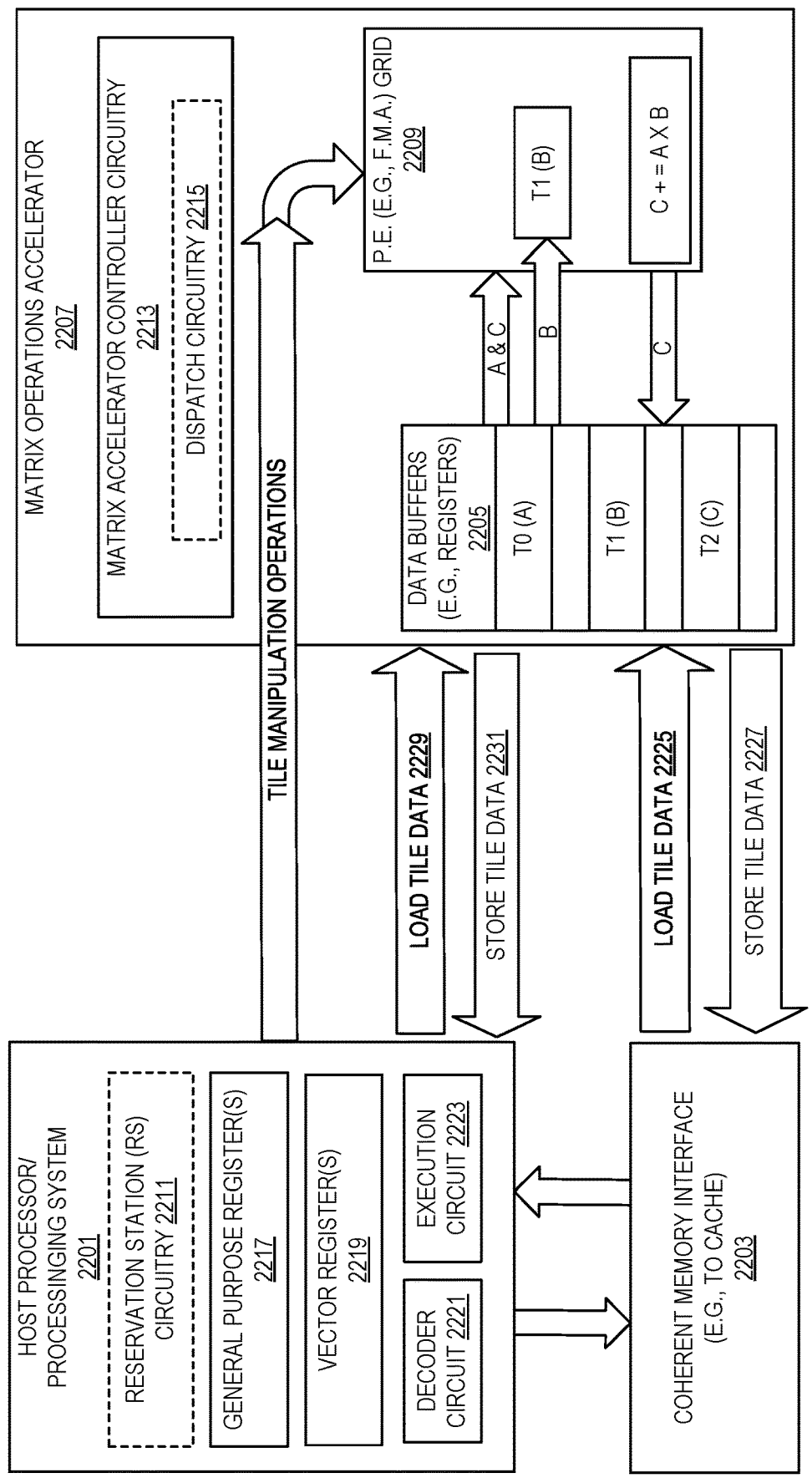
FIG. 22 illustrates a system comprising a matrix (tile) operations accelerator that utilizes one or more direct paths for loading data into a tile from a vector register and/or storing data from a tile into a vector register according to embodiments of the disclosure.

FIG. 22 illustrates an embodiment of a system comprising a matrix (tile) operations accelerator 2207 that utilizes one or more direct paths (e.g., load to tile connection path 2229 and/or store from tile connection path 2231) for loading data into a tile from a vector register 2219 and/or storing data from a tile 2205 into a vector register 2219 according to embodiments of the disclosure. In certain embodiments, a host processor/processing system 2201 (for example, a hardware processor core, e.g., processor core 3990 in FIG. 39B) communicates commands (e.g., matrix manipulation operations such as arithmetic or matrix manipulation operations, load, and/or store operations) to a matrix operations accelerator 2207. However, this is shown this way for discussion purposes only. As detailed herein, accelerator 2207 may be a part of a processing core. Commands that are tile manipulation operator instructions may refer to tiles as register-register ("reg-reg") or register-memory ("reg-mem") format. Other commands such as TILESTORE, TILELOAD, TILECONFIG, etc., do not perform data operations on a tile in certain embodiments. Commands may be decoded instructions (e.g., micro-operations) or macro-instructions for the accelerator 2207 to handle. In one embodiment, a hardware processor core sends micro-ops to matrix (tile) operations accelerator 2207 in response to a matrix operations instruction being executed by the hardware processor core.

In one embodiment, reservation station (RS) circuitry 2211 sends commands (e.g., micro-ops) to matrix operations accelerator 2207. In certain embodiments, matrix operations accelerator 2207 is a tile matrix unit (TMU). In certain embodiments, matrix operations accelerator 2207 includes a matrix accelerator controller circuitry 2213. In one embodiment, matrix accelerator controller (e.g., circuitry 2213) is to control the operations and flow of data in, out, and/or within matrix operations accelerator 2207. Matrix operations accelerator 2207 (e.g., matrix accelerator controller circuitry 2213) may include dispatch circuitry 2215, for example, to control the dispatching of received requests (e.g., commands) from host processor/processing system 2201 to one or more components of the matrix operations accelerator 2207.

In certain embodiments, matrix operations accelerator 2207 utilize a grid of processing elements 2209 (e.g., fused multiply add (FMA) circuits) to perform operations. In one embodiment, dispatch circuitry 2215 controls the sending of data (e.g., one or more values from a tile) from data buffers 2205 (e.g., registers forming a tile) to the grid of processing elements 2209. In certain embodiments, the grid of processing elements 2209 is a two-dimensional grid of processing elements, e.g., two-dimensional grid of FMAs in FIG. 6.

Depicted matrix operations accelerator 2207 includes data buffers (e.g., registers) 2205. In certain embodiments, data buffers (e.g., registers) 2205 are configurable to store a respective matrix, for example, into a first plurality of registers (e.g., tile) that represents a first two-dimensional matrix (e.g., tile marked as T0 storing matrix A in storage 2205), a second two-dimensional matrix (e.g., tile marked as T1 storing matrix B in storage 2205), a third two-dimensional matrix (e.g., tile marked as T3 storing matrix C in storage 2205), etc. System (e.g., host processor/processing system 2201) may include an (e.g., coherent) memory interface 2203 (e.g., data cache unit) to send and receive data (e.g., in contrast to commands) between host processor/processing system 2201 (e.g., as an Out of Order (OoO) core) and matrix operations accelerator 2207 (e.g., including load to tile connection path 2225 from memory interface 2203 and/or store from tile connection path 2227 from memory interface 2203).

As shown in FIG. 22, certain embodiments herein utilize a (e.g., coherent) memory interface (e.g., memory interface 2203 in FIG. 22) to transfer data between memory (e.g., cache) and/or host processor 2201 (e.g., host processor 2201) and matrix operations accelerator (e.g., matrix operations accelerator 2207, for example, the data buffers 2205 (e.g., registers forming a tile) (e.g., tile registers) thereof). However, in certain embodiments, it may be desirable to allow (e.g., via one or more instructions) access (e.g., direct access) to the data buffers 2205 (e.g., registers forming a tile). In certain embodiments, a programmer of code for a processor is limited to the instruction set architecture (ISA) of that processor. Thus, certain embodiments herein provide an ISA that includes one or more (e.g., macro) instructions that allow movement of data (e.g., additionally or alternatively to utilizing an indirect path, such as, but not limited to, the path including memory interface 2203) between one or more registers of a processor and the data buffers (e.g., registers forming a tile) of a matrix operations accelerator. Certain embodiments herein are directed to instructions for moving data between tiles and packed data registers (e.g., vector registers having a plurality of elements), for example, between vector register(s) 2219 and data buffers 2205 (e.g., registers forming a tile). Embodiments herein provide an ISA that includes one or more instructions that utilizes one or more direct paths (e.g., load to tile connection path 2229 and/or store from tile connection path 2231) for loading data into a tile from a vector register 2219 and/or storing data from a tile (e.g., in data buffers 2205) into a vector register 2219. Host processor may include (e.g., scalar) general purpose registers 2217, e.g., separate from any registers used for 128 bit vector instructions (e.g., "SSE" instructions/ registers), (e.g., 256 bit or 512 bit) vector instructions with 3 operand instruction format (e.g., "AVX" instructions/ registers), and/or matrix instructions (e.g., "matrix accelerator" instructions/tiles).

The instructions disclosed herein are improvements to the functioning of a processor (e.g., of a computer) itself. Instruction decode circuitry (e.g., a decoder 2221) not having such an instruction as a part of its instruction set would not decode as discussed herein. An execution circuit (e.g., execution circuit 2223) not having such an instruction as a part of its instruction set would not execute as discussed herein. For example, a single instruction that, when a processor decodes the single instruction into a decoded instruction and that decoded instruction is executed by the processor, causes a store of one or more elements from the plurality of registers that represents the two-dimensional matrix into the vector register by a coupling of the hardware processor core to the matrix operations accelerator circuit that is separate from the coupling to a memory interface (e.g., or via a cache). For example, a single instruction that, when a processor decodes the single instruction into a decoded instruction and that decoded instruction is executed by the processor, causes a store of one or more elements from the vector register into the plurality of registers that represents the two-dimensional matrix by a coupling of the hardware processor core to the matrix operations accelerator circuit that is separate from the coupling to a memory interface (e.g., or via a cache). For example, a single instruction that, when a processor decodes the single instruction into a decoded instruction and that decoded instruction is executed by the processor, loads elements into a plurality of registers that represents a two-dimensional matrix from a location in a cache by a coupling to the cache, and loads one or more elements from a vector register into the plurality of registers that represents the two-dimensional matrix by a coupling of a hardware processor core to a matrix operations accelerator circuit that is separate from the coupling to the cache. For example, a single instruction that, when a processor decodes the single instruction into a decoded instruction and that decoded instruction is executed by the processor, cause a third two-dimensional matrix to be logically formed for input into a two-dimensional grid of processing elements from (i) a first two-dimensional matrix and (ii) a second two-dimensional matrix without moving data elements within a first plurality of registers that represents the first two-dimensional matrix coupled to the two-dimensional grid of processing elements and a second plurality of registers that represents the second two-dimensional matrix coupled to the two-dimensional grid of processing elements. For example, a single instruction that, when a processor decodes the single instruction into a decoded instruction and that decoded instruction is executed by the processor, causes a matrix operations accelerator circuit to generate a third two-dimensional matrix from a proper subset of elements of a row or a column of a first two-dimensional matrix and a proper subset of elements of a row or a column of a second two-dimensional matrix and store the third two-dimensional matrix at a destination in the matrix operations accelerator circuit.

In certain embodiments, a memory interface operates under a cache coherency protocol, for example, with the additional time utilized to maintain that cache coherency (e.g., setting bits, performing snoops, etc.) being avoided by utilizing a coupling between one or more registers of a processor and data buffers (e.g., registers forming a tile) of a matrix operations accelerator as discussed herein. For example, where cache (e.g., line) coherency may generally refer to each cache (e.g., cache memory) and/or other (e.g., system) memory in the coherence domain observing all modifications of that same cache data (e.g., a cache line, and more particularly, each instance of that cache line that is to contain the same data). For example, a modification may be said to be observed by a cache when any subsequent read would return the newly (e.g., current) written value. In certain embodiments, a cache controller (e.g., cache coherency controller) is included in a computing system to maintain cache coherency. In one embodiment, the cache controller is a cache controller circuit. Cache coherency may be maintained according to a cache coherence protocol, e.g., the four state modified (M), exclusive (E), shared (S), and invalid (I) (MESI) protocol or the five state modified (M), exclusive (E), shared (S), invalid (I), and forward (F) (MESIF) protocol. Cache controller(s) may provide, for multiple copies of a data item (e.g., stored in any memory), an update to other copies of the data item when one copy of that data item is changed, e.g., to ensure the data values of shared items (e.g., operands) are propagated throughout the computing system in a timely fashion.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Figure 23:
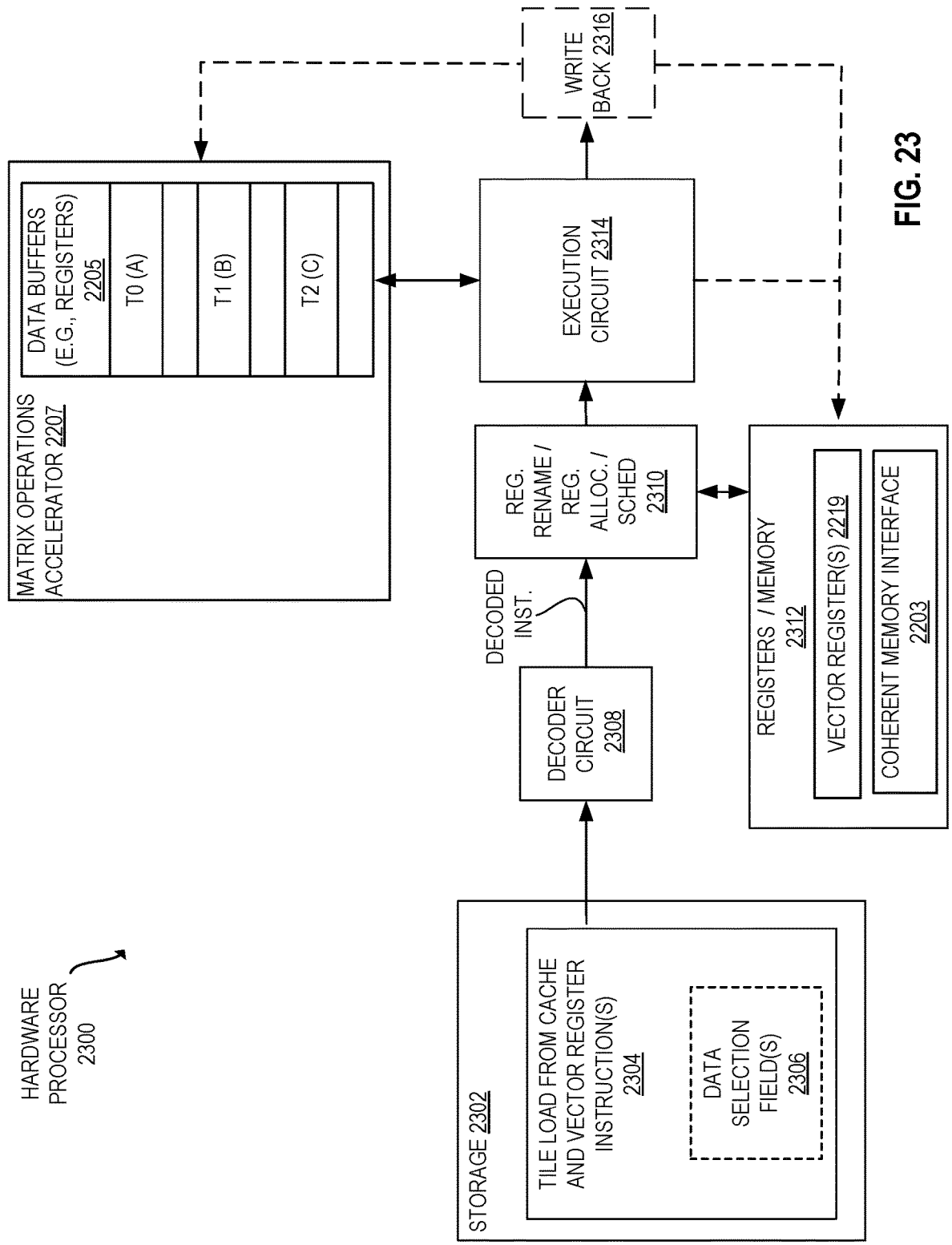
FIG. 23 illustrates a hardware processor coupled to storage that includes one or more "tile load from cache and vector register" instructions according to embodiments of the disclosure.

FIG. 23 illustrates a hardware processor 2300 coupled to storage 2302 that includes one or more "tile load from cache and vector register" instructions 2304 according to embodiments of the disclosure. The instructions 2304 may include one or more data selection fields (e.g., operands) that identify (e.g., all or a proper subset of elements of) vector register(s) 2219 and/or data buffers 2205 (e.g., registers forming a tile).

In certain embodiments, (e.g., where the processor/core supports out-of-order (OoO) execution), the processor includes a register rename/allocator circuit 2310 coupled to register file/memory circuit 2312 (e.g., unit) to allocate resources and perform register renaming on registers (e.g., registers associated with the initial sources and final destination of the instruction). In certain embodiments, (e.g., for out-of-order execution), the processor includes one or more scheduler circuits 2310 coupled to the decoder circuit 2308. The scheduler circuit(s) may schedule one or more operations associated with decoded instructions, including one or more operations decoded from "tile load from cache and vector register" instructions 2304, e.g., for execution on the execution circuit 2314.

As one example, a decoded "tile load from cache and vector register" instruction 2304 is to cause execution circuit 2314 to move data from coherent memory interface 2203 (e.g., a cache) into a tile of data buffers 2205 of matrix operations accelerator 2207 and move data (e.g., by overwriting certain data in the tile) from vector register(s) 2219 into the tile of data buffers 2205 of matrix operations accelerator 2207, e.g., without sending that data through a (e.g., cache coherent) memory interface.

In certain embodiments, a write back circuit 2316 is included to write back results of an instruction to a destination (e.g., write them to a register(s) 2219 and/or a tile of data buffers 2205), for example, so those results are visible within a processor (e.g., visible outside of the execution circuit that produced those results).

One or more of these components (e.g., decoder 2308, register rename/register allocator/scheduler 2310, execution circuit 2314, registers (e.g., register file)/memory 2312, or write back circuit 2316) may be in a single core of a hardware processor (e.g., and multiple cores each with an instance of these components).

Figure 24:
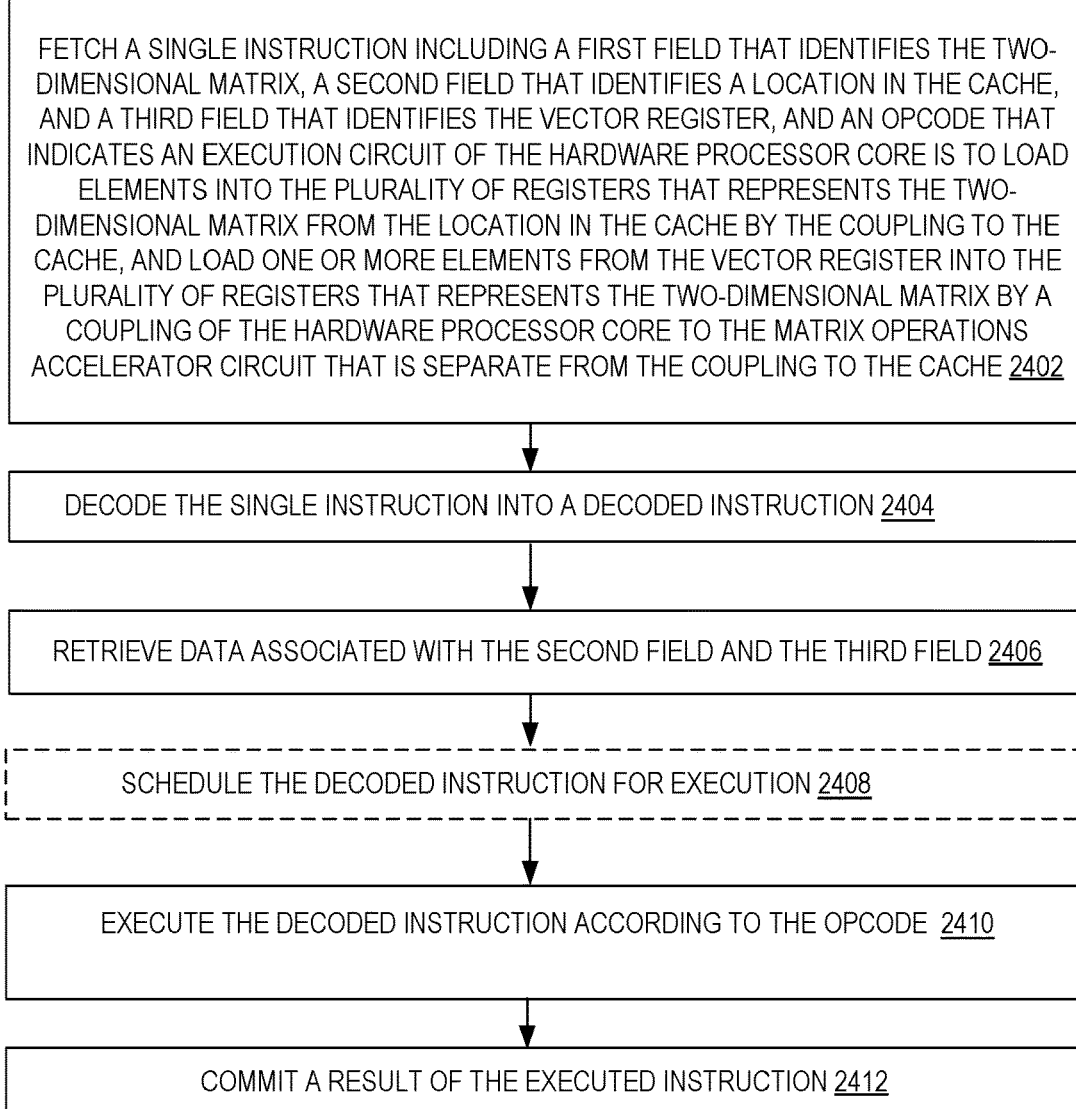
FIG. 24 illustrates a method of processing a "tile load from cache and vector register" instruction according to embodiments of the disclosure.

FIG. 24 illustrates a method 2400 of processing a "tile load from cache and vector register" instruction according to embodiments of the disclosure. A processor (e.g., or processor core) may perform method 2400, e.g., in response to receiving a request to execute an instruction from software. Depicted method 2400 includes processing a "tile load from cache and vector register" instruction by: fetch an instruction (e.g., including a first field that identifies the two-dimensional matrix, a second field that identifies a location in the cache, and a third field that identifies the vector register, and an opcode that indicates an execution circuit of the hardware processor core is to load elements into the plurality of registers that represents the two-dimensional matrix from the location in the cache by the coupling to the cache, and load one or more elements from the vector register into the plurality of registers that represents the two-dimensional matrix by a coupling of the hardware processor core to the matrix operations accelerator circuit that is separate from the coupling to the cache) 2402, decode the instruction into a decoded instruction 2404, retrieve data associated with the second field and the third field 2406, (optionally) schedule the decoded instruction for execution 2408, execute the decoded instruction according to the opcode 2410, and commit a result of the executed instruction 2412.

Embodiments herein includes instructions to move a (e.g., complete) row(s) or a (e.g., complete) column(s) (or a combination thereof) from a vector register into a tile. The row or column can be selected either by an immediate operand or by a general purpose (e.g., general purpose register 2217 in FIG. 22) or SIMD register (e.g., vector register 2219 in FIG. 22).

In certain embodiments, an instruction allows for the appending of data to a two-dimensional tile and/or replacing of certain data within a tile, e.g., to add a row or column of data from a vector register into a two-dimensional tile. In one embodiment, an instruction includes a first operand to identify a (e.g., destination) of a tile, a memory location (for example, using scaled index byte (SIB) addressing, e.g., where an index register serves as a stride indicator), and/or one or more registers (e.g., to use as a new row or column within the tile). In one embodiment, the format of an instruction is LoadRowTile having operands of: destination tile (e.g., T1), source vector register (e.g., ZMM), and memory address of other source data, e.g., an opcode corresponding to the mnemonic of LoadRowTile. In one embodiment, the format of an instruction is LoadColTile having operands of: destination tile (e.g., T1), source vector register (e.g., ZMM), and memory address of other source data, e.g., an opcode corresponding to the mnemonic of LoadColTile.

In one embodiment, the format of an instruction includes a field to identify what row (or column) of the tile is to be loaded with the data from the vector register, e.g., this field may be an immediate (e.g., an eight bit "imm8"). In one embodiment, the data from the vector register is added as a new row (or column) in the tile, e.g., at the end of the tile and remove the data that was the first row of the tile. In certain embodiments, an instruction does not require the loading of a tile (e.g., it is already loaded at this point) and could just replace a row (or column). In certain embodiments, an instruction utilizes the vector register as the starting register and a field of the instruction (e.g., an immediate) indicates how many consecutive vector registers to use as row (or column) replacements.

Figure 25:
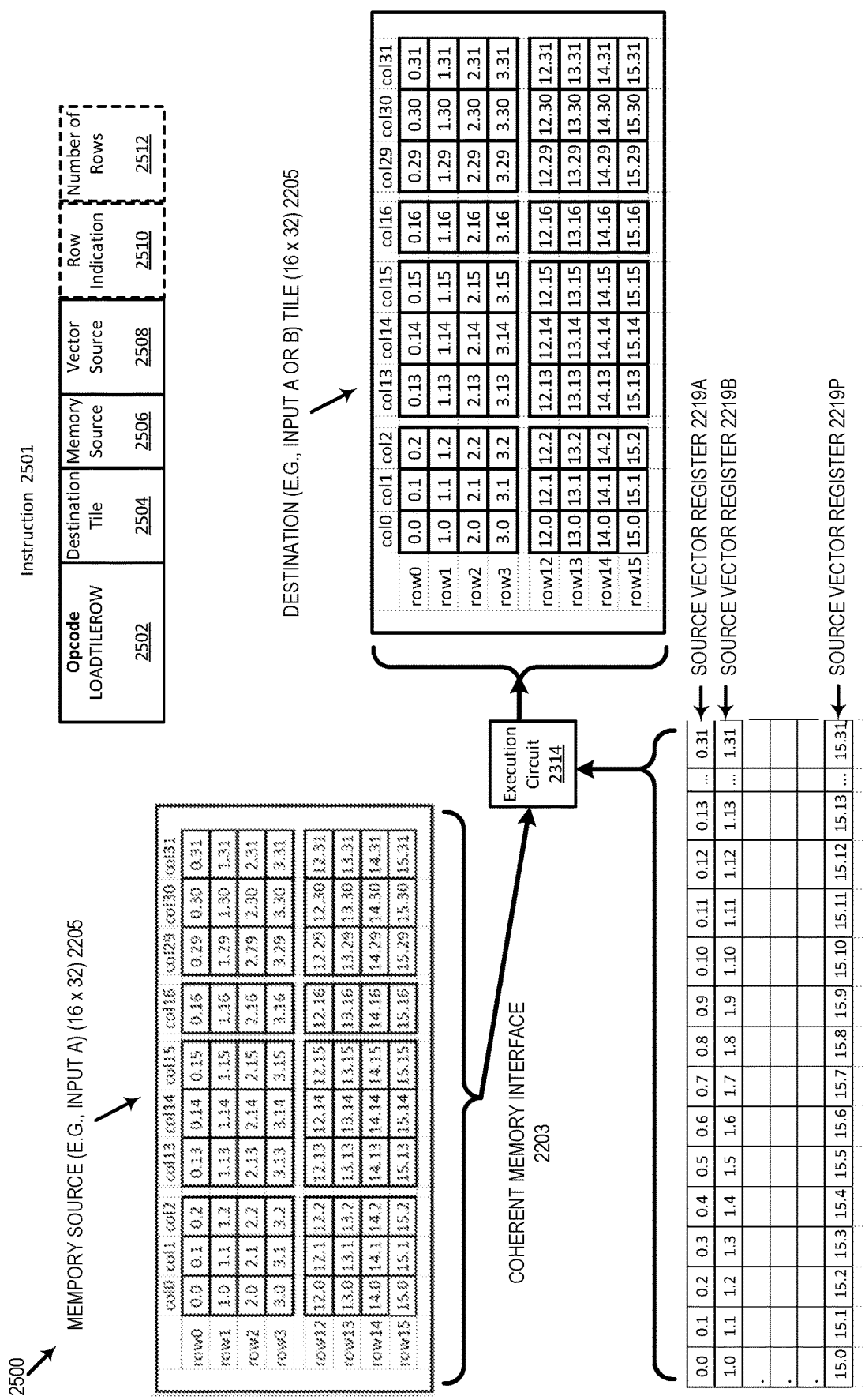
FIG. 25 is a block diagram illustrating use of a LOADTILEROW instruction according to embodiments of the disclosure.

FIG. 25 is a block diagram illustrating use of a LOAD-TILEROW instruction according to embodiments of the disclosure. As shown, instruction 2501 includes an opcode 2502 (e.g. LOADTILEROW), which indicates that the processor is to move (e.g., load) one or more elements (e.g., only complete rows) into tile 2205 (e.g., plurality of registers that represents the two-dimensional matrix) from a source vector register 2219, for example, by a coupling of the processor to the matrix operations accelerator circuit that is separate from a coupling to a memory (e.g., cache), a destination location field 2504 identifying the tile 2205, a memory source location field 2506 to source the (e.g., initial) source data, and a vector source field 2508 identifying the source vector register(s) 2219, (optionally) a row indication field 2510 identifying the particular row (e.g., within tile or initial source data) that is to receive the data from the vector register, and (optionally) a number of rows field 2512 to indicate the number of rows (e.g., 1, 2, 3, 4, etc.) of data that is to be loaded within the tile from the vector register(s).

Also shown is system 2500 for executing the LOADTILEROW instruction. The system includes specified memory source of data (e.g., a matrix) (e.g., from a cache via interface 2203), execution circuit 2314, and specified source vector register(s) 2219. It should be understood that a similar format may be utilized for column instead of row moves, e.g., with a mnemonic of LOADTILECOL (where COL refers to a column embodiment).

Figure 26:
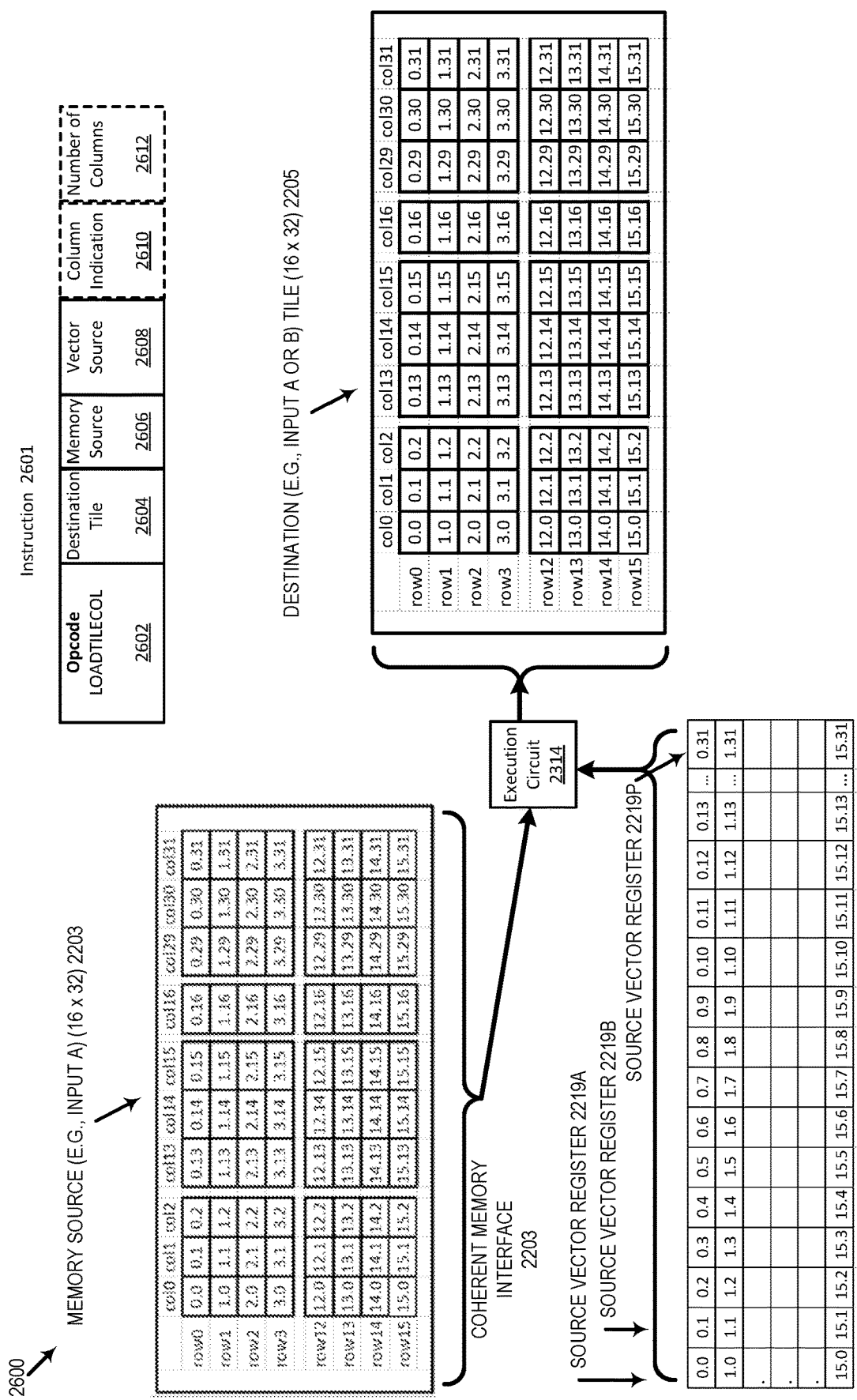
FIG. 26 is a block diagram illustrating use of a LOADTILECOL instruction according to embodiments of the disclosure.

FIG. 26 is a block diagram illustrating use of a LOAD-TILECOL instruction according to embodiments of the disclosure. As shown, instruction 2601 includes an opcode 2602 (e.g. LOADTILECOL), which indicates that the processor is to move (e.g., load) one or more elements (e.g., only complete columns) into tile 2205 (e.g., plurality of registers that represents the two-dimensional matrix) from a source vector register 2219, for example, by a coupling of the processor to the matrix operations accelerator circuit that is separate from a coupling to a memory (e.g., cache), a destination location field 2604 identifying the tile 2205, a memory source location field 2606 to source the (e.g., initial) source data, and a vector source field 2608 identifying the source column register(s) 2219, (optionally) a column (col.) indication field 2610 identifying the particular column (e.g., within tile or initial source data) that is to receive the data from the vector register, and (optionally) a number of columns field 2612 to indicate the number of columns (e.g., 1, 2, 3, 4, etc.) of data that is to be loaded within the tile from the vector register(s).

Also shown is system 2600 for executing the LOADTI-LECOL instruction. The system includes specified memory source of data (e.g., a matrix) (e.g., from a cache via interface 2203), execution circuit 2314, and specified source vector register(s) 2219.

In certain embodiments, if the requested number of rows (or columns) is above the number of rows (or columns) in the tile, execution of the instruction will fault (e.g., generate a fault indication, including, but not limited to, raising a flag). In certain embodiments, if the source vector register is narrower (e.g., has fewer elements) than the tile, execution of the instruction will fault. In certain embodiments, if the source vector register is narrower (e.g., has fewer elements) than the tile, execution of the instruction causes a write to destination) tile of zeros beyond the width defined for the vector register. In certain embodiments, if the source vector register is wider (e.g., has more elements) than the (e.g., column or row of the) tile, execution of the instruction will fault.

Figure 27:
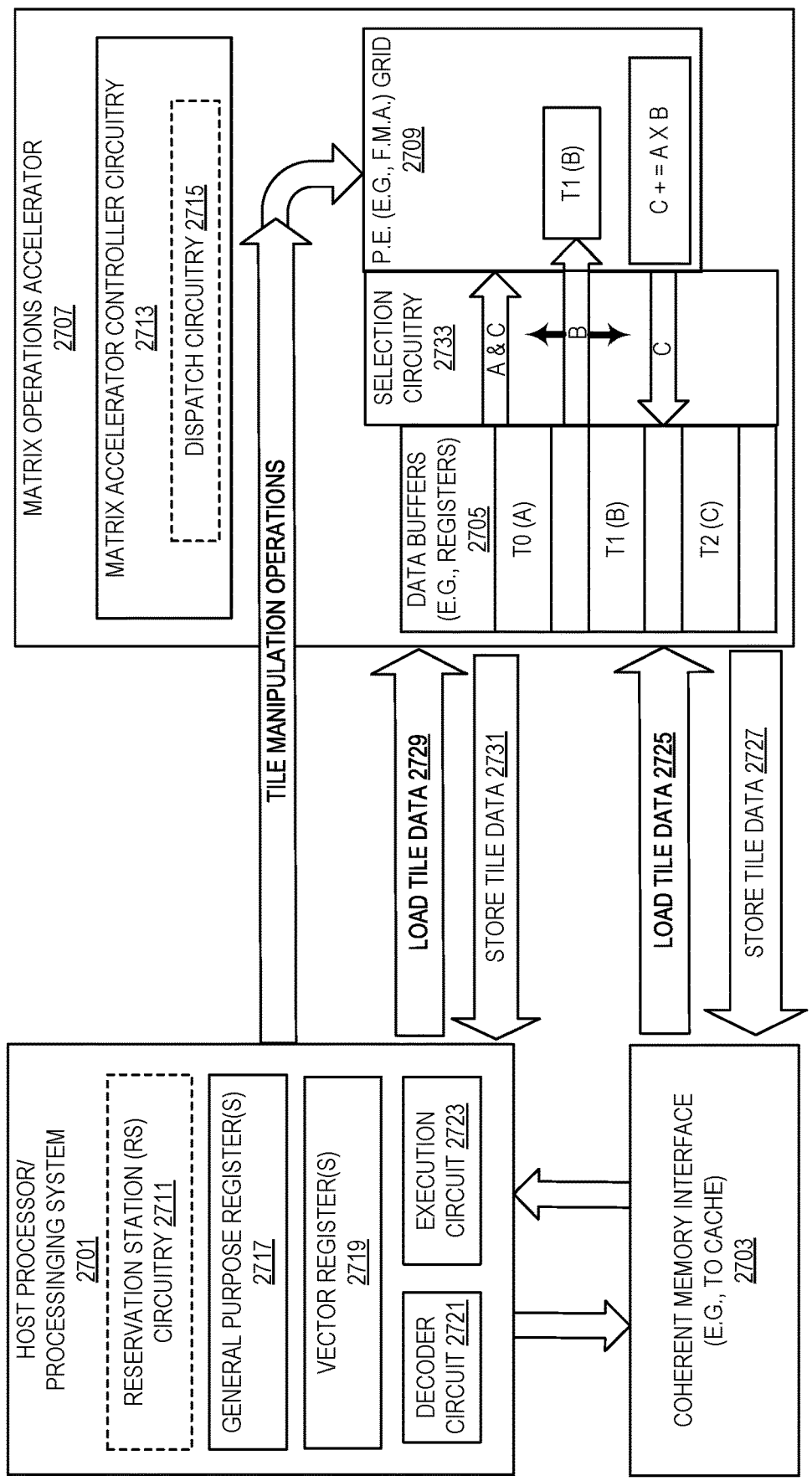
FIG. 27 illustrates a system comprising a matrix (tile) operations accelerator that utilizes selection circuitry to logically form a tile from two other pre-loaded tiles according to embodiments of the disclosure.

FIG. 27 illustrates a system comprising a matrix (tile) operations accelerator 2707 that utilizes selection circuitry 2733 to logically form a tile from two other pre-loaded tiles according to embodiments of the disclosure. In certain embodiments, selection circuitry 2377 allows matrix operations accelerator 2707 (e.g., PE grid 2709) to source a logical tile that is formed from two tiles that are already loaded into data buffers 2705 (e.g., registers forming a tile), for example, without using the time and/or resources to physically move any data elements within data buffers 2705. This may include logically changing what proper subset of elements of data buffers 2705 (e.g., registers forming a plurality of tiles) are referenced by a single logical tile name.

In certain embodiments, a host processor/processing system 2701 (for example, a hardware processor core, e.g., processor core 3990 in FIG. 39B) communicates commands (e.g., matrix manipulation operations such as arithmetic or matrix manipulation operations, load, and/or store operations) to a matrix operations accelerator 2707. However, this is shown this way for discussion purposes only. As detailed herein, accelerator 2707 may be a part of a processing core. Commands that are tile manipulation operator instructions may refer to tiles as register-register ("reg-reg") or register-memory ("reg-mem") format. Other commands such as TILESTORE, TILELOAD, TILECONFIG, etc., do not perform data operations on a tile in certain embodiments. Commands may be decoded instructions (e.g., micro-operations) or macro-instructions for the accelerator 2707 to handle. In one embodiment, a hardware processor core sends micro-ops to matrix (tile) operations accelerator 2707 in response to a matrix operations instruction being executed by the hardware processor core.

In one embodiment, reservation station (RS) circuitry 2711 sends commands (e.g., micro-ops) to matrix operations accelerator 2707. In certain embodiments, matrix operations accelerator 2707 is a tile matrix unit (TMU). In certain embodiments, matrix operations accelerator 2707 includes a matrix accelerator controller circuitry 2713. In one embodiment, matrix accelerator controller (e.g., circuitry 2713) is to control the operations and flow of data in, out, and/or within matrix operations accelerator 2707. Matrix operations accelerator 2707 (e.g., matrix accelerator controller circuitry 2713) may include dispatch circuitry 2715, for example, to control the dispatching of received requests (e.g., commands) from host processor/processing system 2701 to one or more components of the matrix operations accelerator 2707.

In certain embodiments, matrix operations accelerator 2707 utilize a grid of processing elements 2709 (e.g., fused multiply add (FMA) circuits) to perform operations. In one embodiment, dispatch circuitry 2715 controls the sending of data (e.g., one or more values from a tile) from data buffers 2705 (e.g., registers forming a tile) to the grid of processing elements 2709. In certain embodiments, the grid of processing elements 2709 is a two-dimensional grid of processing elements, e.g., two-dimensional grid of FMAs in FIG. 6.

Depicted matrix operations accelerator 2707 includes data buffers (e.g., registers) 2705. In certain embodiments, data buffers (e.g., registers) 2705 are configurable to store a respective matrix, for example, into a first plurality of registers (e.g., tile) that represents a first two-dimensional matrix (e.g., tile marked as T0 storing matrix A in storage 2705), a second two-dimensional matrix (e.g., tile marked as T1 storing matrix B in storage 2705), a third two-dimensional matrix (e.g., tile marked as T3 storing matrix C in storage 2705), etc. System (e.g., host processor/processing system 2701) may include an (e.g., coherent) memory interface 2703 (e.g., data cache unit) to send and receive data (e.g., in contrast to commands) between host processor/processing system 2701 (e.g., as an Out of Order (OoO) core) and matrix operations accelerator 2707 (e.g., including load to tile connection path 2725 from memory interface 2703 and/or store from tile connection path 2727 from memory interface 2703).

As shown in FIG. 27, certain embodiments herein utilize a (e.g., coherent) memory interface (e.g., memory interface 2703 in FIG. 27) to transfer data between memory (e.g., cache) and/or host processor 2701 (e.g., host processor 2701) and matrix operations accelerator (e.g., matrix operations accelerator 2707, for example, the data buffers 2705 (e.g., registers forming a tile) (e.g., tile registers) thereof). Additionally or alternatively, in certain embodiments, it may be desirable to allow (e.g., via one or more instructions) access (e.g., direct access) to the data buffers 2705 (e.g., registers forming a tile). In certain embodiments, a programmer of code for a processor is limited to the instruction set architecture (ISA) of that processor.

Certain embodiments herein provide an ISA that includes one or more (e.g., macro) instructions that allow alignment of row or columns of data (e.g., but not at a finer granularity than an entire row or an entire column) into a single two-dimensional tile of data.

Figure 28:
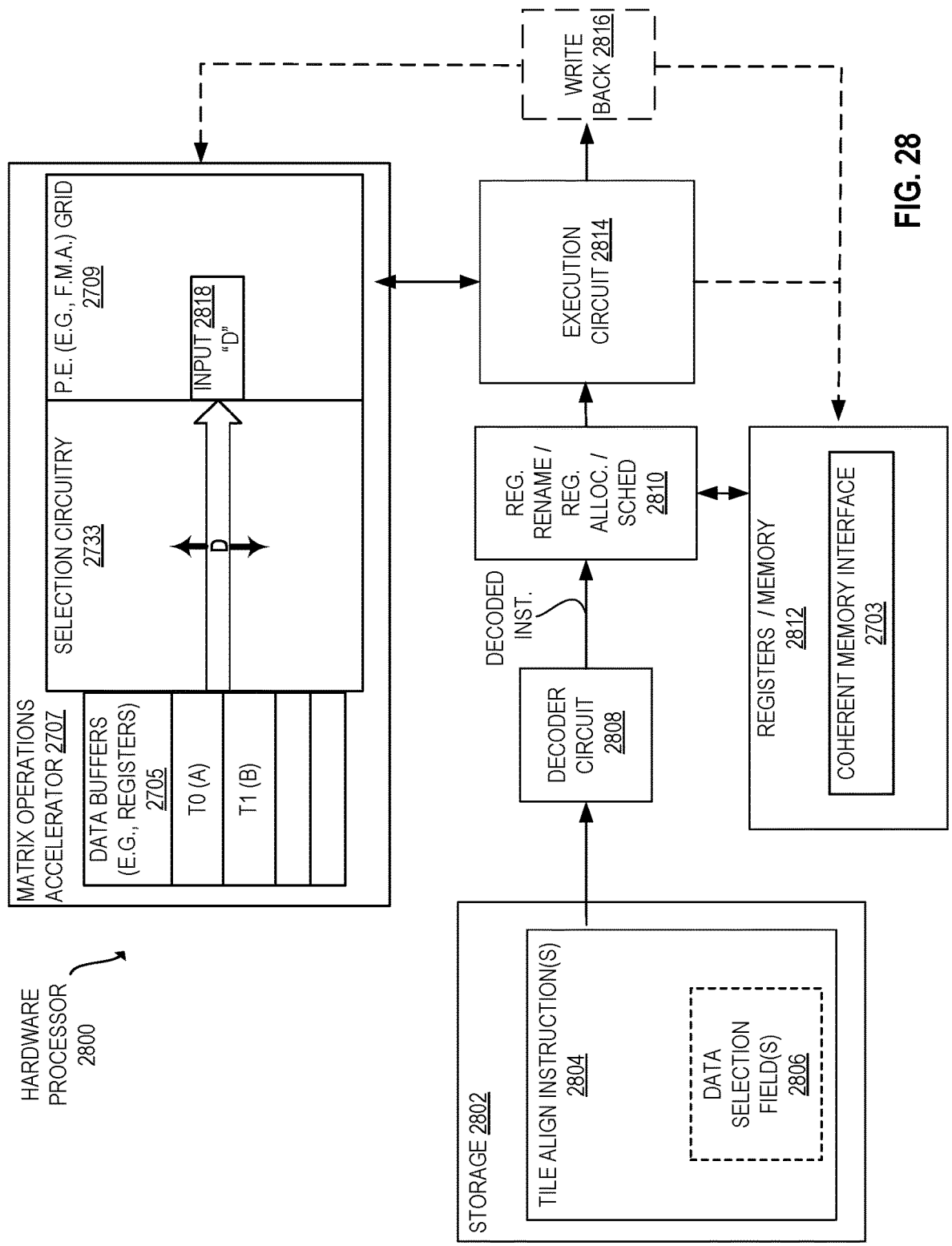
FIG. 28 illustrates a hardware processor coupled to storage that includes one or more tile align" instructions that operate on row (or column) granularity to logically form a tile from two other pre-loaded tiles according to embodiments of the disclosure.

FIG. 28 illustrates a hardware processor 2800 coupled to storage 2802 that includes one or more "tile align" instructions 2804 according to embodiments of the disclosure. The instructions 2804 may include one or more data selection fields (e.g., operands) that identify data buffers 2705 (e.g., registers forming a tile).

In certain embodiments, (e.g., where the processor/core supports out-of-order (OoO) execution), the processor includes a register rename/allocator circuit 2810 coupled to register file/memory circuit 2812 (e.g., unit) to allocate resources and perform register renaming on registers (e.g., registers associated with the initial sources and final destination of the instruction). In certain embodiments, (e.g., for out-of-order execution), the processor includes one or more scheduler circuits 2810 coupled to the decoder circuit 2808. The scheduler circuit(s) may schedule one or more operations associated with decoded instructions, including one or more operations decoded from "tile align" instructions 2804, e.g., for execution on the execution circuit 2814.

As one example, a decoded "tile align" instruction 2804 is to cause execution circuit 2814 to (e.g., logically) form a resulting two-dimensional matrix from a first two-dimensional matrix and a second two-dimensional matrix without moving (e.g., deleting or overwriting) data elements within a first tile of data buffers 2705 (e.g., a first plurality of registers) and a second tile of data buffers 2705 (e.g., a second plurality of registers). In one embodiment, selection circuitry 2733 sources data from a first tile (e.g., tile 0 (T0) in FIG. 28) and a second tile (e.g., tile 1 (T1) in FIG. 28) to logically generate a new two-dimensional matrix "D" from those tiles, e.g., where new two-dimensional matrix "D" may then be used as an input 2818 into PE grid 2709 (e.g., with or without saving that matrix "D" into a tile of data buffers 2705).

In certain embodiments, a write back circuit 2816 is included to write back results of an instruction to a destination (e.g., write them to a tile of data buffers 2705), for example, so those results are visible within a processor (e.g., visible outside of the execution circuit that produced those results).

One or more of these components (e.g., decoder 2808, register rename/register allocator/scheduler 2810, execution circuit 2814, registers (e.g., register file)/memory 2812, or write back circuit 2816) may be in a single core of a hardware processor (e.g., and multiple cores each with an instance of these components).

FIG. 29 illustrates a method 2900 of processing a "tile align" instruction according to embodiments of the disclosure. A processor (e.g., or processor core) may perform method 2900, e.g., in response to receiving a request to execute an instruction from software. Depicted method 2900 includes processing a "tile align" instruction by: fetch an instruction (e.g., including a first field that identifies the first two-dimensional matrix, a second field that identifies the second two-dimensional matrix, and an opcode that indicates an execution circuit of the hardware processor core is to cause a third two-dimensional matrix to be logically formed for input into the two-dimensional grid of processing elements from the first two-dimensional matrix and the second two-dimensional matrix without moving (e.g., or deleting/overwriting) data elements within the first plurality of registers and the second plurality of registers) 2902, decode the instruction into a decoded instruction 2904, (optionally) retrieve data associated with the instruction 2906, (optionally) schedule the decoded instruction for execution 2908, execute the decoded instruction according to the opcode 2910, and commit a result of the executed instruction 2912.

Embodiments herein includes instructions to allow the alignment of multiple tiles into a single tile, e.g., without actually moving the data within data buffers 2705 (e.g., registers forming a tile). The row or column where to start/end from in the first and/or second tile can be selected either by an immediate operand or by a general purpose (e.g., general purpose register 2717 in FIG. 27) or SIMD register (e.g., vector register 2719 in FIG. 27).

In one embodiment, the format of an instruction is TileAlign having operands of: first source tile (e.g., T1) and second source tile (e.g., T2), e.g., an opcode corresponding to the mnemonic of TileAlign.

In one embodiment, the format of an instruction includes a field to identify what row (or column) of the tile is to be the first row (or column) in the new (e.g., logical) tile (e.g., new tile), e.g., the field indicating where to start row wise (or column wise) in second tile (e.g., T2) to continue a first tile (e.g., T1) (e.g., and what to skip from T1). In one embodiment, each of a new tile, first source tile, and second source tile are the same size (e.g., same number of rows and columns).

In one embodiment, a first tile is smaller than the new tile to be formed, so an instruction sources one or more additional row(s) (or column(s)) from a second tile to form the new tile.

Such an instruction may be utilized when multiple iterations are performed and thus it is desired to increment the row (or column) that is used, e.g., instead of having to repeatedly keep loading whole tiles.

Figure 30:
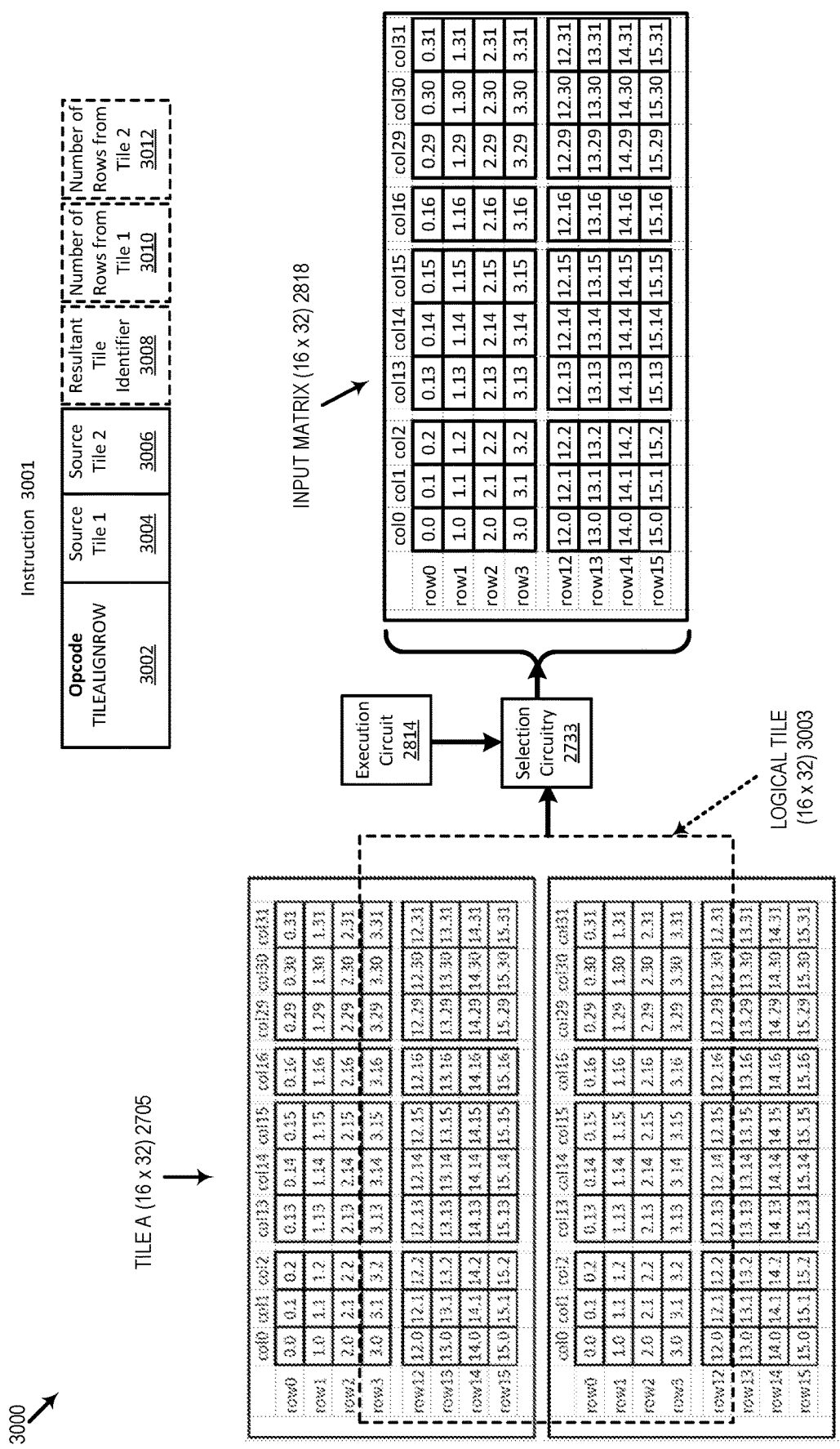
FIG. 30 is a block diagram illustrating use of a TILEALIGNROW instruction according to embodiments of the disclosure.

FIG. 30 is a block diagram illustrating use of a TILEALIGNROW instruction according to embodiments of the disclosure. As shown, instruction 3001 includes an opcode 3002 (e.g. TILEALIGNROW), which indicates that the processor is to form a new tile 3003 (e.g., as input 2818) from a first tile (e.g., tile "A") and a second tile (e.g., tile "B") of buffer 2705 (e.g., plurality of registers that represents each two-dimensional tile, for example, by selection circuitry 2733 selecting the desired rows, a first source location field 3004 identifying the first tile in buffers 2705, a second source location field 3006 identifying the second tile in buffers 2705, (optionally) a resultant tile identifier field 3008 to identify where (e.g., if) the new (e.g., logical) tile 3003 is to be stored in buffers 2705, (optionally) a number of row(s) 3010 from the first tile to source into logical tile 3003, and (optionally) a number of row(s) 3012 from the second tile to source into logical tile 3003.

Also shown is system 3000 for executing the TILEALIGNROW instruction. The system includes buffers 2705 (e.g., forming the first tile and the second tile), execution circuit 2814, and selection circuitry 2733. It should be understood that a similar format may be utilized for column instead of row alignment, e.g., with a mnemonic of TILEALIGNCOL (where COL refers to a column embodiment).

Figure 31:
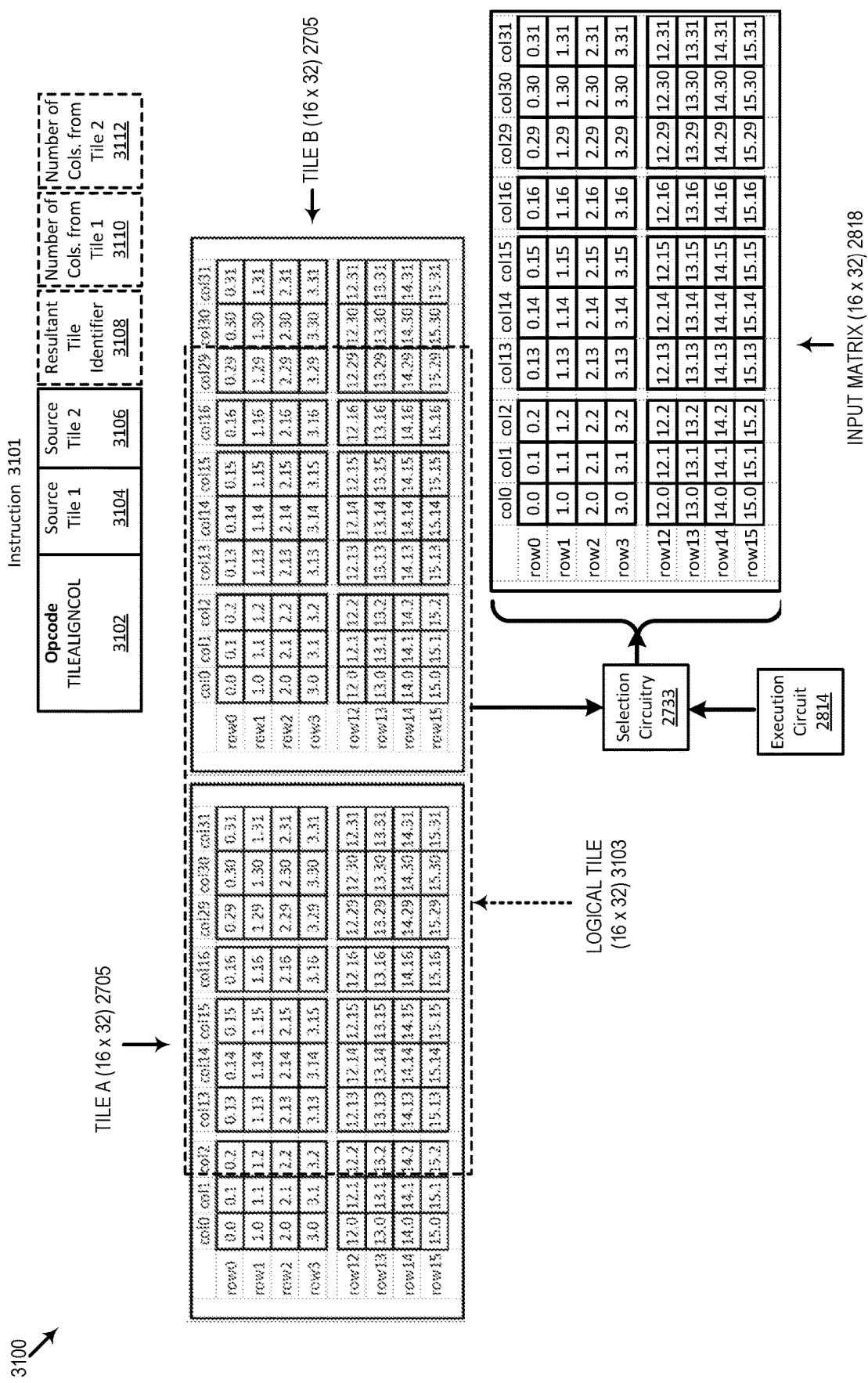
FIG. 31 is a block diagram illustrating use of a TILEALIGNCOL instruction according to embodiments of the disclosure.

FIG. 31 is a block diagram illustrating use of a TILEALIGNCOL instruction according to embodiments of the disclosure. As shown, instruction 3101 includes an opcode 3102 (e.g. TILEALIGNCOL), which indicates that the processor is to form a new tile 3103 (e.g., as input 2818) from a first tile (e.g., tile "A") and a second tile (e.g., tile "B") of buffer 2705 (e.g., plurality of registers that represents each two-dimensional tile, for example, by selection circuitry 2733 selecting the desired columns, a first source location field 3104 identifying the first tile in buffers 2705, a second source location field 3106 identifying the second tile in buffers 2705, (optionally) a resultant tile identifier field 3108 to identify where (e.g., if) the new (e.g., logical) tile 3103 is to be stored in buffers 2705, (optionally) a number of column(s) 3110 from the first tile to source into logical tile 3103, and (optionally) a number of column(s) 3112 from the second tile to source into logical tile 3103.

Also shown is system 3100 for executing the TILEALIGNCOL instruction. The system includes buffers 2705 (e.g., forming the first tile and the second tile), execution circuit 2814, and selection circuitry 2733.

In certain embodiments, if the requested number of rows (or columns) is above the number of rows (or columns) in a tile, execution of the instruction will fault (e.g., generate a fault indication, including, but not limited to, raising a flag).

Figure 32:
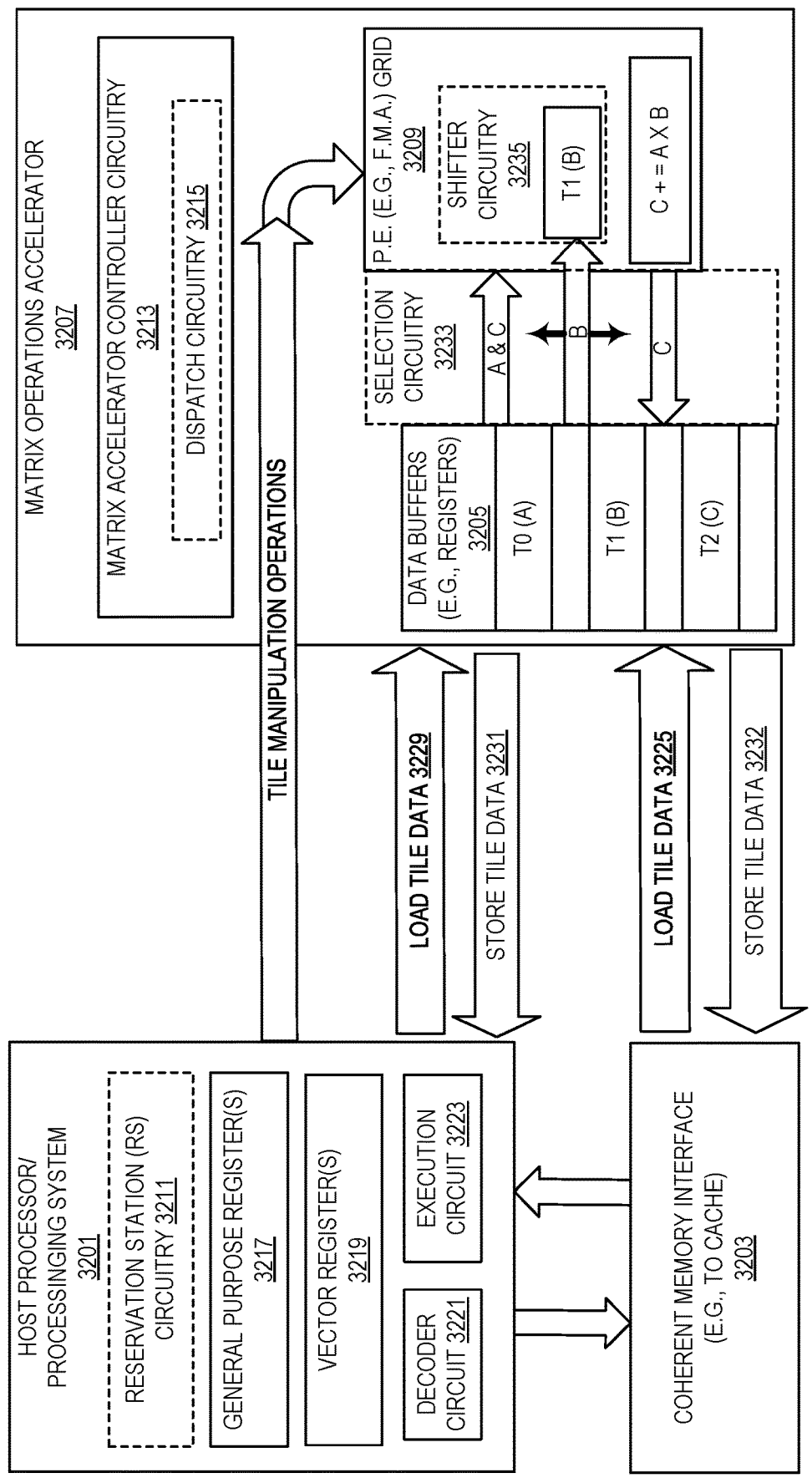
FIG. 32 illustrates a system comprising a matrix (tile) operations accelerator that utilizes selection circuitry and/or shifter circuitry to generate a new tile from two other tiles according to embodiments of the disclosure.

FIG. 32 illustrates a system comprising a matrix (tile) operations accelerator 3207 that utilizes selection circuitry 3233 and/or shifter circuitry 3235 to generate a new tile from two other tiles according to embodiments of the disclosure. In certain embodiments, allows matrix operations accelerator 3207 (e.g., selection circuitry 3233 and/or shifter circuitry 3235) selects certain elements of each of two source tiles to generate a new tile.

In certain embodiments, a host processor/processing system 3201 (for example, a hardware processor core, e.g., processor core 3990 in FIG. 39B) communicates commands (e.g., matrix manipulation operations such as arithmetic or matrix manipulation operations, load, and/or store operations) to a matrix operations accelerator 3207. However, this is shown this way for discussion purposes only. As detailed herein, accelerator 3207 may be a part of a processing core. Commands that are tile manipulation operator instructions may refer to tiles as register-register ("reg-reg") or register-memory ("reg-mem") format. Other commands such as TILESTORE, TILELOAD, TILECONFIG, etc., do not perform data operations on a tile in certain embodiments. Commands may be decoded instructions (e.g., micro-operations) or macro-instructions for the accelerator 3207 to handle. In one embodiment, a hardware processor core sends micro-ops to matrix (tile) operations accelerator 3207 in response to a matrix operations instruction being executed by the hardware processor core.

In one embodiment, reservation station (RS) circuitry 3211 sends commands (e.g., micro-ops) to matrix operations accelerator 3207. In certain embodiments, matrix operations accelerator 3207 is a tile matrix unit (TMU). In certain embodiments, matrix operations accelerator 3207 includes a matrix accelerator controller circuitry 3213. In one embodiment, matrix accelerator controller (e.g., circuitry 3213) is to control the operations and flow of data in, out, and/or within matrix operations accelerator 3207. Matrix operations accelerator 3207 (e.g., matrix accelerator controller circuitry 3213) may include dispatch circuitry 3215, for example, to control the dispatching of received requests (e.g., commands) from host processor/processing system 3201 to one or more components of the matrix operations accelerator 3207.

In certain embodiments, matrix operations accelerator 3207 utilize a grid of processing elements 3209 (e.g., fused multiply add (FMA) circuits) to perform operations. In one embodiment, dispatch circuitry 3215 controls the sending of data (e.g., one or more values from a tile) from data buffers 3205 (e.g., registers forming a tile) to the grid of processing elements 3209. In certain embodiments, the grid of processing elements 3209 is a two-dimensional grid of processing elements, e.g., two-dimensional grid of FMAs in FIG. 6.

Depicted matrix operations accelerator 3207 includes data buffers (e.g., registers) 3205. In certain embodiments, data buffers (e.g., registers) 3205 are configurable to store a respective matrix, for example, into a first plurality of registers (e.g., tile) that represents a first two-dimensional matrix (e.g., tile marked as T0 storing matrix A in storage 3205), a second two-dimensional matrix (e.g., tile marked as T1 storing matrix B in storage 3205), a third two-dimensional matrix (e.g., tile marked as T3 storing matrix C in storage 3205), etc. System (e.g., host processor/processing system 3201) may include an (e.g., coherent) memory interface 3203 (e.g., data cache unit) to send and receive data (e.g., in contrast to commands) between host processor/processing system 3201 (e.g., as an Out of Order (OoO) core) and matrix operations accelerator 3207 (e.g., including load to tile connection path 3225 from memory interface 3203 and/or store from tile connection path 3227 from memory interface 3203).

As shown in FIG. 32, certain embodiments herein utilize a (e.g., coherent) memory interface (e.g., memory interface 3203 in FIG. 32) to transfer data between memory (e.g., cache) and/or host processor 3201 (e.g., host processor 3201) and matrix operations accelerator (e.g., matrix operations accelerator 3207, for example, the data buffers 3205 (e.g., registers forming a tile) (e.g., tile registers) thereof). Additionally or alternatively, in certain embodiments, it may be desirable to allow (e.g., via one or more instructions) access (e.g., direct access) to the data buffers 3205 (e.g., registers forming a tile). In certain embodiments, a programmer of code for a processor is limited to the instruction set architecture (ISA) of that processor.

Certain embodiments herein provide an ISA that includes one or more (e.g., macro) instructions that allow alignment of elements of data (e.g., on a finer granularity than only an entire row or an entire column) into a single two-dimensional tile of data.

Figure 33:
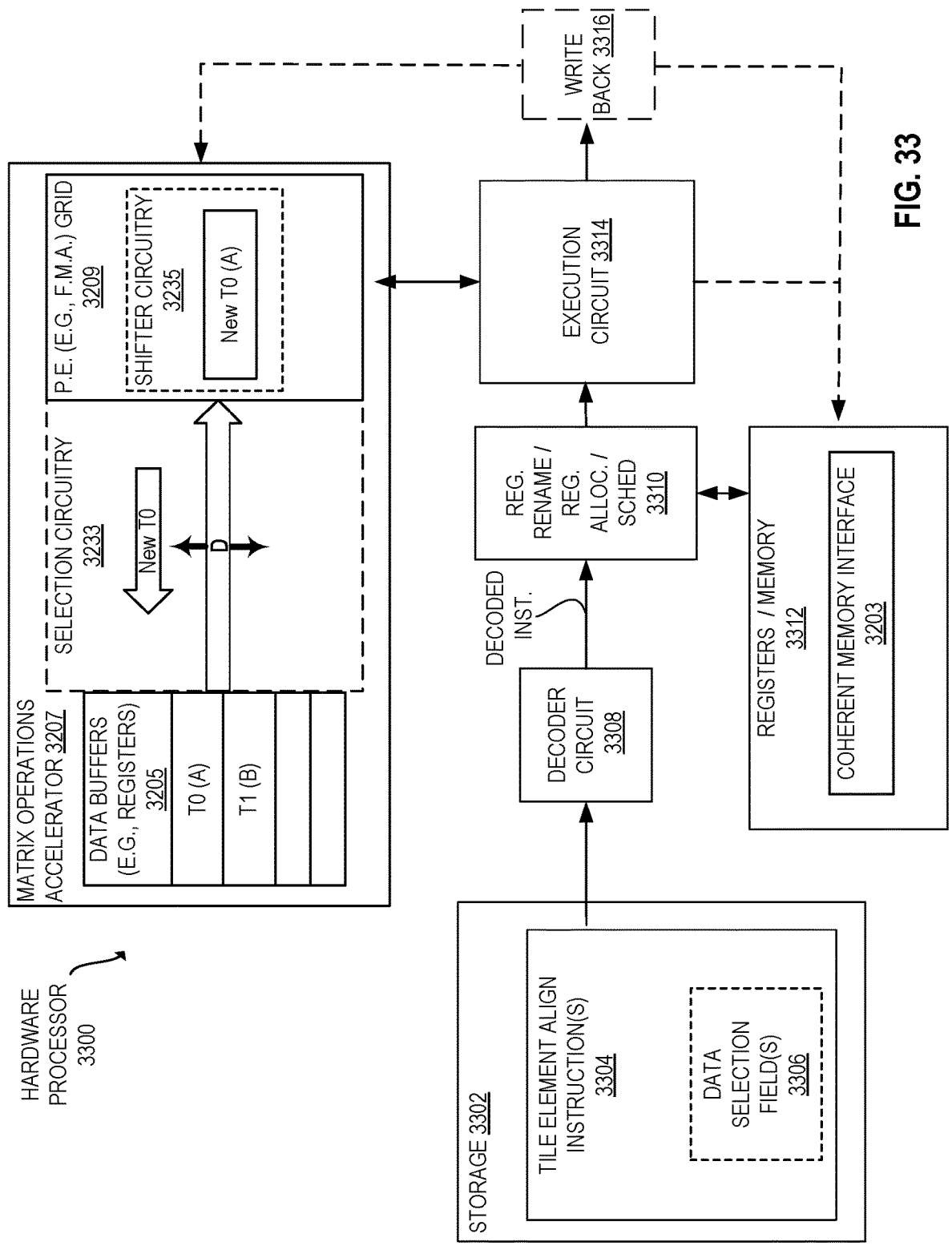
FIG. 33 illustrates a hardware processor coupled to storage that includes one or more tile element align" instructions that operate on an element granularity to generate a new tile from two other tiles according to embodiments of the disclosure.

FIG. 33 illustrates a hardware processor 3300 coupled to storage 3302 that includes one or more "tile element align" instructions 3304 according to embodiments of the disclosure. The instructions 3304 may include one or more data selection fields (e.g., operands) that identify data buffers 3205 (e.g., registers forming a tile).

In certain embodiments, (e.g., where the processor/core supports out-of-order (OoO) execution), the processor includes a register rename/allocator circuit 3310 coupled to register file/memory circuit 3312 (e.g., unit) to allocate resources and perform register renaming on registers (e.g., registers associated with the initial sources and final destination of the instruction). In certain embodiments, (e.g., for out-of-order execution), the processor includes one or more scheduler circuits 3310 coupled to the decoder circuit 3308. The scheduler circuit(s) may schedule one or more operations associated with decoded instructions, including one or more operations decoded from "tile element align" instructions 3304, e.g., for execution on the execution circuit 3314.

As one example, a decoded "tile element align" instruction 3304 is to cause execution circuit 3314 to (e.g., logically) form a resulting two-dimensional matrix from elements of a first two-dimensional tile of data buffers 3205 (e.g., a first plurality of registers) and a second two-dimensional tile of data buffers 3205 (e.g., a second plurality of registers). In one embodiment, selection circuitry 3233 sources data "D" from a first tile (e.g., tile 0 (T0) in FIG. 33) and a second tile (e.g., tile 1 (T1) in FIG. 33) and shifter circuitry 3235 shifts certain of that data to then generate a new two-dimensional matrix "T0" from those tiles, e.g., where new two-dimensional matrix "T0" may then be used as an input 3318 into PE grid 3209 (e.g., with or without saving that matrix "new T0" into a tile of data buffers 3205).

In certain embodiments, a write back circuit 3316 is included to write back results of an instruction to a destination (e.g., write them to a tile of data buffers 3205), for example, so those results are visible within a processor (e.g., visible outside of the execution circuit that produced those results).

One or more of these components (e.g., decoder 3308, register rename/register allocator/scheduler 3310, execution circuit 3314, registers (e.g., register file)/memory 3312, or write back circuit 3316) may be in a single core of a hardware processor (e.g., and multiple cores each with an instance of these components).

FIG. 34 illustrates a method 3400 of processing a "tile element align" instruction according to embodiments of the disclosure. A processor (e.g., or processor core) may perform method 3400, e.g., in response to receiving a request to execute an instruction from software. Depicted method 3400 includes processing a "tile element align" instruction by: fetch an instruction (e.g., including a first field that identifies the first two-dimensional matrix, a second field that identifies the second two-dimensional matrix, and an opcode that indicates an execution circuit of the hardware processor core is to cause the matrix operations accelerator circuit to generate a third two-dimensional matrix from a proper subset of elements of a row or a column of the first two-dimensional matrix and a proper subset of elements of a row or a column of the second two-dimensional matrix and store the third two-dimensional matrix at a destination in the matrix operations accelerator circuit) 3402, decode the instruction into a decoded instruction 3404, (optionally) retrieve data associated with the instruction 3406, (optionally) schedule the decoded instruction for execution 3408, execute the decoded instruction according to the opcode 3410, and commit a result of the executed instruction 3412.

Embodiments herein includes instructions to allow the alignment of multiple tiles into a single tile. The element of a row or column where to start/end from in the first and/or second tile can be selected either by an immediate operand or by a general purpose (e.g., general purpose register 3217 in FIG. 32) or SIMD register (e.g., vector register 3219 in FIG. 32).

In one embodiment, the format of an instruction is TileElementAlign having operands of: first source tile (e.g., T1) and second source tile (e.g., T2), e.g., an opcode corresponding to the mnemonic of TileElementAlign. The format may include a field (e.g., an immediate or register) to specify a particular element in a (e.g., source) tile to start the alignment. The field may include a value that specifies a starting element in a source (e.g., second source (e.g., "T2") tile), for example, number each element in the two-dimensional (2-D) tile with a consecutive number, e.g., akin to a one-dimensional (1-D) array. See, e.g., the numbering of elements in tile A in FIG. 35. The field may include a value that specifies the row and column element (e.g., XY coordinates) of a starting element in a source (e.g., second source (e.g., "T2") tile).

In one embodiment, the format of an instruction includes a field to identify what element of a first source tile is to be the first element in a first row (or column) in the new (e.g., logical) tile (e.g., new tile), e.g., the field indicating where to start element wise in first tile (e.g., T1) (e.g., and what to skip from T1). In one embodiment, each of a new tile, first source tile, and second source tile are the same size (e.g., same number of rows and columns).

Figure 35:
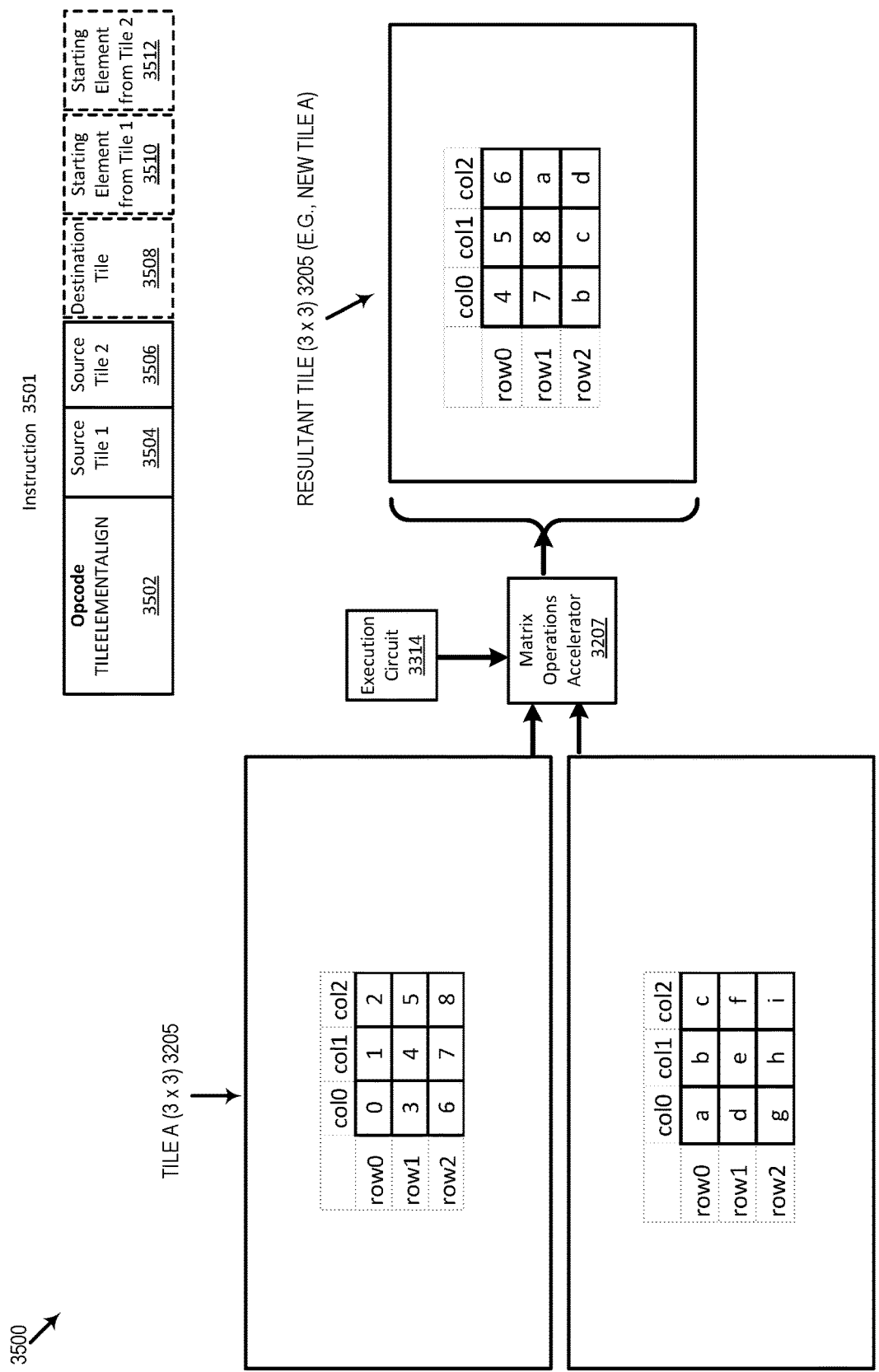
FIG. 35 is a block diagram illustrating use of a TILEELEMENTALIGN instruction according to embodiments of the disclosure.

In FIGS. 25, 26, 30, and 31 above, certain tiles are shown with an index value within their elements, for example, the two-dimensional index of row.column (e.g., where the second row (row 1) and the third column (col 2) is indexed as (1.2). It should be understood that a value may be stored within that indexed element. In FIG. 35, variables for the values in each element are depicted instead of the two-dimensional index to more readily illustrate the resulting movement of the source elements within the resultant (e.g., "new tile A").

FIG. 35 is a block diagram illustrating use of a TILEELE-MENTALIGN instruction according to embodiments of the disclosure. As shown, instruction 3501 includes an opcode 3502 (e.g., TILEELEMENTALIGN), which indicates that the processor is to form a new tile (e.g., for storage in buffer 3205) from a first tile (e.g., tile "A") and a second tile (e.g., tile "B") of buffer 3205 (e.g., plurality of registers that represents each two-dimensional tile, for example, by matrix operations accelerator 3207 (e.g., selection circuitry 3233 and/or shifter circuitry 3235 thereof) selecting the desired data (e.g., rows or columns), a first source location field 3504 identifying the first tile in buffers 3205, a second source location field 3506 identifying the second tile in buffers 3205, (optionally) a resultant tile identifier field 3508 to identify where (e.g., if) the new (e.g., logical) resultant tile (e.g., new tile A) is to be stored in buffers 3205, (optionally) an indication of a starting element from the first source tile 3510, and (optionally) an indication of a starting element from the second source tile 3512.

Also shown is system 3500 for executing the TILEELEMENTALIGN instruction. The system includes buffers 3205 (e.g., forming the first tile and the second tile), execution circuit 3314, and matrix operations accelerator 2307. In FIG. 35, tiles A and B each have 9 elements (3×3 tiles), and the resultant tile is desired to be sourced from element [1,1] in Tile A (e.g., identified with the number "4" here), so in certain embodiments, the data is manipulated so that the last two elements from the second row (or second column) in Tile A are the first two elements in the first row of resultant tile, element "6" is moved into the last element of the first row of the resultant tile, and that is continued until reaching the end of Tile A, and the rest of the resultant tile is filed consecutively from tile B (shown as elements a-d). The alignment may be performed by sourcing in rows (e.g., as shown in FIG. 35) or sourcing in columns. In certain embodiments, if the requested element is not a valid element (e.g., "out of bounds") in a tile, execution of the instruction will fault (e.g., generate a fault indication, including, but not limited to, raising a flag).

Further exemplary architectures, systems, etc. that the above may be used in are detailed below.

At least some embodiments of the disclosed technologies can be described in view of the following examples:

Example 1. An apparatus comprising:
  a matrix operations accelerator circuit comprising:
    a two-dimensional grid of processing elements,
    a first plurality of registers that represents a first two-dimensional matrix coupled to the two-dimensional grid of processing elements, and
    a second plurality of registers that represents a second two-dimensional matrix coupled to the two-dimensional grid of processing elements; and
  a hardware processor core coupled to the matrix operations accelerator circuit and comprising:
    a decoder circuit to decode a single instruction into a decoded instruction, the single instruction including a first field that identifies the first two-dimensional matrix, a second field that identifies the second two-dimensional matrix, and an opcode that indicates an execution circuit of the hardware processor core is to cause the matrix operations accelerator circuit to generate a third two-dimensional matrix from a proper subset of elements of a row or a column of the first two-dimensional matrix and a proper subset of elements of a row or a column of the second two-dimensional matrix and store the third two-dimensional matrix at a destination in the matrix operations accelerator circuit, and
    the execution circuit of the hardware processor core to execute the decoded instruction according to the opcode.

Example 2. The apparatus of example 1, wherein the opcode indicates the execution circuit of the hardware processor core is to cause the matrix operations accelerator circuit to generate the third two-dimensional matrix from a proper subset of elements of a row of the first two-dimensional matrix and a proper subset of elements of a row of the second two-dimensional matrix.

Example 3. The apparatus of example 2, wherein the single instruction comprises a field that identifies a non-leading element of the row of the first two-dimensional matrix that is to be a first element of the third two-dimensional matrix.

Example 4. The apparatus of example 3, wherein the field is an immediate of the single instruction.

Example 5. The apparatus of example 1, wherein the opcode indicates the execution circuit of the hardware processor core is to cause the matrix operations accelerator circuit to generate the third two-dimensional matrix from a proper subset of elements of a column of the first two-dimensional matrix and a proper subset of elements of a column of the second two-dimensional matrix.

Example 6. The apparatus of example 5, wherein the single instruction comprises a field that identifies a non-leading element of the column of the first two-dimensional matrix that is to be a first element of the third two-dimensional matrix.

Example 7. The apparatus of example 6, wherein the field is an immediate of the single instruction.

Example 8. The apparatus of example 1, wherein the destination in the matrix operations accelerator circuit is the first plurality of registers that represented the first two-dimensional matrix.

Example 9. A method comprising:
decoding, by a decoder circuit of a hardware processor core coupled to a matrix operations accelerator circuit comprising a two-dimensional grid of processing elements, a first plurality of registers that represents a first two-dimensional matrix coupled to the two-dimensional grid of processing elements, and a second plurality of registers that represents a second two-dimensional matrix coupled to the two-dimensional grid of processing elements, a single instruction into a decoded instruction, the single instruction including a first field that identifies the first two-dimensional matrix, a second field that identifies the second two-dimensional matrix, and an opcode that indicates an execution circuit of the hardware processor core is to generate a third two-dimensional matrix from a proper subset of elements of a row or a column of the first two-dimensional matrix and a proper subset of elements of a row or a column of the second two-dimensional matrix and store the third two-dimensional matrix at a destination in the matrix operations accelerator circuit; and
executing the decoded instruction by the execution circuit of the hardware processor core according to the opcode.

Example 10. The method of example 9, wherein the opcode indicates the execution circuit of the hardware processor core is to cause the matrix operations accelerator circuit to generate the third two-dimensional matrix from a proper subset of elements of a row of the first two-dimensional matrix and a proper subset of elements of a row of the second two-dimensional matrix.

Example 11. The method of example 10, wherein the single instruction comprises a field that identifies a non-leading element of the row of the first two-dimensional matrix that is to be a first element of the third two-dimensional matrix.

Example 12. The method of example 11, wherein the field is an immediate of the single instruction.

Example 13. The method of example 9, wherein the opcode indicates the execution circuit of the hardware processor core is to cause the matrix operations accelerator circuit to generate the third two-dimensional matrix from a proper subset of elements of a column of the first two-dimensional matrix and a proper subset of elements of a column of the second two-dimensional matrix.

Example 14. The method of example 13, wherein the single instruction comprises a field that identifies a non-leading element of the column of the first two-dimensional matrix that is to be a first element of the third two-dimensional matrix.

Example 15. The method of example 14, wherein the field is an immediate of the single instruction.

Example 16. The method of example 9, wherein the destination in the matrix operations accelerator circuit is the first plurality of registers that represented the first two-dimensional matrix.

Example 17. A non-transitory machine readable medium that stores code that when executed by a machine causes the machine to perform a method comprising:
decoding, by a decoder circuit of a hardware processor core coupled to a matrix operations accelerator circuit comprising a two-dimensional grid of processing elements, a first plurality of registers that represents a first two-dimensional matrix coupled to the two-dimensional grid of processing elements, and a second plurality of registers that represents a second two-dimensional matrix coupled to the two-dimensional grid of processing elements, a single instruction into a decoded instruction, the single instruction including a first field that identifies the first two-dimensional matrix, a second field that identifies the second two-dimensional matrix, and an opcode that indicates an execution circuit of the hardware processor core is to generate a third two-dimensional matrix from a proper subset of elements of a row or a column of the first two-dimensional matrix and a proper subset of elements of a row or a column of the second two-dimensional matrix and store the third two-dimensional matrix at a destination in the matrix operations accelerator circuit; and
executing the decoded instruction by the execution circuit of the hardware processor core according to the opcode.

Example 18. The non-transitory machine readable medium of example 17, wherein the opcode indicates the execution circuit of the hardware processor core is to cause the matrix operations accelerator circuit to generate the third two-dimensional matrix from a proper subset of elements of a row of the first two-dimensional matrix and a proper subset of elements of a row of the second two-dimensional matrix.

Example 19. The non-transitory machine readable medium of example 18, wherein the single instruction comprises a field that identifies a non-leading element of the row of the first two-dimensional matrix that is to be a first element of the third two-dimensional matrix.

Example 20. The non-transitory machine readable medium of example 19, wherein the field is an immediate of the single instruction.

Example 21. The non-transitory machine readable medium of example 17, wherein the opcode indicates the execution circuit of the hardware processor core is to cause the matrix operations accelerator circuit to generate the third two-dimensional matrix from a proper subset of elements of a column of the first two-dimensional matrix and a proper subset of elements of a column of the second two-dimensional matrix.

Example 22. The non-transitory machine readable medium of example 21, wherein the single instruction comprises a field that identifies a non-leading element of the column of the first two-dimensional matrix that is to be a first element of the third two-dimensional matrix.

Example 23. The non-transitory machine readable medium of example 22, wherein the field is an immediate of the single instruction.

Example 24. The non-transitory machine readable medium of example 17, wherein the destination in the matrix operations accelerator circuit is the first plurality of registers that represented the first two-dimensional matrix.

Example 25. The non-transitory machine readable medium of example 17, the method further comprising translating the single instruction into one or more instructions of a different instruction set architecture prior to the decoding, wherein executing of the one or more instructions of the different instruction set architecture is to be functionally equivalent as the executing of the decoded instruction according to the opcode.

Example 26. An apparatus comprising:
a matrix operations accelerator circuit comprising:
  a two-dimensional grid of processing elements,
  a plurality of registers that represents a two-dimensional (e.g., input) matrix coupled to the matrix operations accelerator circuit, and
  a coupling to a cache; and
a hardware processor core comprising:
  a vector register,
  a decoder, of the hardware processor core coupled to the matrix operations accelerator circuit, to decode a single instruction into a decoded instruction, the single instruction including a first field that identifies the two-dimensional matrix and a second field that identifies the vector register, and
  an execution circuit of the hardware processor core to execute the decoded instruction to cause a store of one or more elements from the vector register into the plurality of registers that represents the two-dimensional matrix by a coupling of the hardware processor core to the matrix operations accelerator circuit that is separate from the coupling to the cache.

In yet another embodiment, an apparatus comprises a data storage device that stores code that when executed by a hardware processor causes the hardware processor to perform any method disclosed herein. An apparatus may be as described in the detailed description. A method may be as described in the detailed description.

Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 36A:
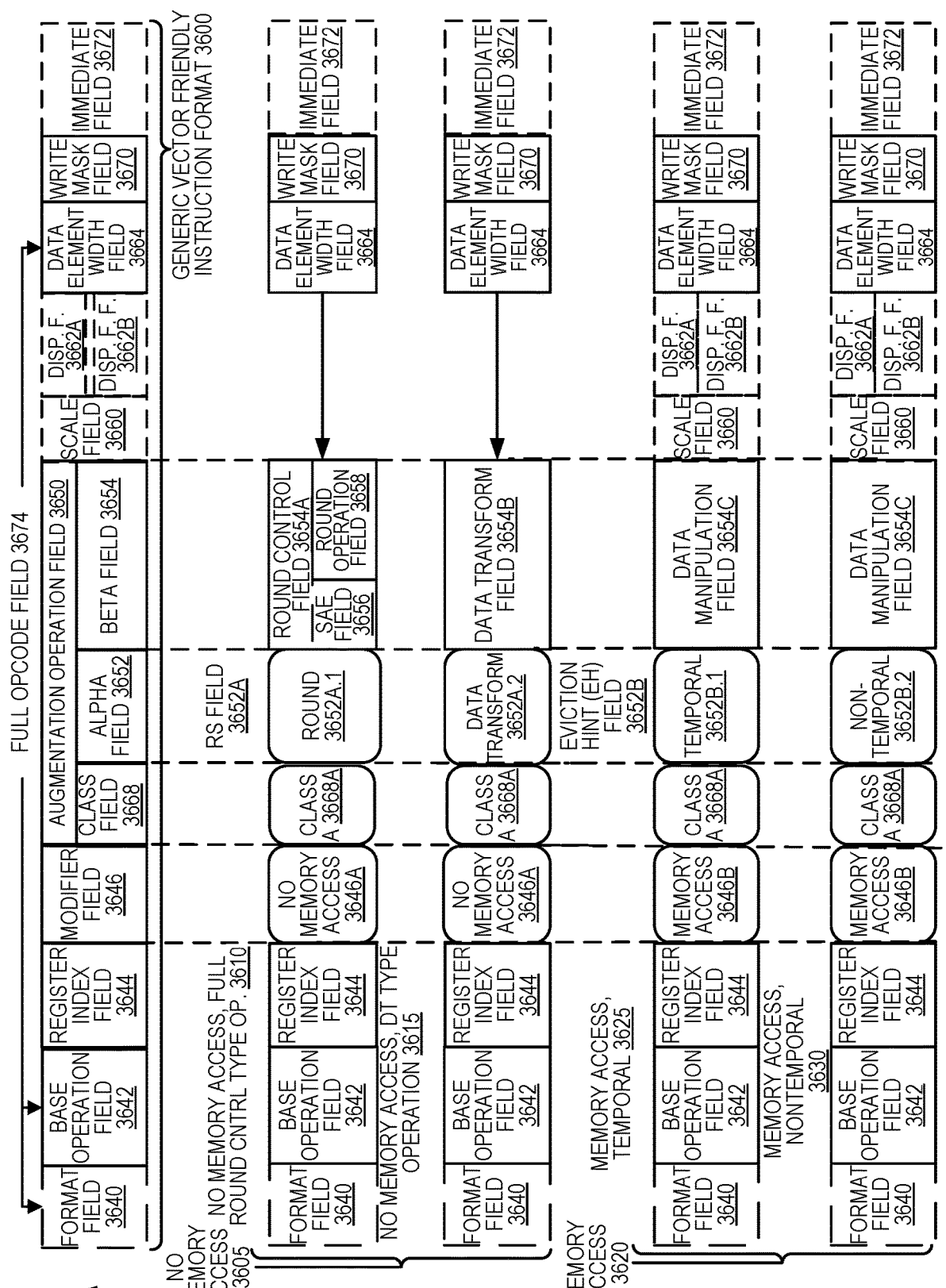
FIG. 36A is a block diagram illustrating a generic vector friendly instruction format and class A instruction templates thereof according to embodiments of the disclosure.
Figure 36B:
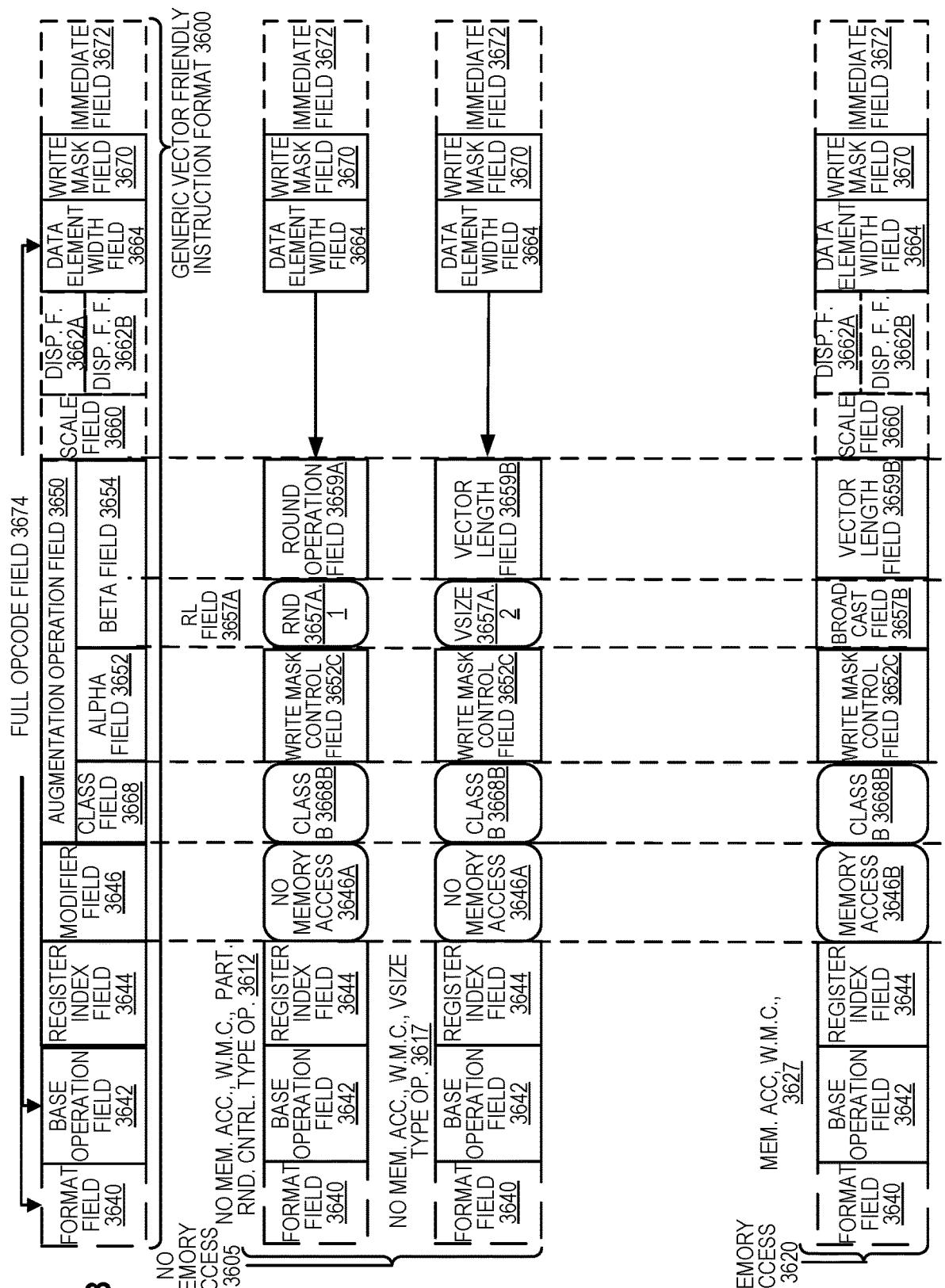
FIG. 36B is a block diagram illustrating the generic vector friendly instruction format and class B instruction templates thereof according to embodiments of the disclosure.

FIGS. 36A-36B are block diagrams illustrating a generic vector friendly instruction format and instruction templates thereof according to embodiments of the disclosure. FIG. 36A is a block diagram illustrating a generic vector friendly instruction format and class A instruction templates thereof according to embodiments of the disclosure; while FIG. 36B is a block diagram illustrating the generic vector friendly instruction format and class B instruction templates thereof according to embodiments of the disclosure. Specifically, a generic vector friendly instruction format 3600 for which are defined class A and class B instruction templates, both of which include no memory access 3605 instruction templates and memory access 3620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 36A include: 1) within the no memory access 3605 instruction templates there is shown a no memory access, full round control type operation 3610 instruction template and a no memory access, data transform type operation 3615 instruction template; and 2) within the memory access 3620 instruction templates there is shown a memory access, temporal 3625 instruction template and a memory access, non-temporal 3630 instruction template. The class B instruction templates in FIG. 36B include: 1) within the no memory access 3605 instruction templates there is shown a no memory access, write mask control, partial round control type operation 3612 instruction template and a no memory access, write mask control, vsize type operation 3617 instruction template; and 2) within the memory access 3620 instruction templates there is shown a memory access, write mask control 3627 instruction template.

The generic vector friendly instruction format 3600 includes the following fields listed below in the order illustrated in FIGS. 36A-36B.

Format field 3640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 3642—its content distinguishes different base operations.

Register index field 3644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 3646—its content distinguishes occurrences of instructions in the generic vector instruction format that specify memory access from those that do not; that is, between no memory access 3605 instruction templates and memory access 3620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 3650—its content distinguishes which one of a variety of different operations to be performed in addition to the base operation. This field is context specific. In one embodiment of the disclosure, this field is divided into a class field 3668, an alpha field 3652, and a beta field 3654. The augmentation operation field 3650 allows common groups of operations to be performed in a single instruction rather than 2, 3, or 4 instructions.

Scale field 3660—its content allows for the scaling of the index field's content for memory address generation (e.g., for address generation that uses 2scale*index+base).

Displacement Field 3662A—its content is used as part of memory address generation (e.g., for address generation that uses 2scale*index+base+displacement).

Displacement Factor Field 3662B (note that the juxtaposition of displacement field 3662A directly over displacement factor field 3662B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 3674 (described later herein) and the data manipulation field 3654C. The displacement field 3662A and the displacement factor field 3662B are optional in the sense that they are not used for the no memory access 3605 instruction templates and/or different embodiments may implement only one or none of the two.

Data element width field 3664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 3670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 3670 allows for partial vector operations, including loads, stores, arithmetic, logical, etc. While embodiments of the disclosure are described in which the write mask field's 3670 content selects one of a number of write mask registers that contains the write mask to be used (and thus the write mask field's 3670 content indirectly identifies that masking to be performed), alternative embodiments instead or additional allow the mask write field's 3670 content to directly specify the masking to be performed.

Immediate field 3672—its content allows for the specification of an immediate. This field is optional in the sense that is it not present in an implementation of the generic vector friendly format that does not support immediate and it is not present in instructions that do not use an immediate.

Class field 3668—its content distinguishes between different classes of instructions. With reference to FIGS. 36A-B, the contents of this field select between class A and class B instructions. In FIGS. 36A-B, rounded corner squares are used to indicate a specific value is present in a field (e.g., class A 3668A and class B 3668B for the class field 3668 respectively in FIGS. 36A-B).

Instruction Templates of Class A

In the case of the non-memory access 3605 instruction templates of class A, the alpha field 3652 is interpreted as an RS field 3652A, whose content distinguishes which one of the different augmentation operation types are to be performed (e.g., round 3652A.1 and data transform 3652A.2 are respectively specified for the no memory access, round type operation 3610 and the no memory access, data transform type operation 3615 instruction templates), while the beta field 3654 distinguishes which of the operations of the specified type is to be performed. In the no memory access 3605 instruction templates, the scale field 3660, the displacement field 3662A, and the displacement scale filed 3662B are not present.

No-Memory Access Instruction Templates—Full Round Control Type Operation

In the no memory access full round control type operation 3610 instruction template, the beta field 3654 is interpreted as a round control field 3654A, whose content(s) provide static rounding. While in the described embodiments of the disclosure the round control field 3654A includes a suppress all floating point exceptions (SAE) field 3656 and a round operation control field 3658, alternative embodiments may support may encode both these concepts into the same field or only have one or the other of these concepts/fields (e.g., may have only the round operation control field 3658).

SAE field 3656—its content distinguishes whether or not to disable the exception event reporting; when the SAE field's 3656 content indicates suppression is enabled, a given instruction does not report any kind of floating-point exception flag and does not raise any floating point exception handler.

Round operation control field 3658—its content distinguishes which one of a group of rounding operations to perform (e.g., Round-up, Round-down, Round-towards-zero and Round-to-nearest). Thus, the round operation control field 3658 allows for the changing of the rounding mode on a per instruction basis. In one embodiment of the disclosure where a processor includes a control register for specifying rounding modes, the round operation control field's 3650 content overrides that register value.

No Memory Access Instruction Templates—Data Transform Type Operation

In the no memory access data transform type operation 3615 instruction template, the beta field 3654 is interpreted as a data transform field 3654B, whose content distinguishes which one of a number of data transforms is to be performed (e.g., no data transform, swizzle, broadcast).

In the case of a memory access 3620 instruction template of class A, the alpha field 3652 is interpreted as an eviction hint field 3652B, whose content distinguishes which one of the eviction hints is to be used (in FIG. 36A, temporal 3652B.1 and non-temporal 3652B.2 are respectively specified for the memory access, temporal 3625 instruction template and the memory access, non-temporal 3630 instruction template), while the beta field 3654 is interpreted as a data manipulation field 3654C, whose content distinguishes which one of a number of data manipulation operations (also known as primitives) is to be performed (e.g., no manipulation; broadcast; up conversion of a source; and down conversion of a destination). The memory access 3620 instruction templates include the scale field 3660, and optionally the displacement field 3662A or the displacement scale field 3662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 3652 is interpreted as a write mask control (Z) field 3652C, whose content distinguishes whether the write masking controlled by the write mask field 3670 should be a merging or a zeroing.

In the case of the non-memory access 3605 instruction templates of class B, part of the beta field 3654 is interpreted as an RL field 3657A, whose content distinguishes which one of the different augmentation operation types are to be performed (e.g., round 3657A.1 and vector length (VSIZE) 3657A.2 are respectively specified for the no memory access, write mask control, partial round control type operation 3612 instruction template and the no memory access, write mask control, VSIZE type operation 3617 instruction template), while the rest of the beta field 3654 distinguishes which of the operations of the specified type is to be performed. In the no memory access 3605 instruction templates, the scale field 3660, the displacement field 3662A, and the displacement scale filed 3662B are not present.

In the no memory access, write mask control, partial round control type operation 3610 instruction template, the rest of the beta field 3654 is interpreted as a round operation field 3659A and exception event reporting is disabled (a given instruction does not report any kind of floating-point exception flag and does not raise any floating point exception handler).

Round operation control field 3659A—just as round operation control field 3658, its content distinguishes which one of a group of rounding operations to perform (e.g., Round-up, Round-down, Round-towards-zero and Round-to-nearest). Thus, the round operation control field 3659A allows for the changing of the rounding mode on a per instruction basis. In one embodiment of the disclosure where a processor includes a control register for specifying rounding modes, the round operation control field's 3650 content overrides that register value.

In the no memory access, write mask control, VSIZE type operation 3617 instruction template, the rest of the beta field 3654 is interpreted as a vector length field 3659B, whose content distinguishes which one of a number of data vector lengths is to be performed on (e.g., 128, 256, or 512 byte).

In the case of a memory access 3620 instruction template of class B, part of the beta field 3654 is interpreted as a broadcast field 3657B, whose content distinguishes whether or not the broadcast type data manipulation operation is to be performed, while the rest of the beta field 3654 is interpreted the vector length field 3659B. The memory access 3620 instruction templates include the scale field 3660, and optionally the displacement field 3662A or the displacement scale field 3662B.

With regard to the generic vector friendly instruction format 3600, a full opcode field 3674 is shown including the format field 3640, the base operation field 3642, and the data element width field 3664. While one embodiment is shown where the full opcode field 3674 includes all of these fields, the full opcode field 3674 includes less than all of these fields in embodiments that do not support all of them. The full opcode field 3674 provides the operation code (opcode).

The augmentation operation field 3650, the data element width field 3664, and the write mask field 3670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 37 is a block diagram illustrating an exemplary specific vector friendly instruction format according to embodiments of the disclosure. FIG. 37 shows a specific vector friendly instruction format 3700 that is specific in the sense that it specifies the location, size, interpretation, and order of the fields, as well as values for some of those fields. The specific vector friendly instruction format 3700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 36 into which the fields from FIG. 37 map are illustrated.

It should be understood that, although embodiments of the disclosure are described with reference to the specific vector friendly instruction format 3700 in the context of the generic vector friendly instruction format 3600 for illustrative purposes, the disclosure is not limited to the specific vector friendly instruction format 3700 except where claimed. For example, the generic vector friendly instruction format 3600 contemplates a variety of possible sizes for the various fields, while the specific vector friendly instruction format 3700 is shown as having fields of specific sizes. By way of specific example, while the data element width field 3664 is illustrated as a one bit field in the specific vector friendly instruction format 3700, the disclosure is not so limited (that is, the generic vector friendly instruction format 3600 contemplates other sizes of the data element width field 3664).

The generic vector friendly instruction format 3600 includes the following fields listed below in the order illustrated in FIG. 37A.

EVEX Prefix (Bytes 0-3) 3702—is encoded in a four-byte form.

Format Field 3640 (EVEX Byte 0, bits [7:0])—the first byte (EVEX Byte 0) is the format field 3640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 3705 (EVEX Byte 1, bits [7-5])—consists of a EVEX.R bit field (EVEX Byte 1, bit [7]-R), EVEX.X bit field (EVEX byte 1, bit [6]-X), and 3657 BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 3610—this is the first part of the REX' field 3610 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 3715 (EVEX byte 1, bits [3:0]-mmmm)—its content encodes an implied leading opcode byte (0F, 0F 38, or 0F 3).

Data element width field 3664 (EVEX byte 2, bit [7]-W)—is represented by the notation EVEX.W. EVEX.W is used to define the granularity (size) of the datatype (either 32-bit data elements or 64-bit data elements).

EVEX.vvvv 3720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 3720 encodes the 4 low-order bits of the first source register specifier stored in inverted (1s complement) form. Depending on the instruction, an extra different EVEX bit field is used to extend the specifier size to 32 registers.

EVEX.U 3668 Class field (EVEX byte 2, bit [2]-U)—If EVEX.U=0, it indicates class A or EVEX.U0; if EVEX.U=1, it indicates class B or EVEX.U1.

Prefix encoding field 3725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 3652 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 3654 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 3610—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 3670 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 3730 (Byte 4) is also known as the opcode byte. Part of the opcode is specified in this field.

MOD R/M Field 3740 (Byte 5) includes MOD field 3742, Reg field 3744, and R/M field 3746. As previously described, the MOD field's 3742 content distinguishes between memory access and non-memory access operations. The role of Reg field 3744 can be summarized to two situations: encoding either the destination register operand or a source register operand, or be treated as an opcode extension and not used to encode any instruction operand. The role of R/M field 3746 may include the following:

encoding the instruction operand that references a memory address, or encoding either the destination register operand or a source register operand.

Scale, Index, Base (SIB) Byte (Byte 6)—As previously described, the scale field's 3650 content is used for memory address generation. SIB.xxx 3754 and SIB.bbb 3756—the contents of these fields have been previously referred to with regard to the register indexes Xxxx and Bbbb.

Displacement field 3662A (Bytes 7-10)—when MOD field 3742 contains 10, bytes 7-10 are the displacement field 3662A, and it works the same as the legacy 32-bit displacement (disp32) and works at byte granularity.

Displacement factor field 3662B (Byte 7)—when MOD field 3742 contains 01, byte 7 is the displacement factor field 3662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 3662B is a reinterpretation of disp8; when using displacement factor field 3662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 3662B substitutes the legacy x86 instruction set 8-bit displacement. Thus, the displacement factor field 3662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 3672 operates as previously described.

Full Opcode Field

FIG. 37B is a block diagram illustrating the fields of the specific vector friendly instruction format 3700 that make up the full opcode field 3674 according to one embodiment of the disclosure. Specifically, the full opcode field 3674 includes the format field 3640, the base operation field 3642, and the data element width (W) field 3664. The base operation field 3642 includes the prefix encoding field 3725, the opcode map field 3715, and the real opcode field 3730.

Register Index Field

FIG. 37C is a block diagram illustrating the fields of the specific vector friendly instruction format 3700 that make up the register index field 3644 according to one embodiment of the disclosure. Specifically, the register index field 3644 includes the REX field 3705, the REX' field 3710, the MODR/M.reg field 3744, the MODR/M.r/m field 3746, the VVVV field 3720, xxx field 3754, and the bbb field 3756.

Augmentation Operation Field

Figure 37D:
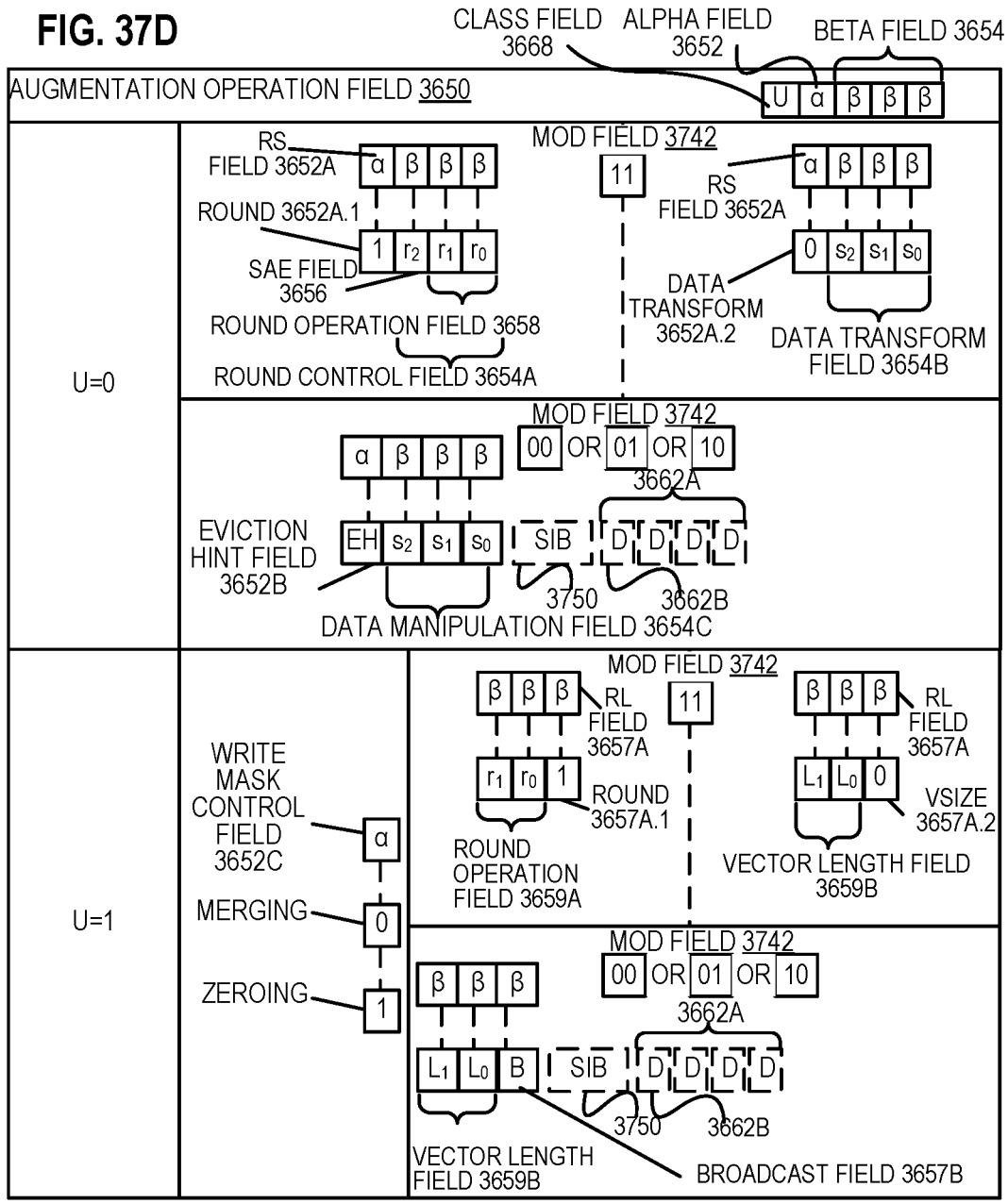
FIG. 37D is a block diagram illustrating the fields of the specific vector friendly instruction format in FIG. 37A that make up the augmentation operation field 3650 according to one embodiment of the disclosure.

FIG. 37D is a block diagram illustrating the fields of the specific vector friendly instruction format 3700 that make up the augmentation operation field 3650 according to one embodiment of the disclosure. When the class (U) field 3668 contains 0, it signifies EVEX.U0 (class A 3668A); when it contains 1, it signifies EVEX.U1 (class B 3668B). When U=0 and the MOD field 3742 contains 11 (signifying a no memory access operation), the alpha field 3652 (EVEX byte 3, bit [7]-EH) is interpreted as the rs field 3652A. When the rs field 3652A contains a 1 (round 3652A.1), the beta field 3654 (EVEX byte 3, bits [6:4]-SSS) is interpreted as the round control field 3654A. The round control field 3654A includes a one bit SAE field 3656 and a two bit round operation field 3658. When the rs field 3652A contains a 0 (data transform 3652A.2), the beta field 3654 (EVEX byte 3, bits [6:4]-SSS) is interpreted as a three bit data transform field 3654B. When U=0 and the MOD field 3742 contains 00, 01, or 10 (signifying a memory access operation), the alpha field 3652 (EVEX byte 3, bit [7]-EH) is interpreted as the eviction hint (EH) field 3652B and the beta field 3654 (EVEX byte 3, bits [6:4]-SSS) is interpreted as a three bit data manipulation field 3654C.

When U=1, the alpha field 3652 (EVEX byte 3, bit [7]-EH) is interpreted as the write mask control (Z) field 3652C. When U=1 and the MOD field 3742 contains 11 (signifying a no memory access operation), part of the beta field 3654 (EVEX byte 3, bit [4]-$S_0$) is interpreted as the RL field 3657A; when it contains a 1 (round 3657A.1) the rest of the beta field 3654 (EVEX byte 3, bit [6-5]-$S_{2-1}$) is interpreted as the round operation field 3659A, while when the RL field 3657A contains a 0 (VSIZE 3657.A2) the rest of the beta field 3654 (EVEX byte 3, bit [6-5]-$S_{2-1}$) is interpreted as the vector length field 3659B (EVEX byte 3, bit [6-5]-$L_{1-0}$). When U=1 and the MOD field 3742 contains 00, 01, or 10 (signifying a memory access operation), the beta field 3654 (EVEX byte 3, bits [6:4]-SSS) is interpreted as the vector length field 3659B (EVEX byte 3, bit [6-5]-$L_{1-0}$) and the broadcast field 3657B (EVEX byte 3, bit [4]-B).

Exemplary Register Architecture

Figure 38:
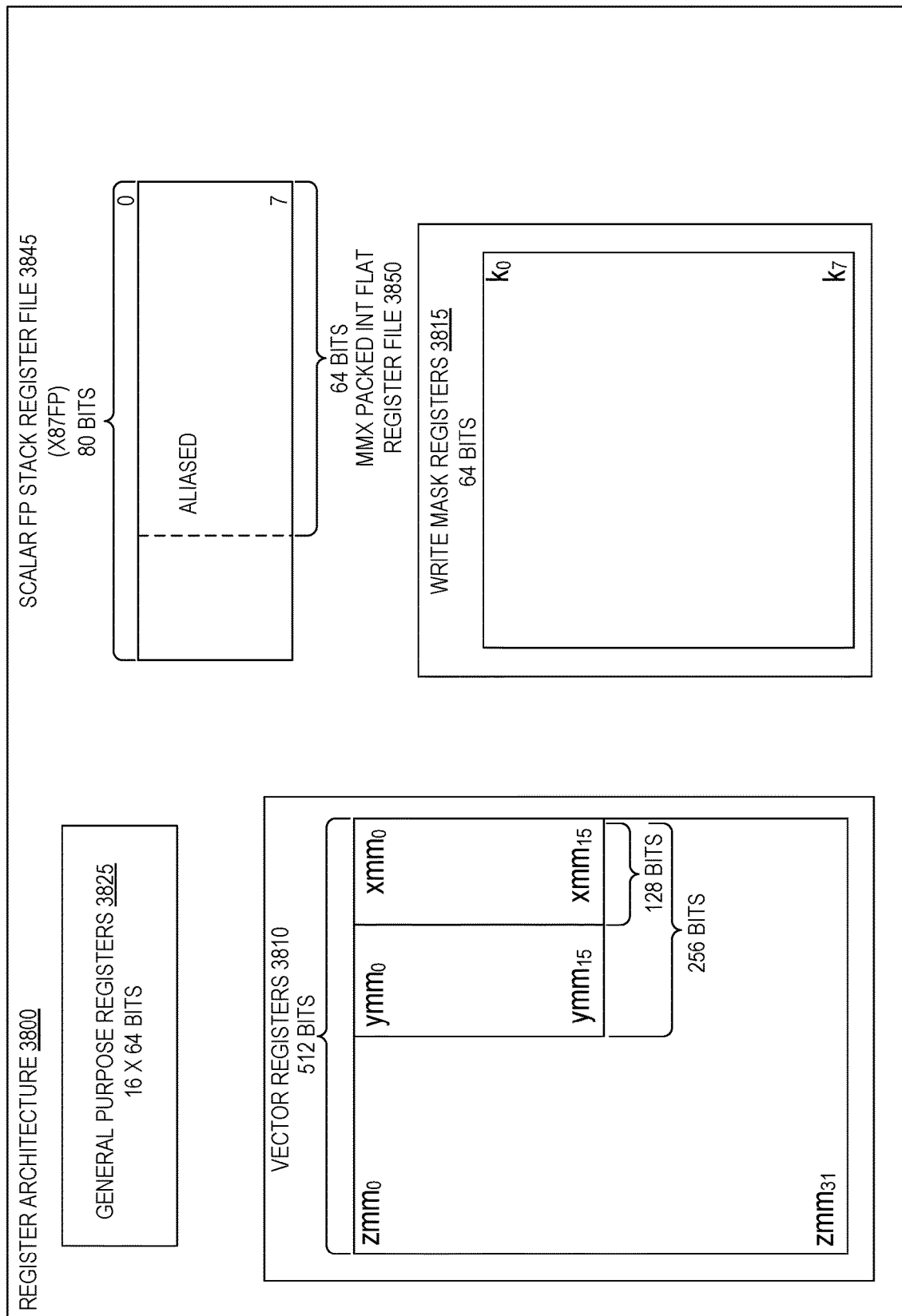
FIG. 38 is a block diagram of a register architecture according to one embodiment of the disclosure

FIG. 38 is a block diagram of a register architecture 3800 according to one embodiment of the disclosure. In the embodiment illustrated, there are 32 vector registers 3810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 3700 operates on these overlaid register file as illustrated in the below tables.

| Adjustable Vector Length | Class | Operations | Registers |
|---|---|---|---|
| Instruction Templates that do not include the vector length field 3659B | A (FIG. 36A; U = 0) | 3610, 3615, 3625, 3630 | zmm registers (the vector length is 64 byte) |
| | B (FIG. 36B; U = 1) | 3612 | zmm registers (the vector length is 64 byte) |
| Instruction templates that do include the vector length field 3659B | B (FIG. 36B; U = 1) | 3617, 3627 | zmm, ymm, or xmm registers (the vector length is 64 byte, 32 byte, or 16 byte) depending on the vector length field 3659B |

In other words, the vector length field 3659B selects between a maximum length and one or more other shorter lengths, where each such shorter length is half the length of the preceding length; and instructions templates without the vector length field 3659B operate on the maximum vector length. Further, in one embodiment, the class B instruction templates of the specific vector friendly instruction format 3700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 3815—in the embodiment illustrated, there are 8 write mask registers (k0 through k7), each 64 bits in size. In an alternate embodiment, the write mask registers 3815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 3825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3845, on which is aliased the MMX packed integer flat register file 3850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 39A is a block diagram illustrating both an exemplary in-order pipeline and an exemplary register renaming, out-of-order issue/execution pipeline according to embodiments of the disclosure. FIG. 39B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 39A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 39A, a processor pipeline 3900 includes a fetch stage 3902, a length decode stage 3904, a decode stage 3906, an allocation stage 3908, a renaming stage 3910, a scheduling (also known as a dispatch or issue) stage 3912, a register read/memory read stage 3914, an execute stage 3916, a write back/memory write stage 3918, an exception handling stage 3922, and a commit stage 3924.

FIG. 39B shows processor core 3990 including a front end unit 3930 coupled to an execution engine unit 3950, and both are coupled to a memory unit 3970. The core 3990 may be a reduced instruction set computing (RISC) core, a complex instruction set computing (CISC) core, a very long instruction word (VLIW) core, or a hybrid or alternative core type. As yet another option, the core 3990 may be a special-purpose core, such as, for example, a network or communication core, compression engine, coprocessor core, general purpose computing graphics processing unit (GPGPU) core, graphics core, or the like.

The front end unit 3930 includes a branch prediction unit 3932 coupled to an instruction cache unit 3934, which is coupled to an instruction translation lookaside buffer (TLB) 3936, which is coupled to an instruction fetch unit 3938, which is coupled to a decode unit 3940. The decode unit 3940 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 3940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3990 includes a microcode ROM or other medium that stores microcode for certain macro-instructions (e.g., in decode unit 3940 or otherwise within the front end unit 3930). The decode unit 3940 is coupled to a rename/allocator unit 3952 in the execution engine unit 3950.

The execution engine unit 3950 includes the rename/allocator unit 3952 coupled to a retirement unit 3954 and a set of one or more scheduler unit(s) 3956. The scheduler unit(s) 3956 represents any number of different schedulers, including reservations stations, central instruction window, etc. The scheduler unit(s) 3956 is coupled to the physical register file(s) unit(s) 3958. Each of the physical register file(s) units 3958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3958 comprises a vector registers unit, a write mask registers unit, and a scalar registers unit. These register units may provide architectural vector registers, vector mask registers, and general purpose registers. The physical register file(s) unit(s) 3958 is overlapped by the retirement unit 3954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3954 and the physical register file(s) unit(s) 3958 are coupled to the execution cluster(s) 3960. The execution cluster(s) 3960 includes a set of one or more execution units 3962 (e.g., execution circuits) and a set of one or more memory access units 3964. The execution units 3962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3956, physical register file(s) unit(s) 3958, and execution cluster(s) 3960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3964). It should also be understood that where separate pipelines are used, one or more of these pipelines may be out-of-order issue/execution and the rest in-order.

The set of memory access units 3964 is coupled to the memory unit 3970, which includes a data TLB unit 3972 coupled to a data cache unit 3974 coupled to a level 2 (L2) cache unit 3976. In one exemplary embodiment, the memory access units 3964 may include a load unit, a store address unit, and a store data unit, each of which is coupled to the data TLB unit 3972 in the memory unit 3970. The instruction cache unit 3934 is further coupled to a level 2 (L2) cache unit 3976 in the memory unit 3970. The L2 cache unit 3976 is coupled to one or more other levels of cache and eventually to a main memory.

By way of example, the exemplary register renaming, out-of-order issue/execution core architecture may implement the pipeline 3900 as follows: 1) the instruction fetch 3938 performs the fetch and length decoding stages 3902 and 3904; 2) the decode unit 3940 performs the decode stage 3906; 3) the rename/allocator unit 3952 performs the allocation stage 3908 and renaming stage 3910; 4) the scheduler unit(s) 3956 performs the schedule stage 3912; 5) the physical register file(s) unit(s) 3958 and the memory unit 3970 perform the register read/memory read stage 3914; the execution cluster 3960 perform the execute stage 3916; 6) the memory unit 3970 and the physical register file(s) unit(s) 3958 perform the write back/memory write stage 3918; 7) various units may be involved in the exception handling stage 3922; and 8) the retirement unit 3954 and the physical register file(s) unit(s) 3958 perform the commit stage 3924.

The core 3990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 3990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 3934/3974 and a shared L2 cache unit 3976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 40B:
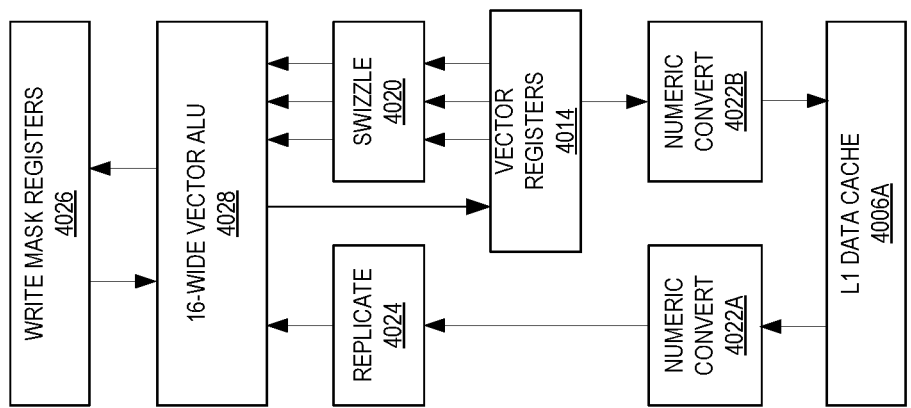
FIG. 40B is an expanded view of part of the processor core in FIG. 40A according to embodiments of the disclosure.
Figure 40A:
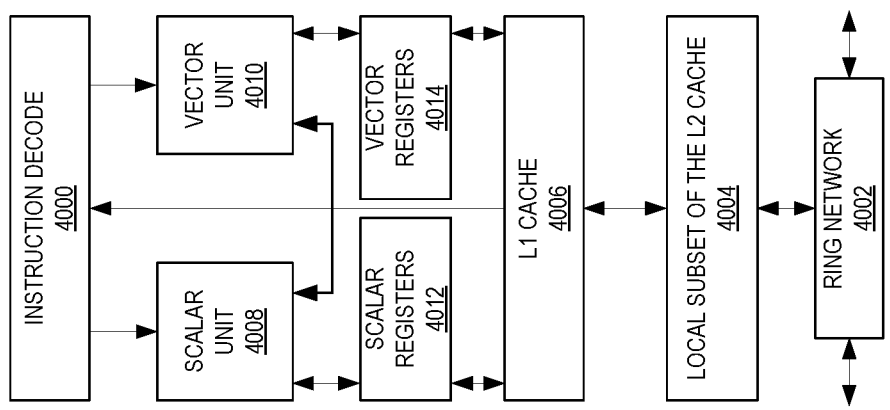
FIG. 40A is a block diagram of a single processor core, along with its connection to the on-die interconnect network and with its local subset of the Level 2 (L2) cache, according to embodiments of the disclosure.

FIGS. 40A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 40A is a block diagram of a single processor core, along with its connection to the on-die interconnect network 4002 and with its local subset of the Level 2 (L2) cache 4004, according to embodiments of the disclosure. In one embodiment, an instruction decode unit 4000 supports the x86 instruction set with a packed data instruction set extension. An L1 cache 4006 allows low-latency accesses to cache memory into the scalar and vector units. While in one embodiment (to simplify the design), a scalar unit 4008 and a vector unit 4010 use separate register sets (respectively, scalar registers 4012 and vector registers 4014) and data transferred between them is written to memory and then read back in from a level 1 (L1) cache 4006, alternative embodiments of the disclosure may use a different approach (e.g., use a single register set or include a communication path that allow data to be transferred between the two register files without being written and read back).

The local subset of the L2 cache 4004 is part of a global L2 cache that is divided into separate local subsets, one per processor core. Each processor core has a direct access path to its own local subset of the L2 cache 4004. Data read by a processor core is stored in its L2 cache subset 4004 and can be accessed quickly, in parallel with other processor cores accessing their own local L2 cache subsets. Data written by a processor core is stored in its own L2 cache subset 4004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 40B is an expanded view of part of the processor core in FIG. 40A according to embodiments of the disclosure. FIG. 40B includes an L1 data cache 4006A part of the L1 cache 4004, as well as more detail regarding the vector unit 4010 and the vector registers 4014. Specifically, the vector unit 4010 is a 16-wide vector processing unit (VPU) (see the 16-wide ALU 4028), which executes one or more of integer, single-precision float, and double-precision float instructions. The VPU supports swizzling the register inputs with swizzle unit 4020, numeric conversion with numeric convert units 4022A-B, and replication with replication unit 4024 on the memory input. Write mask registers 4026 allow predicating resulting vector writes.

Figure 41:
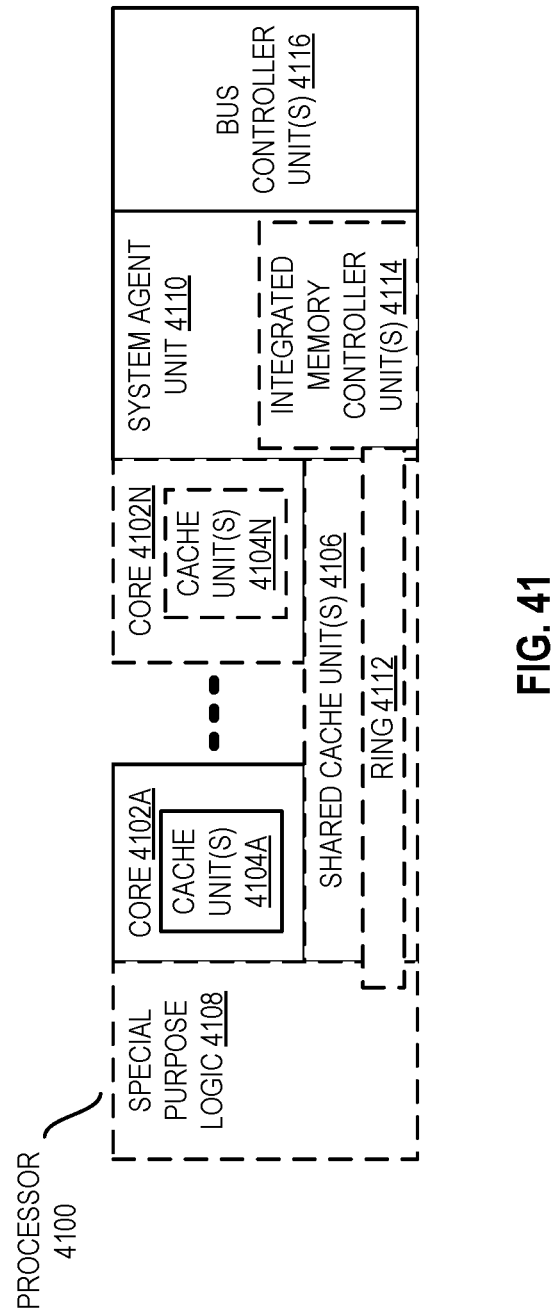
FIG. 41 is a block diagram of a processor that may have more than one core, may have an integrated memory controller, and may have integrated graphics according to embodiments of the disclosure.

FIG. 41 is a block diagram of a processor 4100 that may have more than one core, may have an integrated memory controller, and may have integrated graphics according to embodiments of the disclosure. The solid lined boxes in FIG. 41 illustrate a processor 4100 with a single core 4102A, a system agent 4110, a set of one or more bus controller units 4116, while the optional addition of the dashed lined boxes illustrates an alternative processor 4100 with multiple cores 4102A-N, a set of one or more integrated memory controller unit(s) 4114 in the system agent unit 4110, and special purpose logic 4108.

Thus, different implementations of the processor 4100 may include: 1) a CPU with the special purpose logic 4108 being integrated graphics and/or scientific (throughput) logic (which may include one or more cores), and the cores 4102A-N being one or more general purpose cores (e.g., general purpose in-order cores, general purpose out-of-order cores, a combination of the two); 2) a coprocessor with the cores 4102A-N being a large number of special purpose cores intended primarily for graphics and/or scientific (throughput); and 3) a coprocessor with the cores 4102A-N being a large number of general purpose in-order cores. Thus, the processor 4100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 4100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 4106, and external memory (not shown) coupled to the set of integrated memory controller units 4114. The set of shared cache units 4106 may include one or more mid-level caches, such as level 2 (L2), level 3 (L3), level 4 (L4), or other levels of cache, a last level cache (LLC), and/or combinations thereof. While in one embodiment a ring based interconnect unit 4112 interconnects the integrated graphics logic 4108, the set of shared cache units 4106, and the system agent unit 4110/integrated memory controller unit(s) 4114, alternative embodiments may use any number of well-known techniques for interconnecting such units. In one embodiment, coherency is maintained between one or more cache units 4106 and cores 4102-A-N.

In some embodiments, one or more of the cores 4102A-N are capable of multi-threading. The system agent 4110 includes those components coordinating and operating cores 4102A-N. The system agent unit 4110 may include for example a power control unit (PCU) and a display unit. The PCU may be or include logic and components needed for regulating the power state of the cores 4102A-N and the integrated graphics logic 4108. The display unit is for driving one or more externally connected displays.

The cores 4102A-N may be homogenous or heterogeneous in terms of architecture instruction set; that is, two or more of the cores 4102A-N may be capable of execution the same instruction set, while others may be capable of executing only a subset of that instruction set or a different instruction set.

Exemplary Computer Architectures

FIGS. 42-45 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 42:
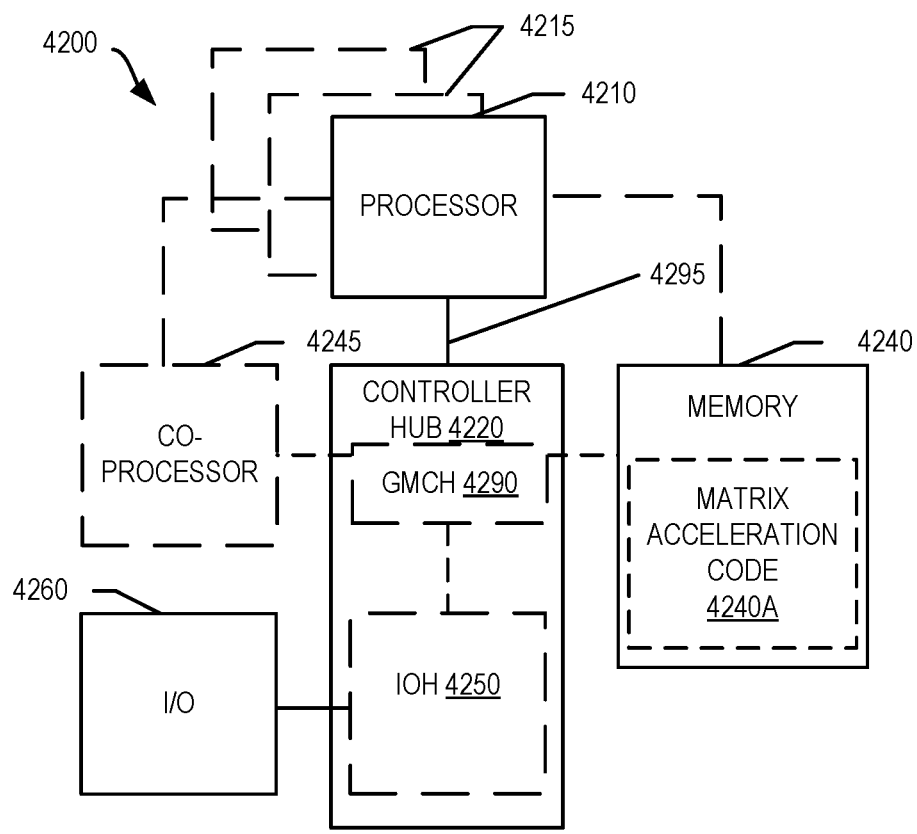
FIG. 42 is a block diagram of a system in accordance with one embodiment of the present disclosure.

Referring now to FIG. 42, shown is a block diagram of a system 4200 in accordance with one embodiment of the present disclosure. The system 4200 may include one or more processors 4210, 4215, which are coupled to a controller hub 4220. In one embodiment the controller hub 4220 includes a graphics memory controller hub (GMCH) 4290 and an Input/Output Hub (IOH) 4250 (which may be on separate chips); the GMCH 4290 includes memory and graphics controllers to which are coupled memory 4240 and a coprocessor 4245; the IOH 4250 is couples input/output (I/O) devices 4260 to the GMCH 4290. Alternatively, one or both of the memory and graphics controllers are integrated within the processor (as described herein), the memory 4240 and the coprocessor 4245 are coupled directly to the processor 4210, and the controller hub 4220 in a single chip with the IOH 4250. Memory 4240 may include matrix acceleration code 4240A, for example, that stores code that when executed causes a processor to perform any method of this disclosure.

The optional nature of additional processors 4215 is denoted in FIG. 42 with broken lines. Each processor 4210, 4215 may include one or more of the processing cores described herein and may be some version of the processor 4100.

The memory 4240 may be, for example, dynamic random access memory (DRAM), phase change memory (PCM), or a combination of the two. For at least one embodiment, the controller hub 4220 communicates with the processor(s) 4210, 4215 via a multi-drop bus, such as a frontside bus (FSB), point-to-point interface such as Quickpath Interconnect (QPI), or similar connection 4295.

In one embodiment, the coprocessor 4245 is a special-purpose processor, such as, for example, a high-throughput MIC processor, a network or communication processor, compression engine, graphics processor, GPGPU, embedded processor, or the like. In one embodiment, controller hub 4220 may include an integrated graphics accelerator.

There can be a variety of differences between the physical resources 4210, 4215 in terms of a spectrum of metrics of merit including architectural, microarchitectural, thermal, power consumption characteristics, and the like.

In one embodiment, the processor 4210 executes instructions that control data processing operations of a general type. Embedded within the instructions may be coprocessor instructions. The processor 4210 recognizes these coprocessor instructions as being of a type that should be executed by the attached coprocessor 4245. Accordingly, the processor 4210 issues these coprocessor instructions (or control signals representing coprocessor instructions) on a coprocessor bus or other interconnect, to coprocessor 4245. Coprocessor(s) 4245 accept and execute the received coprocessor instructions.

Figure 43:
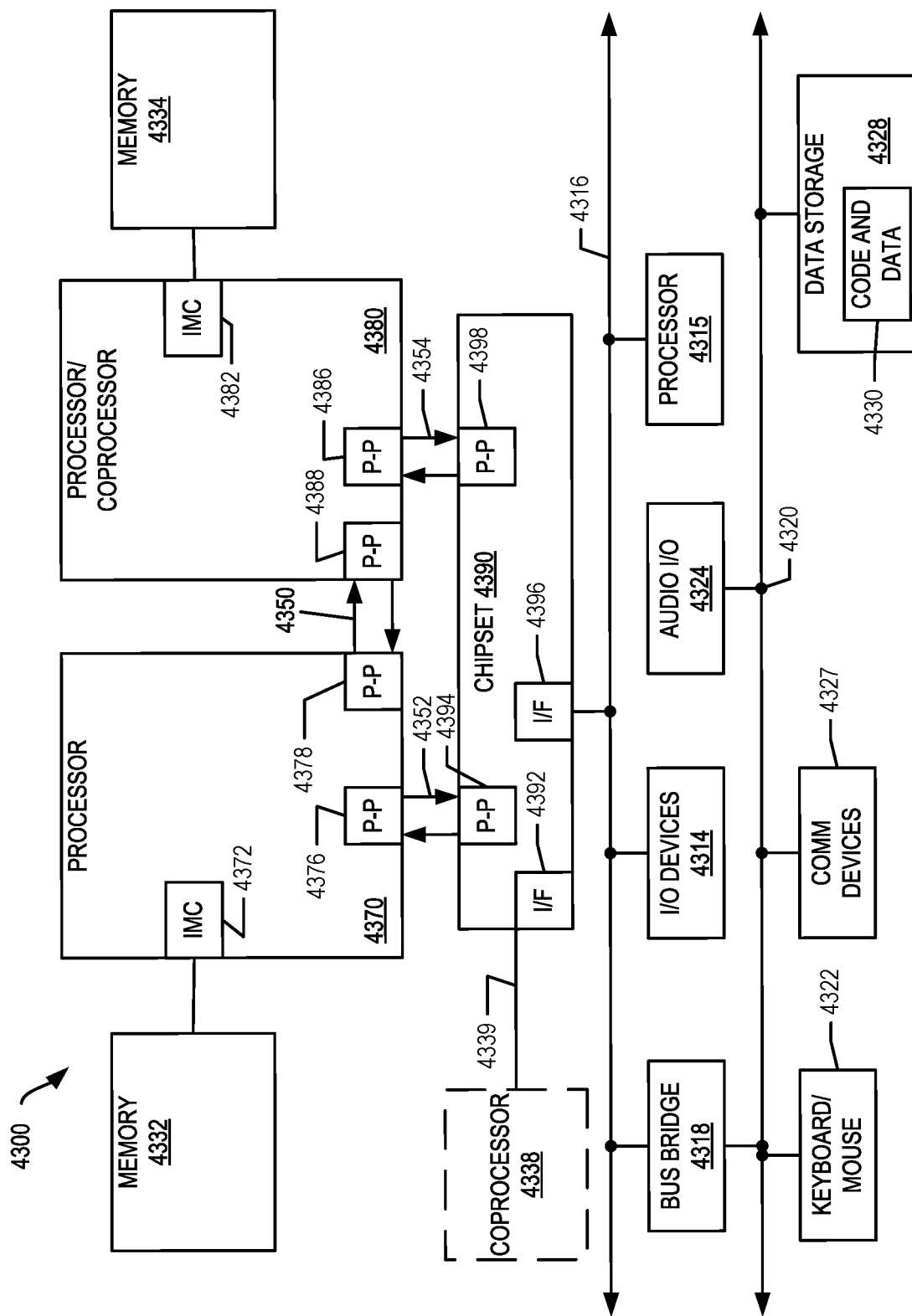
FIG. 43 is a block diagram of a more specific exemplary system in accordance with an embodiment of the present disclosure.

Referring now to FIG. 43, shown is a block diagram of a first more specific exemplary system 4300 in accordance with an embodiment of the present disclosure. As shown in FIG. 43, multiprocessor system 4300 is a point-to-point interconnect system, and includes a first processor 4370 and a second processor 4380 coupled via a point-to-point interconnect 4350. Each of processors 4370 and 4380 may be some version of the processor 4100. In one embodiment of the disclosure, processors 4370 and 4380 are respectively processors 4210 and 4215, while coprocessor 4338 is coprocessor 4245. In another embodiment, processors 4370 and 4380 are respectively processor 4210 coprocessor 4245.

Processors 4370 and 4380 are shown including integrated memory controller (IMC) units 4372 and 4382, respectively. Processor 4370 also includes as part of its bus controller units point-to-point (P-P) interfaces 4376 and 4378; similarly, second processor 4380 includes P-P interfaces 4386 and 4388. Processors 4370, 4380 may exchange information via a point-to-point (P-P) interface 4350 using P-P interface circuits 4378, 4388. As shown in FIG. 43, IMCs 4372 and 4382 couple the processors to respective memories, namely a memory 4332 and a memory 4334, which may be portions of main memory locally attached to the respective processors.

Processors 4370, 4380 may each exchange information with a chipset 4390 via individual P-P interfaces 4352, 4354 using point to point interface circuits 4376, 4394, 4386, 4398. Chipset 4390 may optionally exchange information with the coprocessor 4338 via a high-performance interface 4339. In one embodiment, the coprocessor 4338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 4390 may be coupled to a first bus 4316 via an interface 4396. In one embodiment, first bus 4316 may be a Peripheral Component Interconnect (PCI) bus, or a bus such as a PCI Express bus or another third generation I/O interconnect bus, although the scope of the present disclosure is not so limited.

As shown in FIG. 43, various I/O devices 4314 may be coupled to first bus 4316, along with a bus bridge 4318 which couples first bus 4316 to a second bus 4320. In one embodiment, one or more additional processor(s) 4315, such as coprocessors, high-throughput MIC processors, GPGPU's, accelerators (such as, e.g., graphics accelerators or digital signal processing (DSP) units), field programmable gate arrays, or any other processor, are coupled to first bus 4316. In one embodiment, second bus 4320 may be a low pin count (LPC) bus. Various devices may be coupled to a second bus 4320 including, for example, a keyboard and/or mouse 4322, communication devices 4327 and a storage unit 4328 such as a disk drive or other mass storage device which may include instructions/code and data 4330, in one embodiment. Further, an audio I/O 4324 may be coupled to the second bus 4320. Note that other architectures are possible. For example, instead of the point-to-point architecture of FIG. 43, a system may implement a multi-drop bus or other such architecture.

Figure 44:
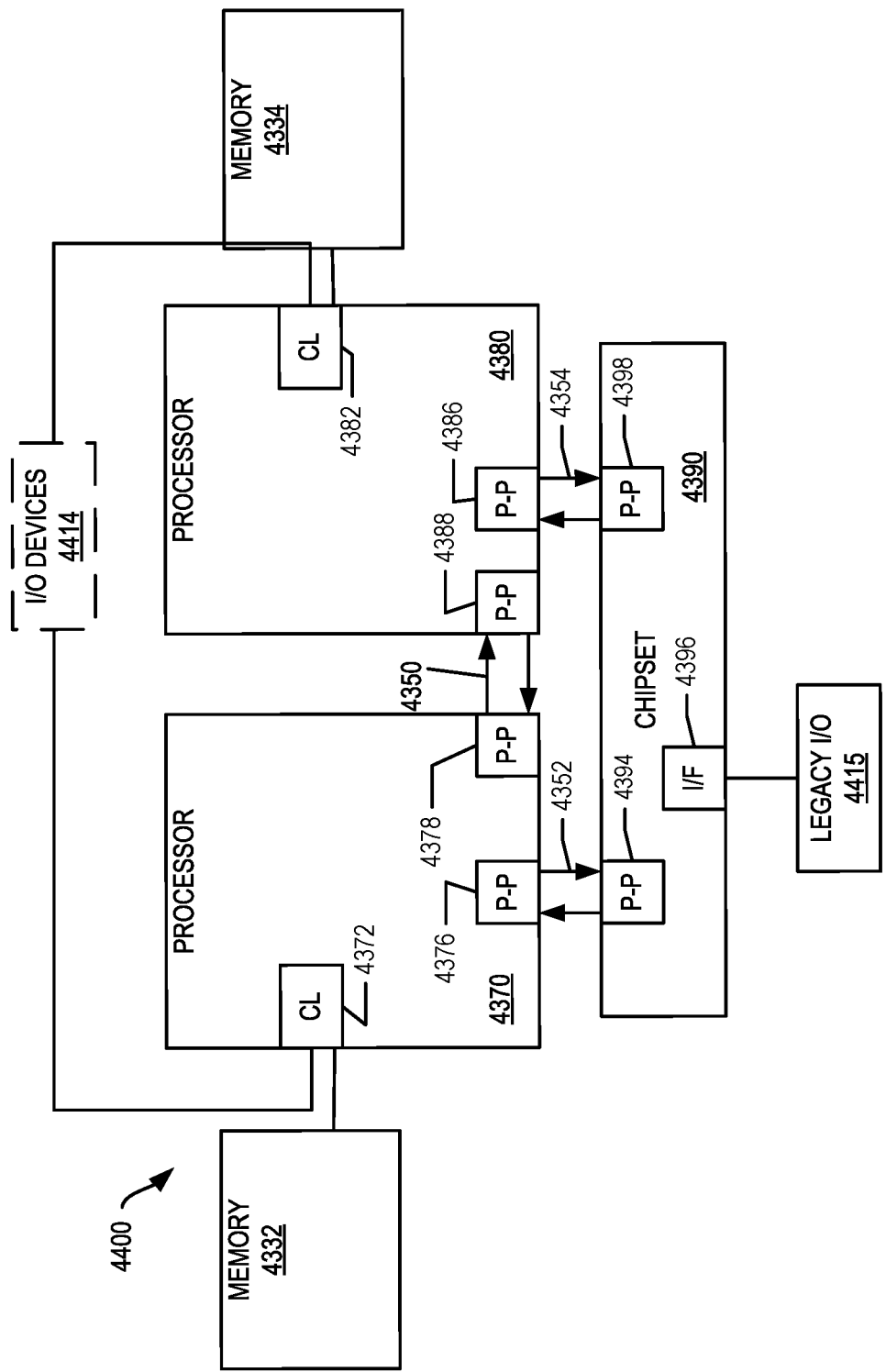
FIG. 44, shown is a block diagram of a second more specific exemplary system in accordance with an embodiment of the present disclosure.

Referring now to FIG. 44, shown is a block diagram of a second more specific exemplary system 4400 in accordance with an embodiment of the present disclosure. Like elements in FIGS. 43 and 44 bear like reference numerals, and certain aspects of FIG. 43 have been omitted from FIG. 44 in order to avoid obscuring other aspects of FIG. 44.

FIG. 44 illustrates that the processors 4370, 4380 may include integrated memory and I/O control logic ("CL") 4372 and 4382, respectively. Thus, the CL 4372, 4382 include integrated memory controller units and include I/O control logic. FIG. 44 illustrates that not only are the memories 4332, 4334 coupled to the CL 4372, 4382, but also that I/O devices 4414 are also coupled to the control logic 4372, 4382. Legacy I/O devices 4415 are coupled to the chipset 4390.

Figure 45:
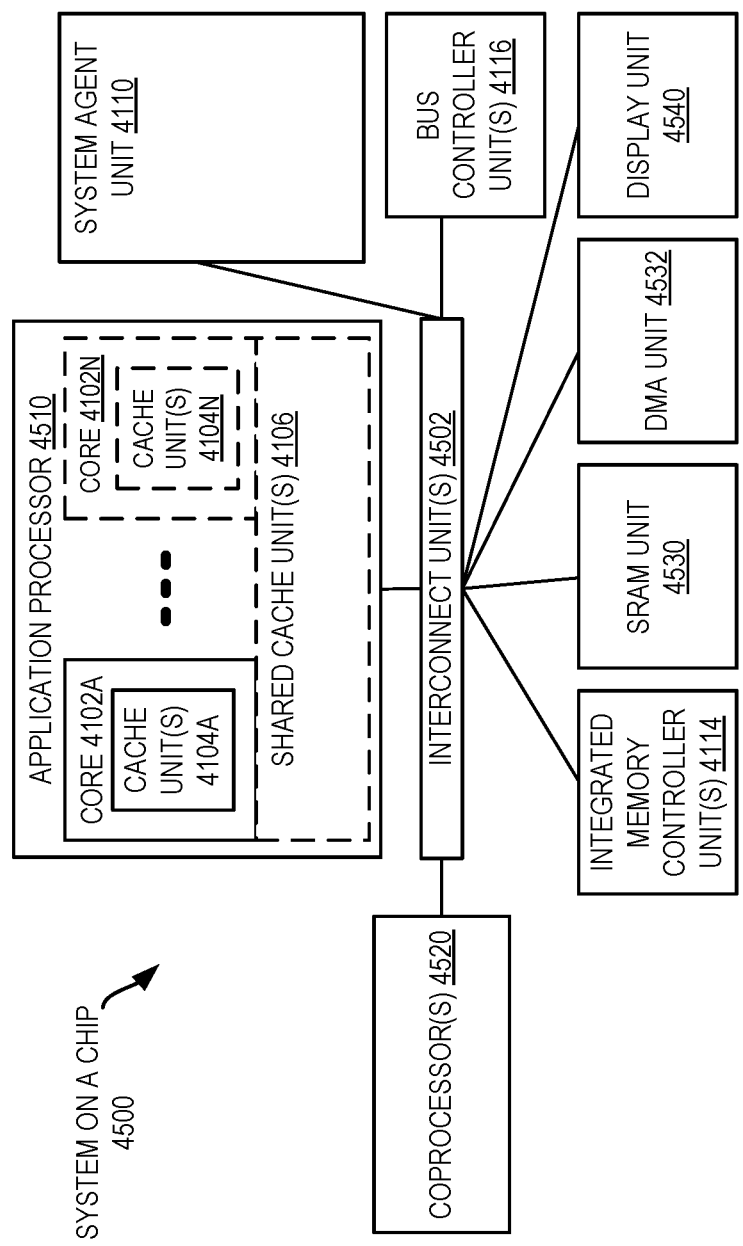
FIG. 45, shown is a block diagram of a system on a chip (SoC) in accordance with an embodiment of the present disclosure.

Referring now to FIG. 45, shown is a block diagram of a SoC 4500 in accordance with an embodiment of the present disclosure. Similar elements in FIG. 41 bear like reference numerals. Also, dashed lined boxes are optional features on more advanced SoCs. In FIG. 45, an interconnect unit(s) 4502 is coupled to: an application processor 4510 which includes a set of one or more cores 4102A-N and shared cache unit(s) 4106; a system agent unit 4110; a bus controller unit(s) 4116; an integrated memory controller unit(s) 4114; a set or one or more coprocessors 4520 which may include integrated graphics logic, an image processor, an audio processor, and a video processor; an static random access memory (SRAM) unit 4530; a direct memory access (DMA) unit 4532; and a display unit 4540 for coupling to one or more external displays. In one embodiment, the coprocessor(s) 4520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 4330 illustrated in FIG. 43, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 46 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 46 shows a program in a high level language 4602 may be compiled using an x86 compiler 4604 to generate x86 binary code 4606 that may be natively executed by a processor with at least one x86 instruction set core 4616. The processor with at least one x86 instruction set core 4616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 4604 represents a compiler that is operable to generate x86 binary code 4606 (e.g., object code) that can, with or without additional linkage processing, be executed on the processor with at least one x86 instruction set core 4616. Similarly, FIG. 46 shows the program in the high level language 4602 may be compiled using an alternative instruction set compiler 4608 to generate alternative instruction set binary code 4610 that may be natively executed by a processor without at least one x86 instruction set core 4614 (e.g., a processor with cores that execute the MIPS instruction set of MIPS Technologies of Sunnyvale, CA and/or that execute the ARM instruction set of ARM Holdings of Sunnyvale, CA). The instruction converter 4612 is used to convert the x86 binary code 4606 into code that may be natively executed by the processor without an x86 instruction set core 4614. This converted code is not likely to be the same as the alternative instruction set binary code 4610 because an instruction converter capable of this is difficult to make; however, the converted code will accomplish the general operation and be made up of instructions from the alternative instruction set. Thus, the instruction converter 4612 represents software, firmware, hardware, or a combination thereof that, through emulation, simulation or any other process, allows a processor or other electronic device that does not have an x86 instruction set processor or core to execute the x86 binary code 4606.

What is claimed is:

1. An apparatus comprising:
a matrix operations accelerator circuit comprising:
a two-dimensional grid of processing elements,
a first plurality of registers that represents a first two-dimensional matrix coupled to the two-dimensional grid of processing elements, and
a second plurality of registers that represents a second two-dimensional matrix coupled to the two-dimensional grid of processing elements; and
a hardware processor core coupled to the matrix operations accelerator circuit and comprising:
a decoder circuit to decode a single instruction into a decoded instruction, the single instruction including a first field that identifies the first two-dimensional matrix, a second field that identifies the second two-dimensional matrix, and an opcode that indicates an execution circuit of the hardware processor core is to cause the matrix operations accelerator circuit to generate a third two-dimensional matrix from a proper subset of elements of a row or a column of the first two-dimensional matrix and a proper subset of elements of a row or a column of the second two-dimensional matrix and store the third two-dimensional matrix at a destination in the matrix operations accelerator circuit, and
the execution circuit of the hardware processor core to execute the decoded instruction according to the opcode.

2. The apparatus of claim 1, wherein the opcode indicates the execution circuit of the hardware processor core is to cause the matrix operations accelerator circuit to generate the third two-dimensional matrix from a proper subset of elements of a row of the first two-dimensional matrix and a proper subset of elements of a row of the second two-dimensional matrix.

3. The apparatus of claim 2, wherein the single instruction comprises a field that identifies a non-leading element of the row of the first two-dimensional matrix that is to be a first element of the third two-dimensional matrix.

4. The apparatus of claim 3, wherein the field is an immediate of the single instruction.

5. The apparatus of claim 1, wherein the opcode indicates the execution circuit of the hardware processor core is to cause the matrix operations accelerator circuit to generate the third two-dimensional matrix from a proper subset of elements of a column of the first two-dimensional matrix and a proper subset of elements of a column of the second two-dimensional matrix.

6. The apparatus of claim 5, wherein the single instruction comprises a field that identifies a non-leading element of the column of the first two-dimensional matrix that is to be a first element of the third two-dimensional matrix.

7. The apparatus of claim 6, wherein the field is an immediate of the single instruction.

8. The apparatus of claim 1, wherein the destination in the matrix operations accelerator circuit is the first plurality of registers that represented the first two-dimensional matrix.

9. A method comprising:
decoding, by a decoder circuit of a hardware processor core coupled to a matrix operations accelerator circuit comprising a two-dimensional grid of processing elements, a first plurality of registers that represents a first two-dimensional matrix coupled to the two-dimensional grid of processing elements, and a second plurality of registers that represents a second two-dimensional matrix coupled to the two-dimensional grid of processing elements, a single instruction into a decoded instruction, the single instruction including a first field that identifies the first two-dimensional matrix, a second field that identifies the second two-dimensional matrix, and an opcode that indicates an execution circuit of the hardware processor core is to generate a third two-dimensional matrix from a proper subset of elements of a row or a column of the first two-dimensional matrix and a proper subset of elements of a row or a column of the second two-dimensional matrix and store the third two-dimensional matrix at a destination in the matrix operations accelerator circuit; and
executing the decoded instruction by the execution circuit of the hardware processor core according to the opcode.

10. The method of claim 9, wherein the opcode indicates the execution circuit of the hardware processor core is to cause the matrix operations accelerator circuit to generate the third two-dimensional matrix from a proper subset of elements of a row of the first two-dimensional matrix and a proper subset of elements of a row of the second two-dimensional matrix.

11. The method of claim 10, wherein the single instruction comprises a field that identifies a non-leading element of the row of the first two-dimensional matrix that is to be a first element of the third two-dimensional matrix.

12. The method of claim 11, wherein the field is an immediate of the single instruction.

13. The method of claim 9, wherein the opcode indicates the execution circuit of the hardware processor core is to cause the matrix operations accelerator circuit to generate the third two-dimensional matrix from a proper subset of elements of a column of the first two-dimensional matrix and a proper subset of elements of a column of the second two-dimensional matrix.

14. The method of claim 13, wherein the single instruction comprises a field that identifies a non-leading element of the column of the first two-dimensional matrix that is to be a first element of the third two-dimensional matrix.

15. The method of claim 14, wherein the field is an immediate of the single instruction.

16. The method of claim 9, wherein the destination in the matrix operations accelerator circuit is the first plurality of registers that represented the first two-dimensional matrix.

17. A non-transitory machine readable medium that stores code that when executed by a machine causes the machine to perform a method comprising:

decoding, by a decoder circuit of a hardware processor core coupled to a matrix operations accelerator circuit comprising a two-dimensional grid of processing elements, a first plurality of registers that represents a first two-dimensional matrix coupled to the two-dimensional grid of processing elements, and a second plurality of registers that represents a second two-dimensional matrix coupled to the two-dimensional grid of processing elements, a single instruction into a decoded instruction, the single instruction including a first field that identifies the first two-dimensional matrix, a second field that identifies the second two-dimensional matrix, and an opcode that indicates an execution circuit of the hardware processor core is to generate a third two-dimensional matrix from a proper subset of elements of a row or a column of the first two-dimensional matrix and a proper subset of elements of a row or a column of the second two-dimensional matrix and store the third two-dimensional matrix at a destination in the matrix operations accelerator circuit; and executing the decoded instruction by the execution circuit of the hardware processor core according to the opcode.

18. The non-transitory machine readable medium of claim 17, wherein the opcode indicates the execution circuit of the hardware processor core is to cause the matrix operations accelerator circuit to generate the third two-dimensional matrix from a proper subset of elements of a row of the first two-dimensional matrix and a proper subset of elements of a row of the second two-dimensional matrix.

19. The non-transitory machine readable medium of claim 18, wherein the single instruction comprises a field that identifies a non-leading element of the row of the first two-dimensional matrix that is to be a first element of the third two-dimensional matrix.

20. The non-transitory machine readable medium of claim 19, wherein the field is an immediate of the single instruction.

21. The non-transitory machine readable medium of claim 17, wherein the opcode indicates the execution circuit of the hardware processor core is to cause the matrix operations accelerator circuit to generate the third two-dimensional matrix from a proper subset of elements of a column of the first two-dimensional matrix and a proper subset of elements of a column of the second two-dimensional matrix.

22. The non-transitory machine readable medium of claim 21, wherein the single instruction comprises a field that identifies a non-leading element of the column of the first two-dimensional matrix that is to be a first element of the third two-dimensional matrix.

23. The non-transitory machine readable medium of claim 22, wherein the field is an immediate of the single instruction.

24. The non-transitory machine readable medium of claim 17, wherein the destination in the matrix operations accelerator circuit is the first plurality of registers that represented the first two-dimensional matrix.

25. The non-transitory machine readable medium of claim 17, the method further comprising translating the single instruction into one or more instructions of a different instruction set architecture prior to the decoding, wherein executing of the one or more instructions of the different instruction set architecture is to be functionally equivalent as the executing of the decoded instruction according to the opcode.

* * * * *